(12) United States Patent
Fukusaka et al.

(10) Patent No.: US 7,022,470 B2
(45) Date of Patent: Apr. 4, 2006

(54) PHOTOTHERMOGRAPHIC IMAGING MATERIAL

(75) Inventors: Kiyoshi Fukusaka, Hino (JP); Kazuaki Nakamura, Hino (JP); Ryouhei Iwamoto, Hino (JP); Norio Miura, Hino (JP); Nobuaki Kagawa, Hino (JP); Soc Man Ho Kimura, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 65 days.

(21) Appl. No.: 10/808,580

(22) Filed: Mar. 24, 2004

(65) Prior Publication Data

US 2004/0224266 A1    Nov. 11, 2004

(30) Foreign Application Priority Data

Mar. 24, 2003  (JP) .............................. 2003-079517
Apr. 7, 2003   (JP) .............................. 2003-102726

(51) Int. Cl.
  *G03C 1/00*   (2006.01)
  *G03C 1/005*  (2006.01)
  *G03C 1/494*  (2006.01)

(52) U.S. Cl. ................ 430/617; 430/618; 430/619; 430/620; 430/551; 430/570; 430/581; 430/584

(58) Field of Classification Search ................ 430/570, 430/581, 584, 617–620, 551
See application file for complete search history.

(56) References Cited

U.S. PATENT DOCUMENTS 6,413,711 B1 *  7/2002  Kimura ........................ 430/619
6,492,102 B1 * 12/2002  Kagawa et al. ............. 430/584
6,677,113 B1 *  1/2004  Kagawa et al. ............. 430/570

FOREIGN PATENT DOCUMENTS

EP    1 035 430 A2    9/2000
EP    1 079 269 A1    2/2001

* cited by examiner

*Primary Examiner*—Geraldine Letscher
(74) *Attorney, Agent, or Firm*—Lucas & Mercanti, LLP

(57) ABSTRACT

A photothermographic imaging material having high sensitivity and superior temporal storage stability. The photothermographic imaging material includes silver halide on at least one side of a support, and includes at least one kind of the compounds represented by the following general formula (1).

general formula (1)

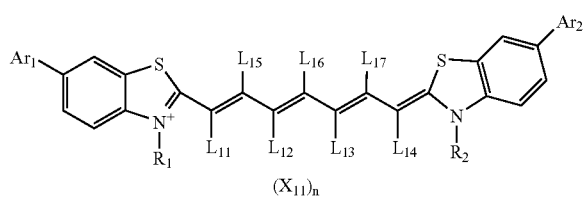

10 Claims, No Drawings

PHOTOTHERMOGRAPHIC IMAGING MATERIAL

BACKGROUND OF THE INVENTION

1. Field of the Invention

The present invention relates to a photothermographic imaging material.

2. Description of the Related Art

In Recent years, in the field of medical services, reduction of processed waste fluids has been intensively desired in view of environmental protection and space saving. In this concern, a technology in respect of photosensitive thermal development photograph materials used for medical diagnoses and photographic techniques, which can be exposed efficiently by a laser image setter or a laser imager and can form black images provided with high resolutions and definition, has been required. With such photosensitive thermal development photograph materials, it becomes needless to use solution-type processing chemicals, and it enables the users to be implemented with a thermal development process system that is simpler and does not destroy the natural environment.

On the other hand, the semiconductor laser technology having been progressing in recent years has allowed image output apparatuses for medical use to be compact in their sizes. Naturally, a technology in respect of infrared-sensitive thermal development photograph materials capable of utilizing semiconductor laser as a light source has been developed also, and various spectro-sensitization technologies have been disclosed (see JP Hei-3-10391B, JP Hei-6-52387B, JP Tokukaihei-5-341432A, JP Tokukaihei-6-194781A, JP Tokukaihei-6-301141A).

However, in the photothermographic imaging materials with which recordings are achieved by using a laser light source, it is desired that the material can greatly absorb light in accordance with a bright-line wave length. However, colorants each having its maximum absorption band in a region of red to near infrared have long conjugate chains and are inclined to receive influences by the environment. As a result, though the colorant has a high molar absorption coefficient in a solution, there happens easily such a phenomenon that the colorant disappears during the preparation, or that the colorant takes a number of conformations and forms a wide absorption spectrum with small maximum absorption intensity in a photosensitive material. Further, the interval between the lowest vacant level and the highest occupied level is narrow, and the lowest vacant level and the highest occupied level are approximate to the conduction band of silver halide particles. Therefore, there happens such a problem that fogging can be caused easily, or that the sensitivity can be lowered.

Hence, it has been desired to provide an infrared-sensitive photothermographic imaging material having a photosensitive spectrum that intensively absorbs light in a region of red to near infrared and an infrared-sensitive photothermographic imaging material that is highly photosensitive, causing less fogging and less deterioration in the performance even after a substantial time elapse.

In order to resolve the aforementioned problems, various techniques in connection with infrared sensitizing colorants and those for combining infrared sensitizing colorants have been disclosed (see U.S. Pat. No. 3,582,344, U.S. Pat. No. 4,975,362, U.S. Pat. No. 5,013,642, EP 821811, JP Tokukaihei-9-510022A, JP Tokukaihei-5-72659A, JP Tokukaihei-9-292673A, JP Tokukaihei-9-166844A, JP Tokukaihei-9-281631A, JP Tokukaihei-9-281639A, JP Tokukaihei-9-288327A, JP Tokukaihei-10-73900A, JP Tokukaihei-10-123663A, JP Tokukaihei-10-123665A).

However, it has been noted that the photosensitivity is not sufficient with such infrared sensitizing colorants as disclosed in those references, and that there is a problem of less photosensitivity and increasing fogging at the time of development and during the preservation lasting for a substantial time elapse. Hence, it has been desired to be improved.

SUMMARY OF THE INVENTION

The present invention was aimed at implementing the above-described requirements, and it is an object of the present invention to provide a photothermographic imaging material with high photosensitivity and excellent shelf life lasting for a substantial time elapse. More particularly, the object of the present invention is to provide a photothermographic imaging material that has high sensitivity but causes less fogging against the exposure to infrared laser beams and less deterioration in the properties during the preservation period lasting for a substantial time elapse.

According to the first aspect of the present invention, a photothermographic imaging material comprises photosensitive silver halide on at least one side of a support, and at least one of compounds represented by the following general formula (1).

general formula (1)

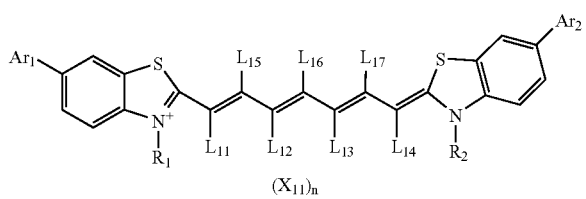

Wherein the $L_{11}$ to the $L_{17}$ represent each independently a hydrogen atom, a halogen atom, an amino group, an alkylthio group, an arylthio group, a lower alkyl group, a lower alkoxy group, an aryloxy group, an aryl group or a heterocyclic group, or a non-metal atom group required for bonding the $L_{11}$ and the $L_{12}$, the $L_{12}$ and the $L_{13}$, the $L_{13}$ and the $L_{14}$, the $L_{15}$ and the $L_{16}$, and the $L_{16}$ and the $L_{17}$, respectively, to form 5- to 7-membered rings; the $R_1$ and the $R_2$ represent each independently an aliphatic group; the $R_1$ and the $L_{11}$, and the $R_2$ and the $L_{14}$ can be bonded each other to form a 5- to 7-membered cyclic structure respectively; the $Ar_1$ and the $Ar_2$ represent each independently an aryl group or a heterocyclic group; the $X_{11}$ represents an ion required for offsetting electric charges in a molecules; and n represents the number of ions required for offsetting electric charges in the molecules.

The material according to the first aspect of the invention has high sensitivity and superior temporal storage stability, and further in detail, the material has high sensitivity and low fog for infrared laser exposure, and show small variety in the properties thereof according to the temporal storage.

The material according to the first aspect preferably comprises at least one of compounds represented by the following general formula (2).

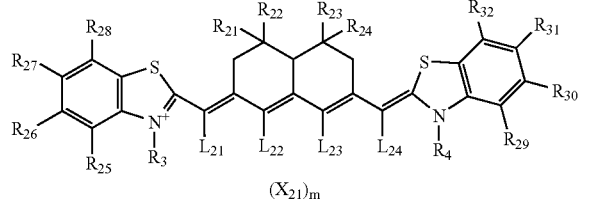

general formula (2)

Wherein the $L_{21}$ to the $L_{24}$ represent each independently a hydrogen atom, a halogen atom, an amino group, an alkylthio group, an arylthio group, a lower alkyl group, a lower alkoxyl group, an aryloxy group, an aryl, a heterocyclic group, or a non-metal atom group required for bonding the $L_{11}$ and the $L_{12}$, the $L_{12}$ and the $L_{13}$, the $L_{13}$ and the $L_{14}$, the $L_{15}$ and the $L_{16}$ and the $L_{16}$ and the $L_{17}$ can be bonded each other respectively to form 5- to 7-membered rings; the $R_3$ and the $R_4$ represent each independently an aliphatic group; the $R_3$ and the $L_{21}$, and the $R_4$ and the $L_{24}$ can be bonded each other to form a 5- to 7-membered cyclic structure, respectively; the $X_{21}$ represents an ion required for offsetting electric charges in the molecules; the m represents the number of ions required for offsetting electric charges in the molecules; the $R_{21}$ to the $R_{24}$ represent each independently a hydrogen atom, an alkyl group or an aryl group; and the $R_{25}$ to the $R_{32}$ represent a group capable of being substituted on a benzene ring; the $R_{25}$ and the $R_{26}$, the $R_{26}$ and the $R_{27}$, the $R_{27}$ and the $R_{28}$, the $R_{29}$ and the $R_{30}$, the $R_{30}$ and the $R_{31}$ and the $R_{31}$ and the $R_{32}$ can be bonded each other respectively to form cyclic structures; the $R_{27}$ is neither an aryl group nor a heterocyclic group.

According to the material of first aspect, the compound represented by the general formula (1) is preferably a compound represented by the following general formula (3).

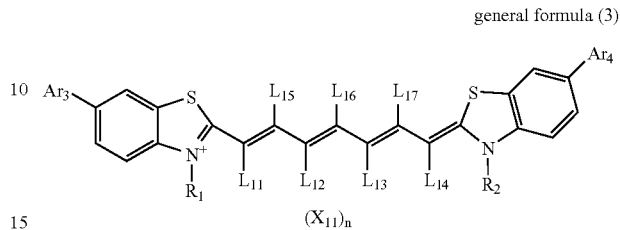

general formula (3)

Wherein the $L_{11}$ to the $L_{17}$ in the general formula (3) are synonymous with the $L_{11}$ to the $L_{17}$ in the general formula (1); the $R_1$ and the $R_2$ in the general formula (3) are synonymous with the $R_1$ and the $R_2$ in the general formula (1); the $X_{11}$ in the general formula (3) is synonymous with the $X_{11}$ in the general formula (1); the n in the general formula (3) is synonymous with the n in the general formula (1); and the $Ar_3$ and the $Ar_4$ represent each independently an aryl group.

According to the material of first aspect, the compound represented by the general formula (1) is preferably a compound represented by the following general formula (4).

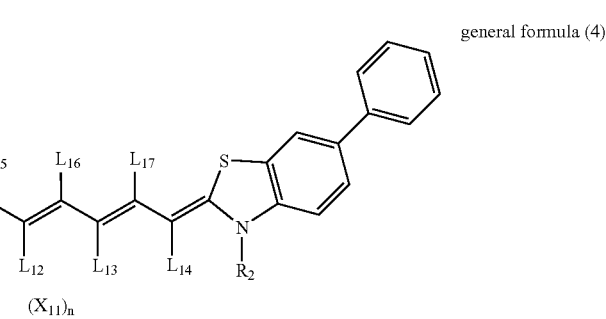

general formula (4)

Wherein the $L_{11}$ to the $L_{17}$ in the general formula (4) are synonymous with the $L_{11}$ to the $L_{17}$ in the general formula (1); the $R_1$ and the $R_2$ in the general formula (4) are synonymous with the $R_1$ and the $R_2$ in the general formula (1); the $X_{11}$ in the general formula (4) is synonymous with the $X_{11}$ in the general formula (1); the n in the general formula (4) is synonymous with the n in the general formula (1).

According to the material of first aspect, the compound represented by the general formula (1) is preferably a compound represented by the following general formula (5).

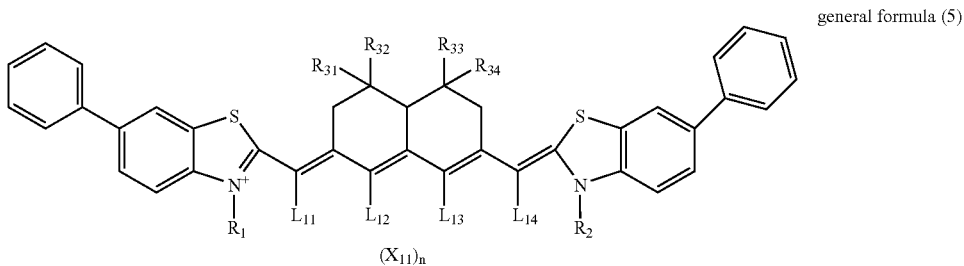

general formula (5)

Wherein the $L_11$ to the $L_{14}$ in the general formula (5) are synonymous with the $L_{11}$ to the $L_{14}$ in the general formula (1); the $R_1$ and the $R_2$ in the general formula (5) are synonymous with the $R_1$ and the $R_2$ in the general formula (1); the $X_{11}$ in the general formula (5) is synonymous with the $X_{11}$ in the general formula (1); the n in the general formula (5) is synonymous with the n in the general formula (1); and the $R_{31}$ to the $R_{34}$ represent each independently a hydrogen atom, an alkyl group or an aryl group.

According to the material of first aspect, the compound represented by the general formula (2) is preferably a compound represented by the following general formula (6).

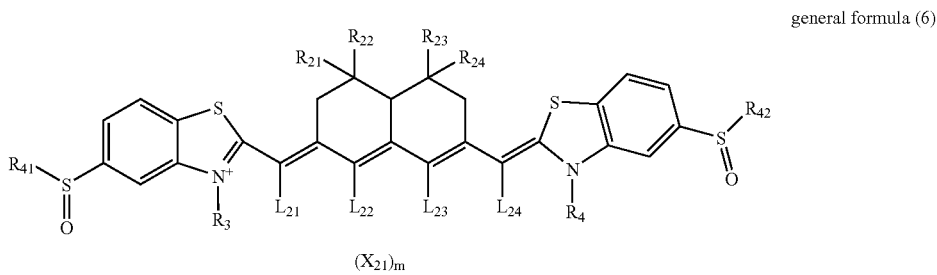

general formula (6)

Wherein the $L_{21}$ to the $L_{24}$ in the general formula (6) are synonymous with the $L_{21}$ to the $L_{24}$ in the general formula (2); the $R_3$ and the $R_4$ in the general formula (6) are synonymous with the $R_3$ and the $R_4$ in the general formula (2); the $X_{21}$ in the general formula (6) is synonymous with the $X_{21}$ in the general formula (2); and the m in the general formula (6) is synonymous with the m in the general formula (2); the $R_{21}$ to the $R_{24}$ in the general formula (6) are synonymous with the $R_{21}$ to the $R_{24}$ in the general formula (2); and the $R_{41}$ and the $R_{42}$ represent each independently an unsubstituted lower alkyl group, a cycloalkyl group, an aralkyl group, an aryl group or a heterocyclic group.

The material according to the first aspect preferably comprises a compound represented by the following general formula (7).

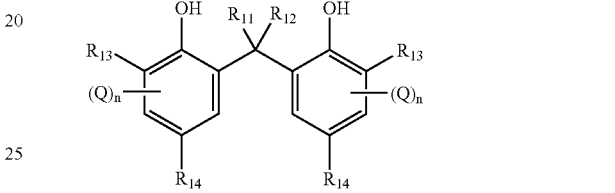

general formula (7)

Wherein the $R_{11}$ and the $R_{12}$ represent each independently hydrogen atom, 3- to 10-membered nonaromatic cyclic group or 5- or 6-memberd aromatic cyclic group; the $R_{13}$ and the $R_{14}$ represent each independently hydrogen atom, alkyl group; aryl group or a heterocyclic group, the Q represents a substituent on the benzene ring; n is 0 or an integer of 1 or 2; and the Q are same or different from one another when the Q is plural.

According to the material of the first aspect, the photosensitive silver halide is preferably chemically sensitized.

The material according to the first aspect comprises a photosensitive emulsion comprising the photosensitive silver halide and a non-photosensitive aliphatic silver carboxylate;

wherein the photosensitive silver halide is not contained in a synthesis of the non-photosensitive aliphatic silver halide, and is mixed with the non-photosensitive aliphatic silver carboxylate after a completion of the synthesis to prepare the photosensitive emulsion.

DETAILED DESCRIPTION OF THE PREFERRED EMBODIMENTS

Hereinbelow, the present invention is explained further in detail. The thermophotographic imaging material of the invention comprises photosensitive silver halide on at least one side of a support, and at least one of compounds represented by the above general formula (1).

In the general formula (1) as described above, $L_{11}$ to $L_{17}$ represent each independently hydrogen, a halogen atom, amino, alkylthio, arylthio, lower alkyl, lower alkoxy, aryloxy, aryl or a heterocycle; where the halogen atom includes fluorine, chlorine, bromine and iodine; amino includes substituted and unsubstituted amines, such as amino, dimethylamino, diphenylamino and methylphenylamino; alkylthio includes, for example, methylthio, ethylthio and benzylthio; arylthio includes substituted and unsubstituted arylthio groups, such as phenylthio and m-fluorophenylthio; the lower alkyl is a straight-chain or branched alkyl having carbon atoms not more than 5, that is specifically methyl, ethyl, propyl, butyl, pentyl, isopropyl and the like; the lower alkoxy is an alkoxy containing carbon atoms not more than 4, that is specifically methoxy, ethoxy, propoxy, isopropoxy and the like; aryloxy includes substituted and unsubstituted aryloxy groups, that are specifically phenoxy, p-tolyloxy, m-carboxyphenyloxy and the like; aryl includes substituted and unsubstituted aryl groups, for example, phenyl, 2-naphthyl, 1-naphthyl, o-tolyl, o-methoxyphenyl, m-chlorophenyl, m-bromophenyl, p-tolyl and p-ethoxyphenyl; and the heterocycle includes substituted and unsubstituted heterocycles, for example, 2-furyl, 5-methyl-2-furyl, 2-thienyl, 2-imidazolyl, 2-methyl-1-imidazolyl, 4-phenyl-2-thiazolyl, 5-hydroxy-2-benzothiazolyl, 2-pyridyl and 1-pyrrolyl. These groups as recited above can have a substituent of any of phenyl, halogen, alkoxy, hydroxy and the like. The substituents to be substituted on the above-recited groups are preferably hydrogen, lower alkyl, a halogen atom or aryl, and more preferably lower alkyl or aryl.

$L_{11}$ and $L_{12}$, $L_{12}$ and $L_{13}$, $L_{13}$ and $L_{14}$, $L_{15}$ and $L_{16}$, and $L_{16}$ and $L_{17}$, can bond with each other respectively, to form 5- to 7-membered rings, and $L_{11}$ to $L_{17}$ each represents a nonmetal atom required for forming a 5- to 7-membered ring. The 5- to 7-membered rings to be formed include, for example, a cyclopentene ring, a cyclohexene ring, a cycloheptene ring and a decalin ring. In addition, any of these rings can further have a substituent of lower alkyl, lower alkoxy and aryl, which are exemplified for $L_{11}$ to $L_{17}$ in the above. Among the aforementioned rings, it is preferable to form a cyclopentene ring or a decalin ring, and more preferably a decalin ring.

$R_1$ and $R_2$ represent each independently an aliphatic group. The aliphatic group includes, for example, straight-chain or branched alkyls each containing 1 to 30 carbon atoms (including methyl, ethyl, propyl, butyl, pentyl, isopentyl, 2-ethylhexyl, octyl, decyl and the like), alkenyls each containing 3 to 30 carbon atoms (including 2-propenyl, 3-butenyl, 1-methyl-3-propenyl, 3-pentenyl, 1-methyl-3-butenyl, 4-hexenyl and the like), and aralkyls each containing 7 to 30 carbon atoms (including benzyl, phenetyl and the like). Among the groups recited above, preferred are straight-chain alkyls each containing 1 to 20 carbon atoms or alkenyls each containing 3 to 20 carbon atoms.

The aliphatic groups exemplified above can further include substituents, and such substituents include, for example, a halogen atom (e.g., fluorine, chlorine, bromine, etc.), vinyl, aryl, (e.g., phenyl, p-tolyl, p-bromophenyl, etc.), trifluoromethyl, alkoxy (e.g., methoxy, ethoxy, methoxyethoxy, etc.), aryloxy (e.g., phenoxy, p-tolyloxy, etc.), cyano, sulfonyl (e.g., methanesulfonyl, trifluoromethanesulfonyl, p-toluenesulfonyl, etc.), alkoxycarbonyl (e.g., ethoxycarbonyl, butoxycarbonyl, etc.), amino (e.g., amino, biscarboxymethylamino, etc.), a heterocyclic group (e.g., tetrahydrofurfuryl, 2-pyrrolidinone-1-yl, etc.), acyl (e.g., acetyl, benzoyl, etc.), ureido (e.g., ureido, 3-methylureido, 3-phenylureido, etc.), thioureido (e.g., thioureido, 3-methylthioureido, etc.), alkylthio (e.g., methylthio, ethylthio, etc.), arylthio (e.g., phenylthio, etc.), heterocyclic thio (e.g., 2-thienylthio, 3-thienylthio, 2-imidazolylthio, etc.), carbonyloxy (e.g., acetyloxy, propanoyloxy, benzoyloxy, etc.), acylamino (e.g., acetylamino, benzoylamino, etc.), thioamide (e.g., thioacetoamide, thiobenzoylamino, etc.), sulfo, carboxy, phosphono, sulfato, hydroxy, mercapto, sulfino, carbamoyl (e.g., carbamoyl, N-methylcarbamoyl, N,N-tetramethylenecarbamoyl, etc.), sulfamoyl (e.g., sulfamoyl, N,N-3-oxapentamethyleneaminosulfonyl, etc.), sulfonamide (e.g., methanesulfonamide, butanesulfonamide, etc.), sulfonylaminocarbonyl (e.g., methanesulfonylaminocarbonyl, ethanesulfonylaminocarbonyl, etc.), acylaminosulfonyl (e.g., acetoamidesulfonyl, methoxyacetoamidesulfonyl, etc.), acylaminocarbonyl (e.g., acetoamidecarbonyl, methoxyacetoamidecarbonyl, etc.), and sulfinylaminocarbonyl (e.g., methanesulfinylaminocarbonyl, ethanesulfinylaminocarbonyl, etc.). Among the groups exemplified above, the preferred are vinyl, aryl, a heterocycle, cyano, sulfonyl, acyl, ureido, thioureido, alkylthio, heterocyclic thio, carbonyloxy, acylamino, thioamide, carboxy, hydroxy, mercapto, carbamoyl, sulfamoyl, sulfonamide and acylaminocarbonyl, and the more preferred are vinyl, aryl, cyano, acyl, alkylthio, carbonyloxy, acylamino and hydroxy.

Further, $R_1$ and $L_{11}$, and $R_2$ and $L_{14}$ can bond with each other to form a 5- or 7-membered cyclic structure, respectively.

$Ar_1$ and $Ar_2$ represent each independently aryl or a heterocycle. Aryl includes substituted and unsubstituted aryl groups including, for example, phenyl, 2-naphthyl, 1-naphthyl, o-tolyl, o-methoxyphenyl, m-chlorophenyl, m-bromophenyl, p-tolyl, p-ethoxyphenyl and the like. The heterocycle includes substituted and unsubstituted heterocycles including, for example, 2-furyl, 5-methyl-2-furyl, 2-thienyl, 2-imidazolyl, 2-methyl-1-imidazolyl, 4-phenyl-2-thiazolyl, 5-hydroxy-2-benzothiazolyl, 2-pyridyl, 1-pyrrolyl and the like. The above-recited groups can include the substituents as exemplified for $R_1$ and $R_2$ in the above. Among the groups described above, the preferred is aryl, and the more preferred is phenyl.

In the general formula (1), when a group having electric charges of either cations or anions has been substituted, pairing ions are formed from the equivalent of the cations or the anions so that the electric charges in the molecules are offset. For example, in case of ions required to offset the electric charges in the molecules represented by $X_{11}$, examples of the cation include specifically protons, organic ammonium ions (e.g., ions of each of triethylammonium, triethanolammonium, pyridinium, etc.), and inorganic cations (e.g., cations of each of lithium, sodium, potassium, etc.), and examples of the acid anions include specifically halogen ions (e.g., chlorine ions, bromine ions, iodine ions, etc.), p-toluenesulfonic acid ions, perchloric acid ions, boron tetrafluoride ions, sulfuric acid ions, methylsulfuric acid ions, ethylsulfuric acid ions, methanesulfonic acid ions, trifluoromethanesulfonic acid ions, hexafluorophophoric acid ions and the like. In the formula (1), n denotes the number of ions required for offsetting the electric charges in the molecules.

The photothermographic imaging material of the invention comprises at least one of compounds represented by the above general formula (2).

In the general formula (2), $L_{21}$ to $L_{24}$ represent each independently hydrogen, a halogen atom, amino, alkylthio, arylthio, lower alkyl, lower alkoxy, aryloxy, aryl or a heterocycle, where the halogen atom includes fluorine, chlorine, bromine and iodine; amino includes substituted or unsubstituted, that is, for example, amino, dimethylamino, diphenylamino and methylphenylamino; alkylthio includes, for example, methylthio, ethylthio, benzylthio; arylthio includes substituted or unsubstituted arylthio groups, that is, for example, phenylthio and m-fluorophenylthio; the lower alkyl includes straight-chain or branched alkyl groups each containing carbon atoms not more than 5, that is specifically methyl, ethyl, propyl, butyl, pentyl, isopropyl and the like; the lower alkoxy includes alkoxy groups each containing carbon atoms not more than 4, that is specifically methoxy, ethoxy, propoxy, isopropoxy and the like; aryloxy includes substituted and unsubstituted aryloxy groups, that is specifically phenoxy, p-tolyloxy, m-carboxyphenyloxy and the like; aryl includes substituted and unsubstituted aryl groups, that is, for example, phenyl, 2-naphthyl, 1-naphthyl, o-tolyl, o-methoxyphenyl, m-chlorophenyl, m-bromophenyl, p-tolyl, and p-ethoxyphenyl; and the heterocyclic group includes substituted and unsubstituted heterocycles, that is, for example, 2-furyl, 5-methyl-2-furyl, 2-thienyl, 2-imidazolyl, 2-methyl-1-imidazolyl, 4-phenyl-2-thiazolyl, 5-hydroxy-2-benzothiazolyl, 2-pyridyl and 1-pyrrolyl. Any of the above-exemplified groups can have a substituent such as phenyl, halogen, alkoxy and hydroxy. It is preferable for $L_{21}$ to $L_{24}$ to be hydrogen, lower alkyl, aryl or a heterocycle, and more preferably hydrogen, methyl or phenyl.

$L_{21}$ and $L_{22}$, $L_{22}$ and $L_{23}$ and $L_{23}$ and $L_{24}$ can bond with each other respectively, to form a 5- to 7-membered ring, where $L_{21}$ to $L_{24}$ each represent a nonmetal atom required for forming a 5- to 7-membered ring. Examples of the 5- to 7-membered rings include, for example, a cyclopentene ring, a cyclohexene ring, a cycloheptene ring, a decalin ring and the like. These rings can be substituted with lower alkyl, lower alkoxy or aryl, those which are exemplified for $L_{21}$ to $L_{24}$ in the above. It is preferable for the 5- to 7-membered ring to be a cyclopentene ring or a decalin ring, and more preferably a decalin ring.

$R_3$ and $R_4$ represent each independently an aliphatic group. Examples of the aliphatic group include, for example, branched or straight-chain alkyl containing 1 to 30 carbon atoms (e.g., methyl, ethyl, propyl, butyl, pentyl, isopentyl, 2-ethylhexyl, octyl, decyl and the like), alkenyl containing 3 to 30 carbon atoms (e.g., 2-propenyl, 3-butenyl, 1-methyl-3-propenyl, 3-pentenyl, 1-methyl-3-butenyl, 4-hexenyl and the like), and aralkyl containing 7 to 30 carbon atoms (e.g., benzyl, phenetyl and the like). It is preferable for the aliphatic group to be branched or straight-chain alkyl containing 1 to 20 carbon atoms or alkenyl containing 3 to 20 carbon atoms.

The above-described aliphatic groups can further include substituents, and examples of such substituents are same as those exemplified for $R_1$ and $R_2$ in the general formula (1).

Furthermore, $R_3$ and $L_{21}$, and $R_4$ and $L_{24}$ can bond with each other, respectively, to form a 5- or 7-membered cyclic structure.

In the general formula (2), when a group having electric charges of either cations or anions has been substituted, pairing ions are formed from the equivalent of the cations or the anions so that the electric charges in the molecules are offset. For example, in case of ions required to offset the electric charges in the molecules represented by $X_{21}$, examples of the cation include specifically protons, organic ammonium ions (e.g., ions of each of triethylammonium, triethanolammonium, pyridinium, etc.), and inorganic cations (e.g., ions of each of lithium, sodium, potassium, etc.), and examples of the acid anions include specifically halogen ions (e.g., chlorine ions, bromine ions, iodine ions, etc.), p-toluenesulfonic acid ions, perchloric acid ions, boron tetrafluoride ions, sulfuric acid ions, methylsulfuric acid ions, ethylsulfuric acid ions, methanesulfonic acid ions, trifluoromethanesulfonic acid ions, hexafluorophophoric acid ions and the like. In the formula (2), m denotes the number of ions required for offsetting the electric charges in the molecules.

$R_{21}$ to $R_{24}$ represent each independently hydrogen, alkyl or aryl, where, specifically, alkyl is preferably alkyl containing 1 to 10 carbon atoms. Specific examples of alkyl include methyl, ethyl, propyl, isopropyl, butyl, t-butyl, pentyl, neo-pentyl, 2-ethylhexyl, octyl, decyl, cyclohexyl, cycloheptyl, 1-methylcyclohexyl, ethenyl-2-propenyl, 3-butenyl, 1-methyl-3-propenyl, 3-pentenyl, 1-methyl-3-butenyl, 1-cycloalkenyl, 2-cycloalkenyl, ethynyl, 1-propynyl and the like. Specific examples of aryl include phenyl, naphthyl, anthranil and the like. It is preferable for $R_{21}$ to $R_{24}$ to be hydrogen or alkyl, and more preferably hydrogen or methyl.

The above-described groups can further include substituents. Examples of such substituents include the same substituents exemplified for $R_1$ and $R_2$ in the general formula (1) in the above.

$R_{25}$ to $R_{32}$ represent groups capable of being substituted to a benzene ring. Specific examples of such groups include alkyl (e.g., methyl, ethyl, butyl, isobutyl, etc.), aryl (including monocyclic and polycyclic aryl groups, for example, phenyl, carboxyphenyl, p-tolyl, p-butylphenyl, naphthyl, etc.), a heterocycle (for example, any of tetrahydrofuryl, 2-pyrrolidinone-1-yl, thienyl, furyl, pyridyl, carbazolyl, pyrrolyl, indolyl, etc.), a halogen atom (for example, fluorine, chlorine, bromine, etc.), vinyl, trifluoromethyl, alkoxy (for example, methoxy, ethoxy, methoxyethoxy, etc.), aryloxy (for example, phenoxy, p-tolyloxy, etc.), sulfonyl (for example, methanesulfonyl, p-toluenesulfonyl, etc.), alkoxycarbonyl (for example, ethoxycarbonyl, butoxycarbonyl, etc.), amino (for example, amino, biscarboxymethylamino, etc.), acyl (for example, acetyl, benzoyl, etc.), ureido (for example, ureido, 3-methylureido, 3-phenylureido, etc.), thioureido (for example, thioureido, 3-methylthioureido, etc.), alkylthio (for example, methylthio, ethylthio, etc.), arylthio (for example, phenylthio, etc.), sulfinyl (for example, methanesulfinyl, ethanesulfinyl, phenylsulfinyl, etc.), hydroxy, styryl, and acylamino (for example, acetylamino, benzoylamino, etc.). Furthermore, the groups exemplified above can further have a substituent of any of these groups. The preferred groups for $R_{25}$ to $R_{32}$ is alkyl, aryl, a heterocycle, a halogen atom, alkylthio, arylthio or sulfinyl, and more preferred is sulfinyl. Besides, $R_{25}$ and $R_{26}$, $R_{26}$ and $R_{27}$, $R_{27}$ and $R_{28}$, $R_{29}$ and $R_{30}$, $R_{30}$ and $R_{31}$ and $R_{31}$ and $R_{32}$ can bond with each other, respectively, to form a cyclic structure. Note that, however, $R_{27}$ is neither aryl nor a heterocycle.

In the photothermographic imaging material of the invention, the compound represented by the above general formula (1) is the compound represented by the above formula (3).

In the general formula (3), $L_{11}$ to $L_{17}$ are synonymous with $L_{11}$ to $L_{17}$ in the general formula (1). Also, $R_1$ and $R_2$ are synonymous with $R_1$ and $R_2$ in the general formula (1).

Similarly, $X_{11}$ is synonymous with $X_{11}$ in the general formula (1), and n is synonymous with n in the general formula (1).

$Ar_3$ and $Ar_4$ represent each independently aryl, and examples of this aryl include substituted and unsubstituted aryl groups, that is phenyl, 2-naphthyl, 1-naphthyl, o-tolyl, o-methoxyphenyl, m-chlorophenyl, m-bromophenyl, p-tolyl, p-ethoxyphenyl and the like. The preferred for $Ar_3$ and $Ar_4$ are phenyl.

In the photothermographic imaging material of the invention, the compound represented by the above general formula (1) is the compound represented by the above formula (4).

In the general formula (4), $L_{11}$ to $L_{17}$ are synonymous with $L_{11}$ to $L_{17}$ in the general formula (1). Also, $R_1$ and $R_2$ are synonymous with $R_1$ and $R_2$ in the general formula (1).

Similarly, $X_{11}$ is synonymous with $X_{11}$ in the general formula (1), and n is synonymous with n in the general formula (1).

In the photothermographic imaging material of the invention, the compound represented by the above general formula (1) is the compound represented by the above formula (5).

In the general formula (5), $L_{11}$ to $L_{14}$ are synonymous with $L_{11}$ to $L_{14}$ in the general formula (1). Also, $R_1$ and $R_2$ are synonymous with $R_1$ and $R_2$ in the general formula (1).

Similarly, $X_{11}$ is synonymous with $X_{11}$ in the general formula (1), and n is synonymous with n in the general formula (1).

$R_{31}$ to $R_{34}$ represent each independently hydrogen, alkyl or aryl. Specifically, it is preferable for the alkyl to be alkyl containing 1 to 10 carbon atoms. Specific examples of $R_{31}$ to $R_{34}$ include methyl, ethyl, propyl, isopropyl, butyl, t-butyl, pentyl, neo-pentyl, 2-ethylhexyl, octyl, decyl, cyclohexyl, cycloheptyl, 1-methylcyclohexyl, ethenyl-2-propenyl, 3-butenyl, 1-methyl-3-propenyl, 3-pentenyl, 1-methyl-3-butenyl, 1-cycloalkenyl, 2-cycloalkenyl, ethynyl, 1-propynyl and the like. Specific examples of aryl include phenyl, naphthyl, anthranil and the like. The above-exemplified groups can include further substituents, and examples of such substituents are synonymous with $R_1$ and $R_2$ in the general formula (1). The preferred for $R_{31}$ to $R_{34}$ is hydrogen, methyl or phenyl, and more preferred is hydrogen.

In the photothermographic imaging material of the invention, the compound represented by the above general formula (1) is the compound represented by the above formula (6).

In the general formula (6), $L_{21}$ to $L_{24}$ are synonymous with $L_{21}$ to $L_{24}$ in the general formula (2). Also, $R_3$ and $R_4$ are synonymous with $R_3$ and $R_4$ in the general formula (2).

Similarly, $X_{21}$ is synonymous with $X_{21}$ in the general formula (2), and m is synonymous with m in the general formula (2). Also, $R_{21}$ to $R_{24}$ are synonymous with $R_{21}$ to $R_{24}$ in the general formula (2).

$R_{41}$ and $R_{42}$ represent each independently unsubstituted lower alkyl, cycloalkyl, aralkyl, aryl or a heterocycle. The unsubstituted lower alkyl is a straight-chain or branched alkyl containing carbon atoms not more than 5, that is specifically methyl, ethyl, propyl, butyl, pentyl, isopropyl, or the like. Examples of cycloalkyl include, cyclopropyl, cyclobutyl, cyclopentyl, and the like. Examples of aralkyl include, benzyl, phenetyl, p-methoxyphenylmethyl, o-acetylaminophenylethyl and the like. Examples of aryl include substituted and unsubstituted aryl groups, such as phenyl, 2-naphthyl, 1-naphthyl, o-tolyl, o-methoxyphenyl, m-chlorophenyl, m-bromophenyl, p-tolyl, p-ethoxyphenyl and the like. Examples of the heterocycle include substituted and unsubstituted heterocycles, such as 2-furyl, 5-methyl-2-furyl, 2-thienyl, 2-imidazolyl, 2-methyl-1-imidazolyl, 4-phenyl-2-thiazolyl, 5-hydroxy-2-benzothiazolyl, 2-pyridyl, 1-pyrrolyl and the like. The above-exemplified groups can further have substituents, such as phenyl, halogen, alkoxy, hydroxy and the like. The preferred for $R_{41}$ and $R_{42}$ is unsubstituted lower alkyl or aryl, and the more preferred is methyl, ethyl or phenyl.

The specific examples of the compound represented by the general formulas (1) and (3) are exemplified below. However, it should be noted that the present invention is not limited to the compounds exemplified thereto.

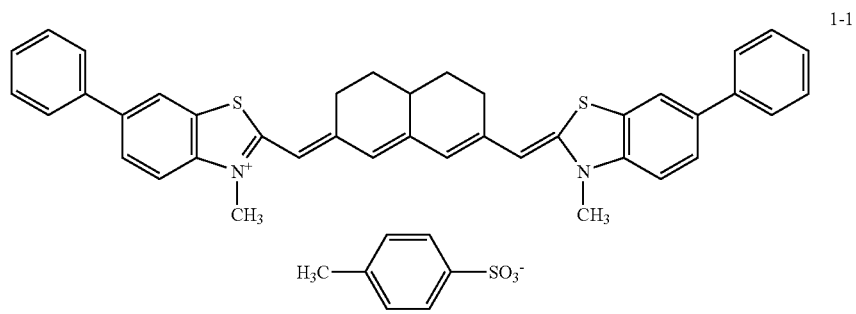

1-1

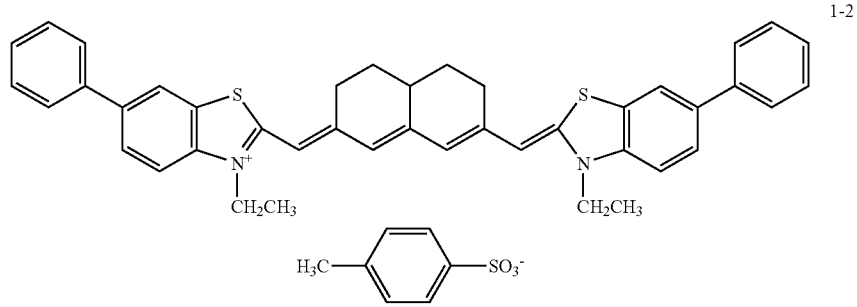

1-2

-continued
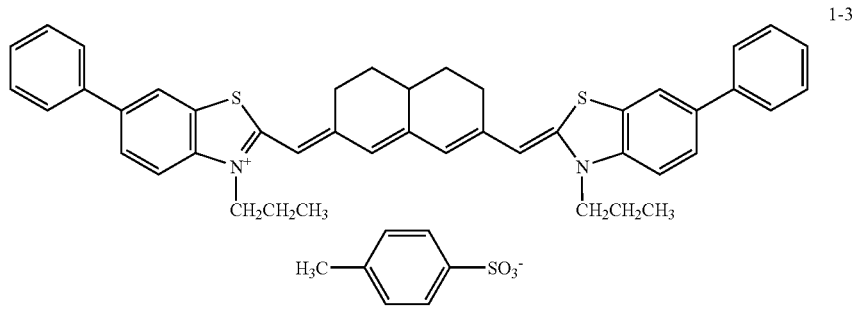
1-3
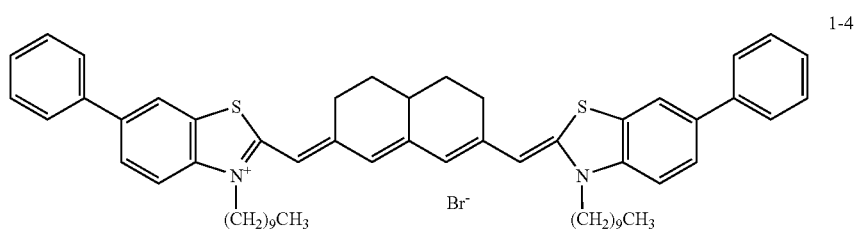
1-4
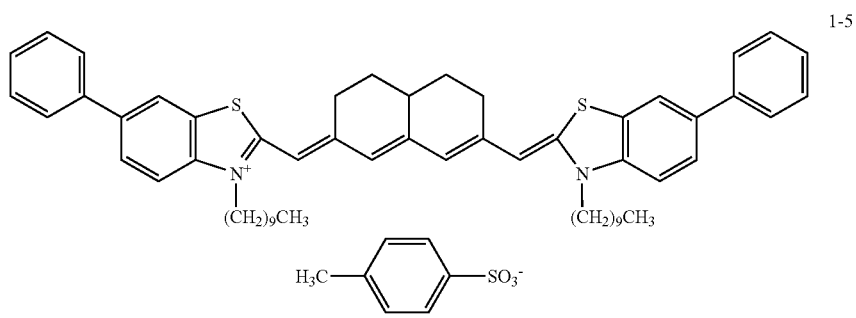
1-5
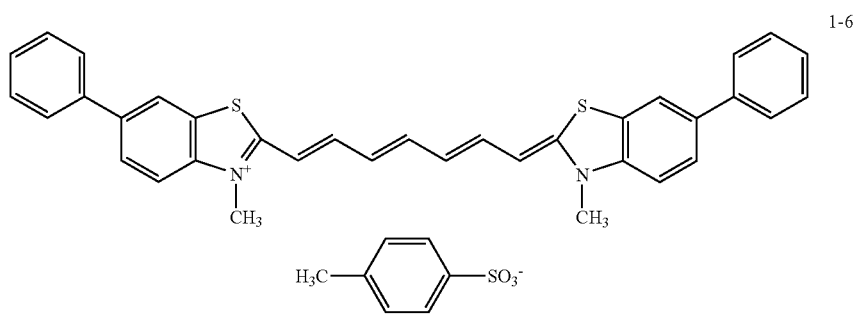
1-6

-continued
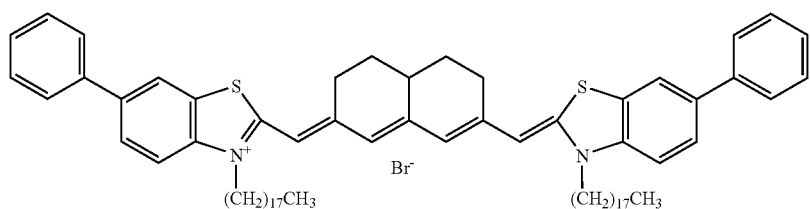
1-7
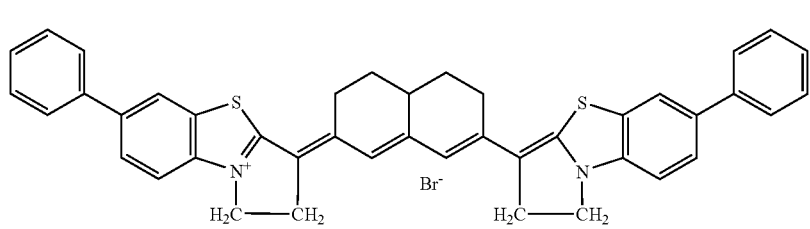
1-8
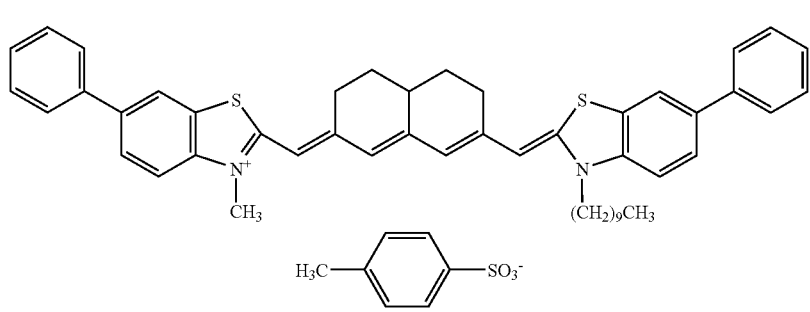
1-9
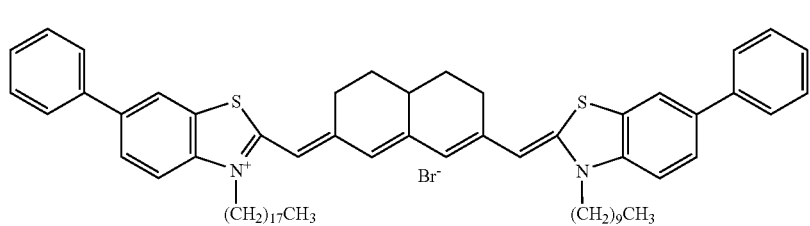
1-10
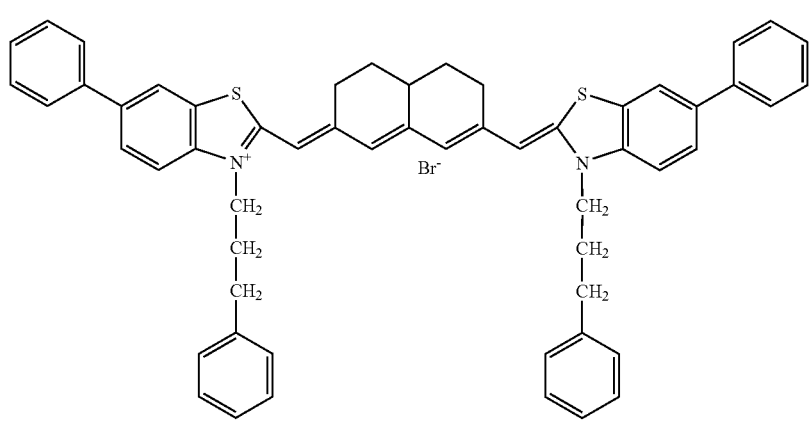
1-11

-continued
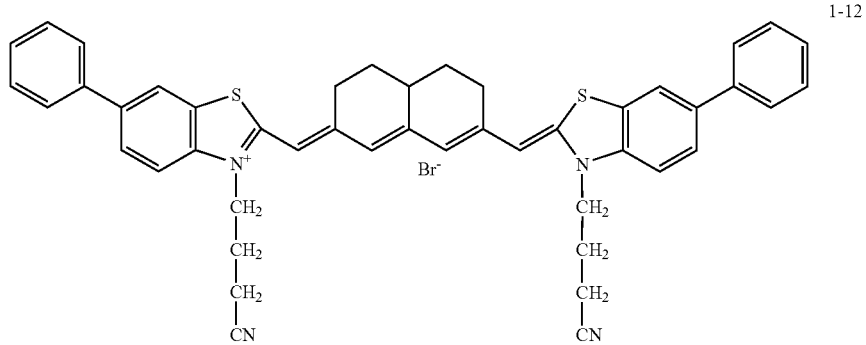
1-12
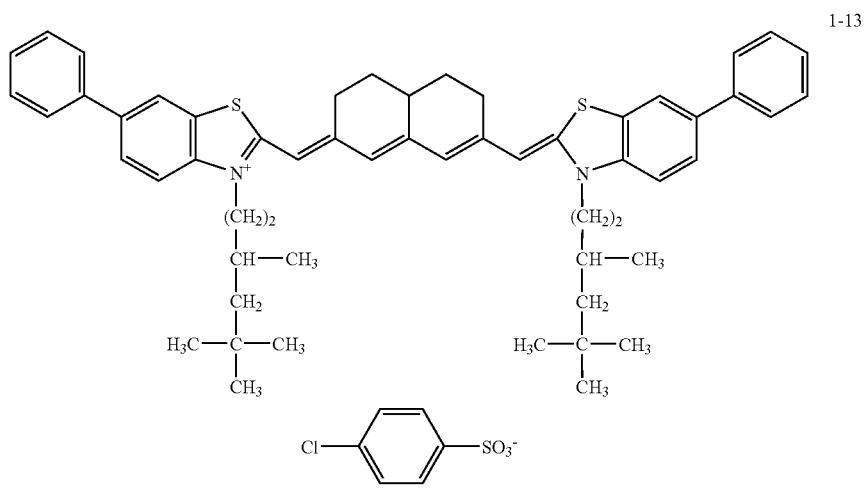
1-13
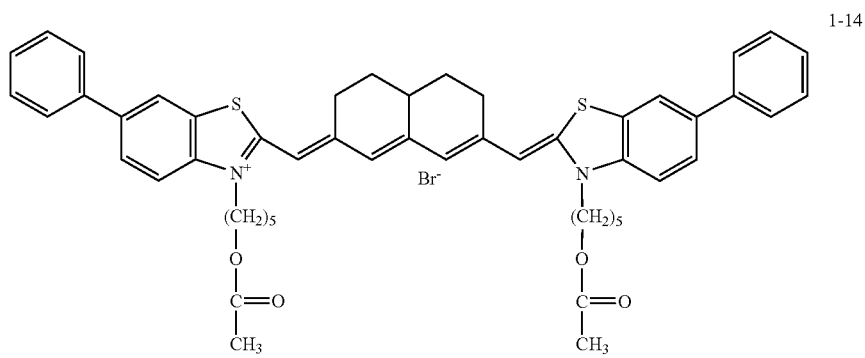
1-14
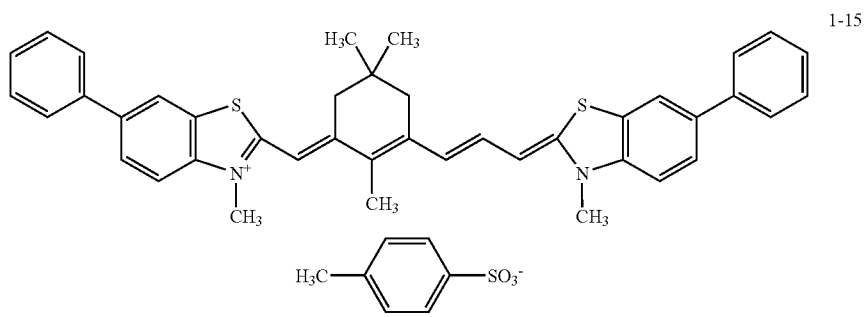
1-15

-continued
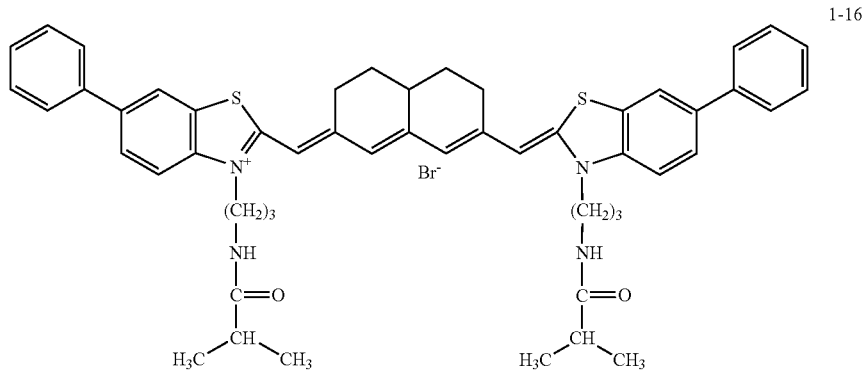
1-16
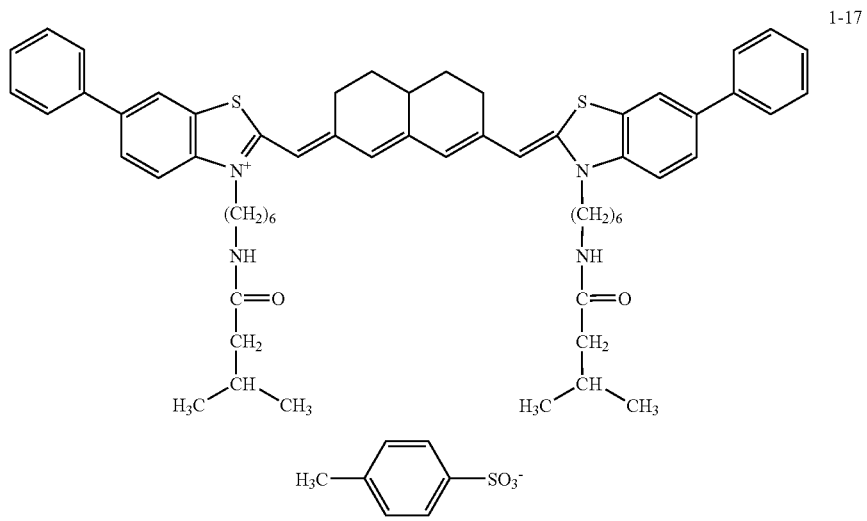
1-17
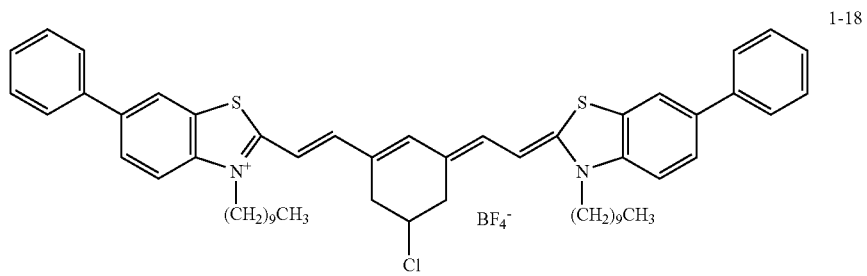
1-18
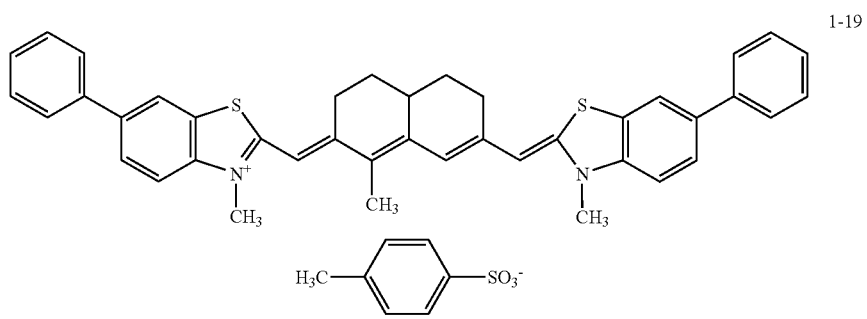
1-19

-continued
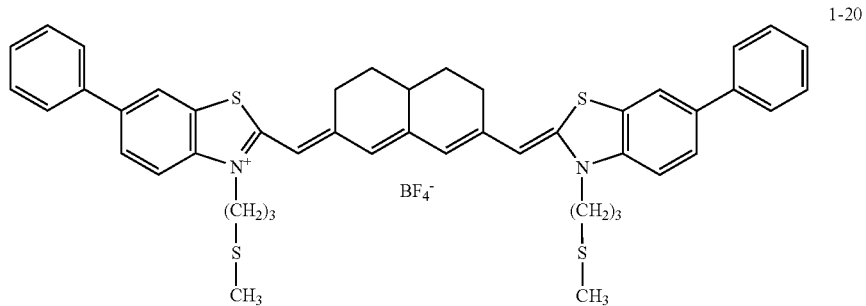
1-20
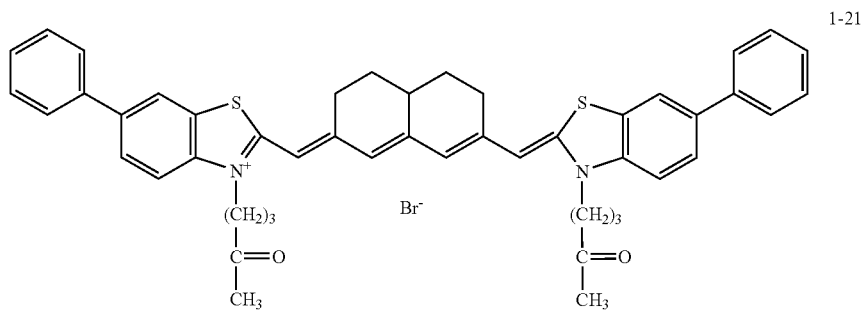
1-21
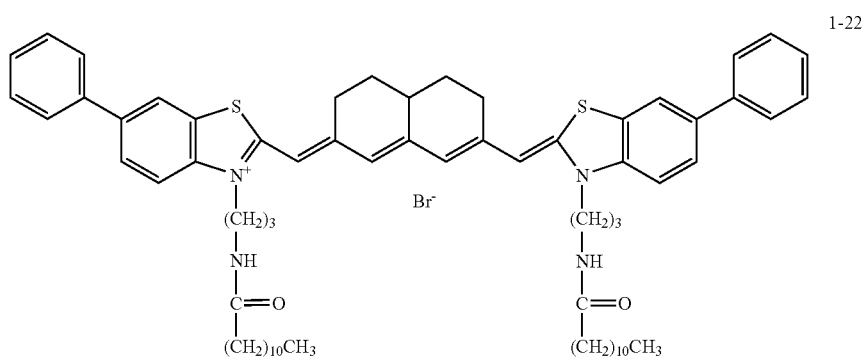
1-22
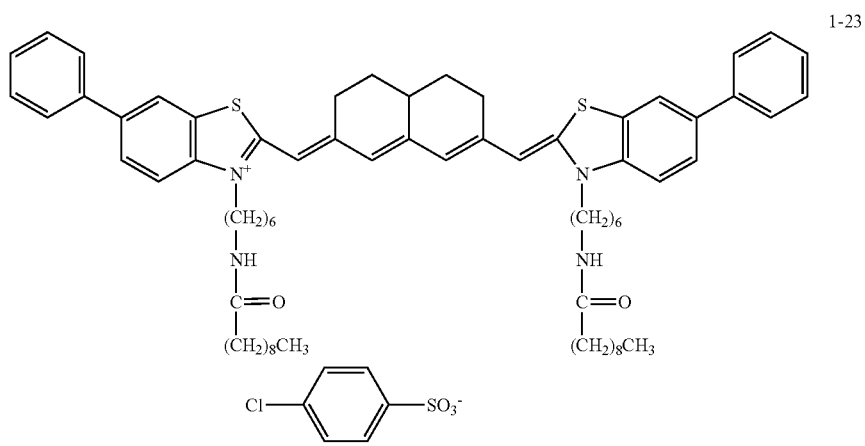
1-23
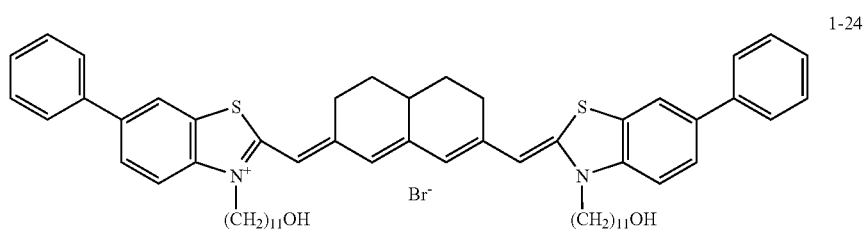
1-24

-continued
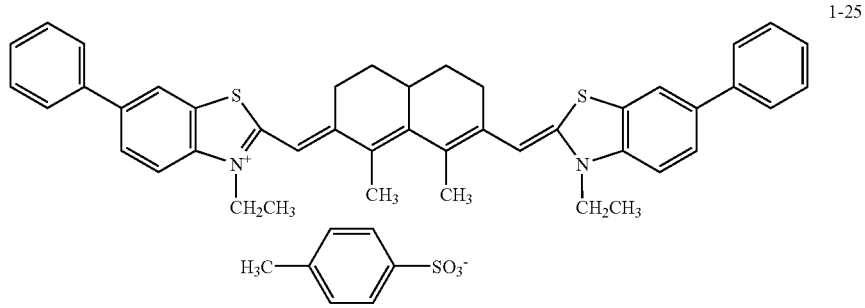
1-25
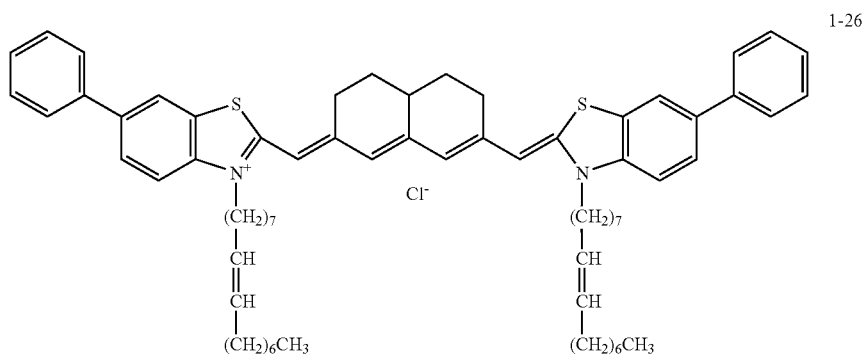
1-26
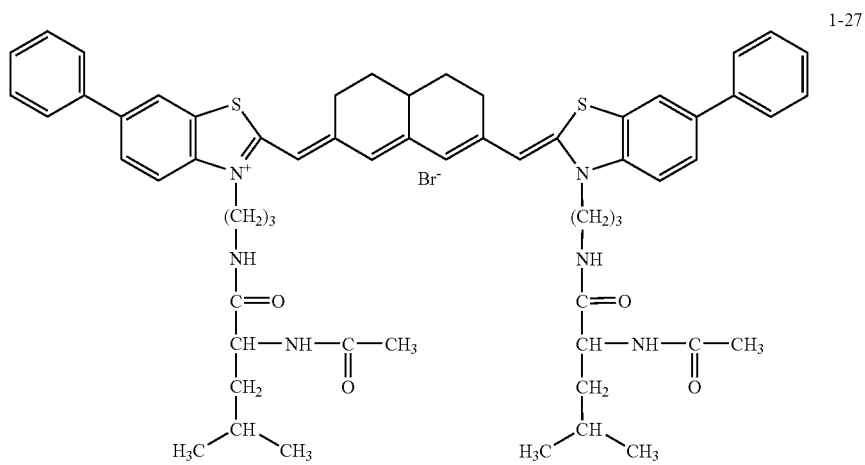
1-27
Specific examples of the compounds represented by the general formulas (2) and (4) are exemplified below. However, it should be noted that the present invention is not limited to the compounds thereto.
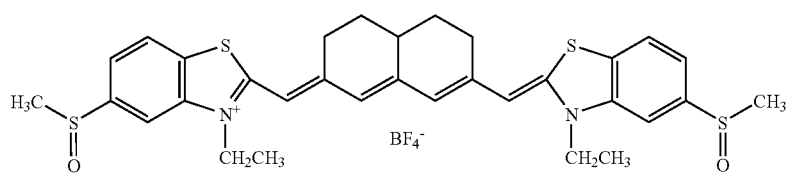
2-1

-continued
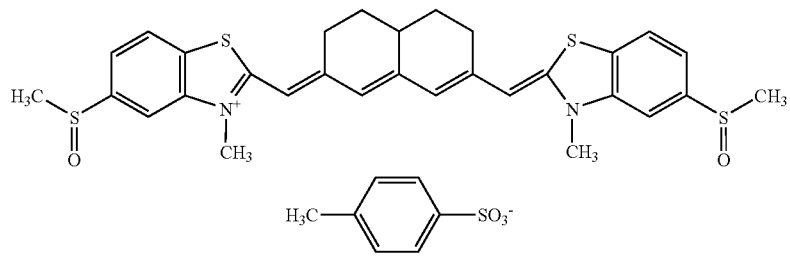
2-2
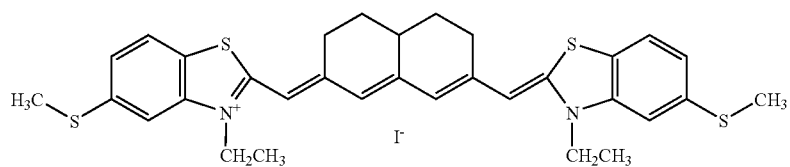
2-3
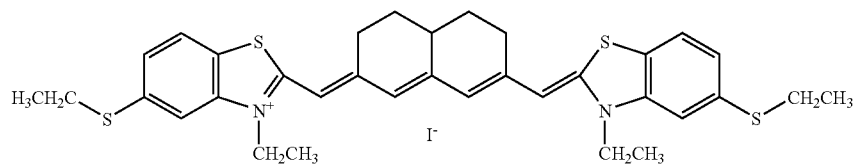
2-4
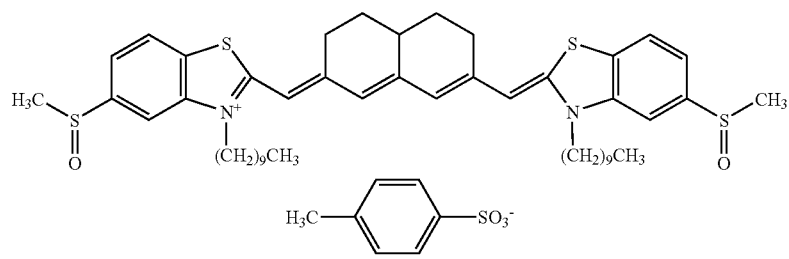
2-5
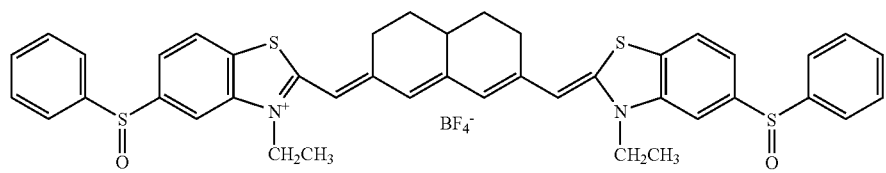
2-6
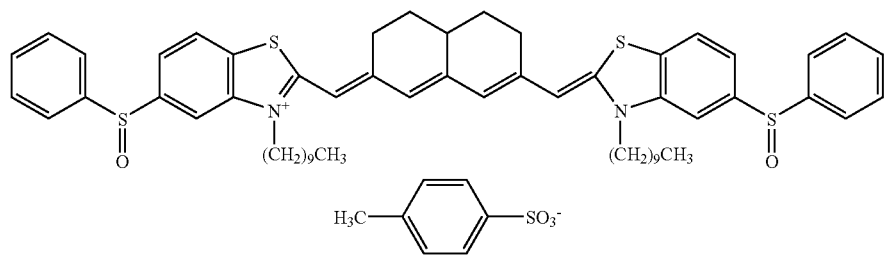
2-7

-continued
2-8
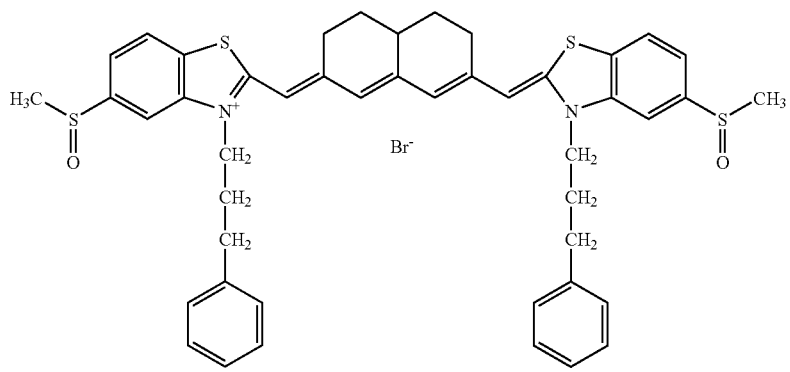
2-9
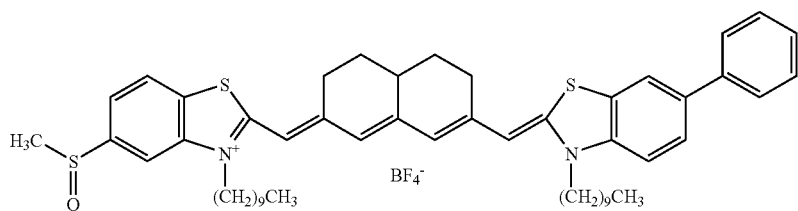
2-10
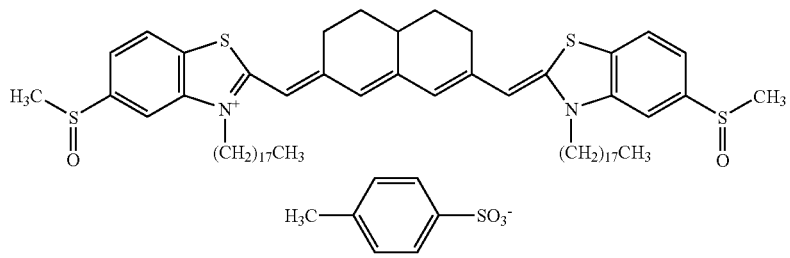
2-11
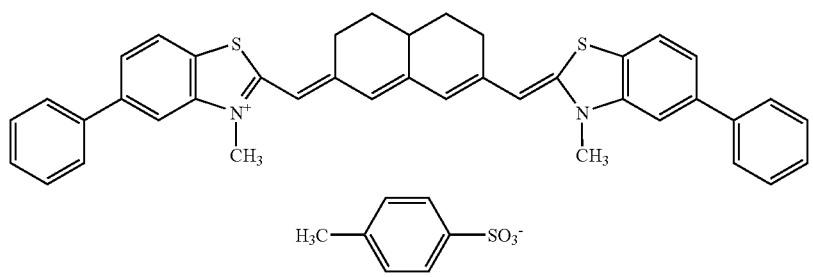
2-12 2-13
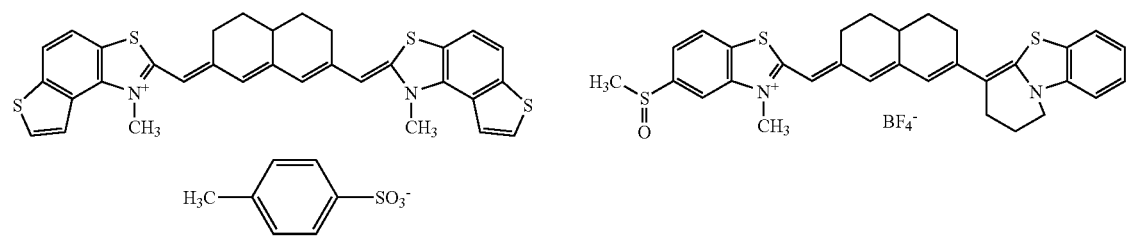

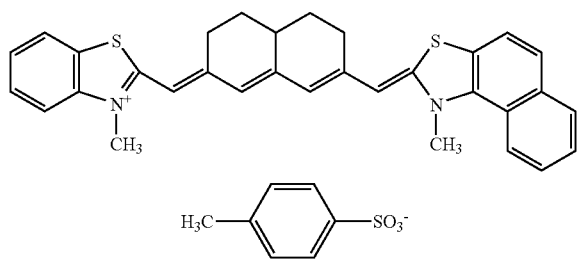
2-14
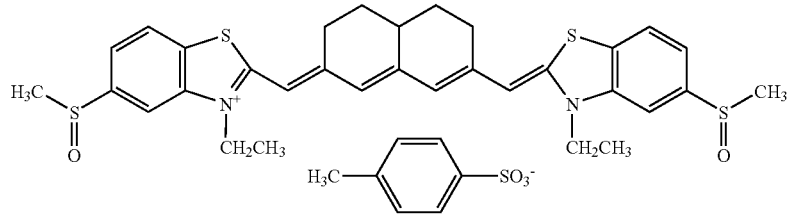
2-15
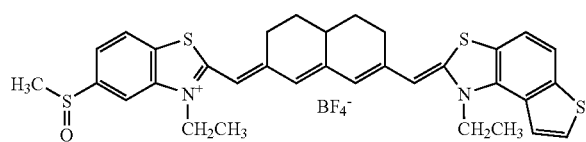
2-16
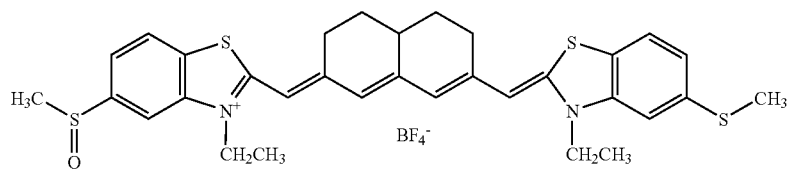
2-17
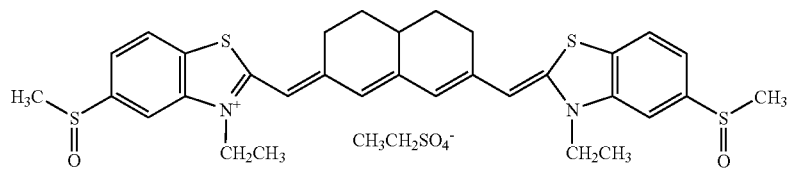
2-18
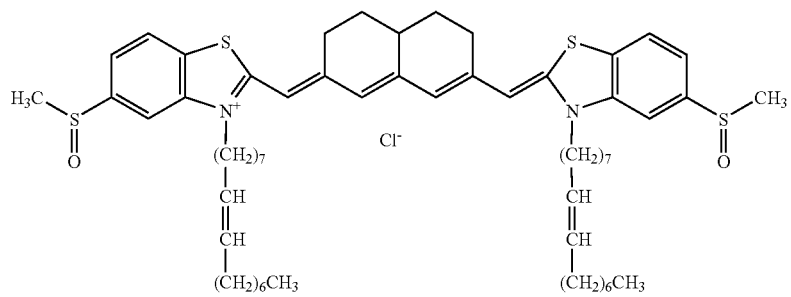
2-19

-continued

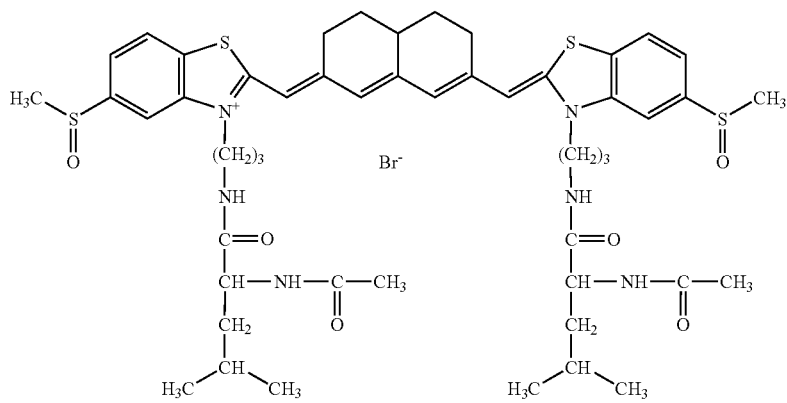

2-20

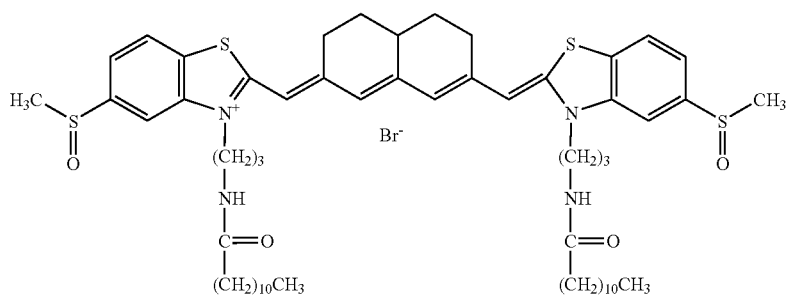

2-21

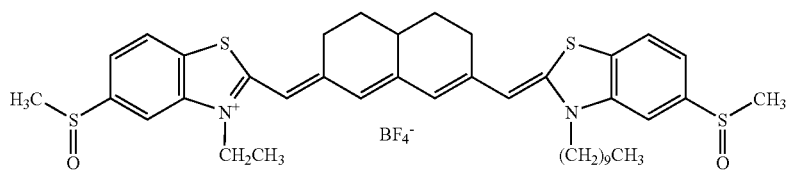

2-22

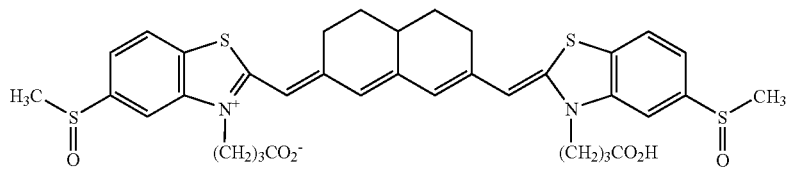

2-23

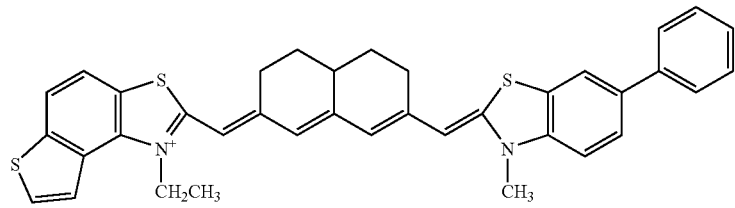

2-24

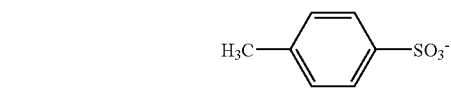

The compounds (herein, also referred to as either infrared sensitizing colorants or sensitizing colorants) represented by the general formulas (1) to (6) according to the present invention can be easily synthesized according to the processes described in, for example, F. M. Harmer, The Chemistry of Heterocyclic Compounds, Vol. 18; The Cyanine Dyes and Related Compounds (Edited by A. Weissberger, Published by Interscience Inc., New York 1964); J. Ber., 64, 1664–1674 (1931); Ukrain. Khim. Zhur., 21, 744–749 (1955); and specifications of UK Patent No. 625,245; UK Patent No. 895,930; U.S. Pat. No. 2,320,439; and U.S. Pat. No. 2,398,999.

The time to add any of these infrared sensitizing colorants can be set at any stage following to the preparation of silver halide. For example, the infrared sensitizing colorant can be added in the state of solution in a solvent or in so-called solid-state dispersion state in which the colorant is dispersed in particulates to photosensitive emulsion containing either silver halide particles or a mixture of silver halide particles and organic silver salt particles. Alternatively, it is possible to add the infrared sensitizing colorant to silver halide particles prior to chemical sensitization to render the silver halide particles to absorb the colorant and then apply the chemical sensitization similarly to the case of a compound containing hetero atoms that has adsorption property to the silver halide. With such an application of chemical sensitization, it is possible to prevent the central core of the chemical sensitization from its dispersion and to achieve high photosensitivity and less fogging.

The sensitizing colorant is contained in the emulsion of silver halide at a rate in total of from $1 \times 10^{-6}$ to $5 \times 10^{-3}$ mol, preferably from $1 \times 10^{-5}$ to $2.5 \times 10^{-3}$ mol, and more preferably from $4 \times 10^{-5}$ to $1 \times 10^{-3}$ mol, relative to 1 mol of silver halide in both cases that the sensitizing colorant is used alone and it is used in combination.

The photothermographic imaging material according to the present invention contains a compound represented by the general formula (7). The compound represented by the general formula (7) is a reducing agent of silver ions, and it is particularly prefered that the compound is a bisphenol derivative.

The general formula (7) is described in detail.

In the general formula (7), $R_{11}$ and $R_{12}$ each independently represents hydrogen, a 3- to 10-membered nonaromatic cyclic group or a 5- or 6-membered aromatic cyclic group. Concrete examples of the 3- to 10-membered nonaromatic group include 3-membered cyclic groups, such as cyclopropyl, aziridyl and oxiranyl; 4-membered cyclic groups, such as cyclobutyl, cyclobutenyl, oxetanyl and azetidinyl; 5-membered cyclic groups, such as cyclopentyl, cyclopentenyl, cyclopentadienyl, tetrahydrofuranyl, pyrrolidinyl and tetrahydrothienyl; 6-membered cyclic groups, such as cyclohexyl, cyclohexenyl, cyclohexadienyl, tetrahydropyranyl, pyranyl, piperidinyl, dioxanyl, tetrahydrothiopyranyl, norcaranyl, norpinanyl and norbornyl; 7-membered cyclic groups, such as cycloheptyl, cycloheptynyl and cycloheptadienyl; 8-membered cyclic groups, such as cyclooctanyl, cyclooctenyl, cyclooctadienyl and cyclooctatrienyl; 9-membered cyclic groups, such as cyclononanyl, cyclononenyl, cyclononadienyl and cyclononatrienyl; and 10-membered cyclic groups, such as cyclodecanyl, cyclodecaenyl, cyclodecadienyl and cyclodecatrienyl.

The preferred are 3- to 6-membered nonaromatic cyclic groups, and more preferably 5- or 6-membered nonaromatic cyclic groups, and among those which, hydrocarbon rings containing no hetero atom are particularly preferred. The nonaromatic cyclic group can bond with the other ring through spiro atoms to form spiro bonds, or can be condensed in any manner with any of other rings including aromatic rings to form a ring. Further, the nonaromatic cyclic group can be substituted with arbitrary substituents on the ring. Note that the above hydrocarbon ring preferably includes therein an alkenyl skeleton or an alkynyl skeleton including bondings, such as —C=C— and —C≡C—.

Specific examples of the substituent include halogen atom, e.g. fluorine atom, chlorine atom and bromine atom; alkyl, e.g., methyl, ethyl, propyl, butyl, pentyl, isopentyl, 2-ethylhexyl, octyl and decyl; cycloalkyl, e.g., cyclohexyl and cycloheptyl; alkenyl, e.g., ethenyl-2-propenyl, 3-butenyl, 1-methyl-3-propenyl, 3-pentenyl and 1-methyl-3-butenyl; cycloalkenyl, e.g., 1-cycloalkenyl and 2-cycloalkenyl; alkynyl, e.g., ethynyl and 1-propinyl; alkoxy, e.g., methoxy, ethoxy and propoxy; alkylcarbonyloxy, e.g., acetyloxy; alkylthio, e.g., methylthio and trifluoromethythio; carboxyl; alkylcarbonylamino, e.g., acetylamino; ureido, e.g., methylaminocarbonylamino; alkylsulfonylamino, e.g., methanesulfonylamino; alkylsulfonyl, e.g., methanesulfonyl and trifluoromethanesulfonyl; carbamoyl, e.g., carbamoyl, N,N-dimethylcarbamoyl and N-morpholinocarbonyl; sulfamoyl, e.g., sulfamoyl, N,N-dimethylsulfamoyl and morpholinosulfamoyl; trifluoromethyl; hydroxyl; nitro; cyano; alkylsulfonamide, e.g., methanesulfonamide and butanesulfonamide; alkylamino, e.g., amino, N,N-dimethylamino and N,N-diethylamino; sulfo; phosphono; sulfite; sulfino; alkylsulfonylaminocarbonyl, e.g., methanesulfonylaminocarbonyl and ethanesulfonylaminocarbonyl; alkylcarbonylaminosulfonyl, e.g., acetoamidesulfonyl and methoxyacetoamidesulfonyl; alkynylaminocarbonyl, e.g., acetoamidecarbonyl and methoxyacetoamidecarbonyl; alkylsulfinylaminocarbonyl, e.g., methanesulfinylaminocarbonyl and ethanesulfinylaminocarbonyl; and the like. When the nonaromatic cyclic group is substituted by 2 or more substituents, they can be the same or different from one another. The particularly preferred substituent is alkyl.

The 5- or 6-membered aromatic cyclic group represented by $R_{11}$ and $R_{12}$ can include a single ring or a condensed ring, and the preferred are aromatic mono- or bicarbocycles containing 6 to 30 carbon atoms, e.g., benzene ring, naphthalene ring and the like. Among the carbocycles mentioned above, the one preferably used is benzene ring. The aromatic hetero ring preferably used is a 5- or 6-membered aromatic hetero ring that can include a condensed ring. A 5-membered aromatic hetero ring that can include a condensed ring is more preferably used. Examples of such a hetero ring preferably used include imidazole, pyrazole, thiophene, furan, pyrrole, pyridine, pyrimidine, pyrazine, pyridazine, triazole, triazine, indole, indazole, purine, thiadiazole, oxadiazole, quinoline, phthalazine, naphthylidine, quinoxaline, quinazoline, cinnoline, pteridine, acridine, phenanthroline, phenazine, tetrazole, thiazole, oxazole, benzimidazole, benzoxazole, benzothiazole, indolenine, and tetrazaindene, and the ones more preferably used are imidazole, pyrazole, thiophene, furan, pyrrole, triazole, thiadiazole, tetrazole, thiazole, benzimidazole and benzothiazole, and the ones particularly preferably used are thiophene, furan and thiazole. The above-enumerated hetero rings can be condensed with the other rings including aromatic rings in any manner. Further, the hetero rings described above can be substituted with arbitrary substituents. As such substituents, the same substituents described above for the 3- to 10-membered nonaromatic cyclic group can be given.

It will be the most preferable combination when $R_{11}$ is a 5-membered aromatic heterocycle and $R_{12}$ is hydrogen.

$R_{13}$ and $R_{14}$ each represent hydrogen, alkyl, alkynyl, aryl or a heterocycle. Specifically, the alkyl is preferably an alkyl containing 1 to 10 carbon atoms. Concrete examples of the alkyl include methyl, ethyl, propyl, isopropyl, butyl, t-butyl, pentyl, isopentyl, 2-ethylhexyl, octyl, decyl, cyclohexyl, cycloheptyl, 1-methylcyclohexyl, ethenyl-2-propenyl, 3-butenyl, 1-methyl-3-propenyl, 3-pentenyl, 1-methyl-3-butenyl, 1-cycloalkenyl, 2-cycloalkenyl, ethynyl, 1-propynyl and the like. $R_{13}$ is preferably methyl, ethyl, isopropyl, t-butyl, cyclohexyl, 1-methylcyclohexyl and the like, and more preferably methyl, t-butyl, 1-methylcyclohexyl and the like, and the most preferably t-butyl and 1-methylcyclohexyl. $R_{14}$ is preferably methyl, ethyl, isopropyl, t-butyl, cyclohexyl, 1-methylcyclohexyl, 2-hydroxyethyl and the like, and more preferably methyl and 2-hydroxyethyl. Preferred examples of the aryl represented by $R_{13}$ and $R_{14}$ include, concretely, phenyl, naphthyl, anthranil and the like. Concrete examples of the heterocycle represented by $R_{13}$ and $R_{14}$ include aromatic heterocycles, such as pyridine, quinoline, isoquinoline, imidazole, pyrazole, triazole, oxazole, thiazole, oxadiazole, thiadiazole and tetrazole, and nonaromatic heterocycles, such as piperidino, morpholino, tetrahydrofuryl, tetrahydrothienyl and tetrahydropyranyl. These substituents enumerated above can have substituents, and the above-described substituents to be substituted onto the ring of the nonaromatic cyclic group can be given as the examples of the substituent described hereinabove.

When both $R_{11}$ and $R_{12}$ are hydrogen, the most preferable combination thereof will be obtained with a tertiary alkyl, e.g., t-butyl, 1-methylhexyl, etc., for $R_{13}$, and primary alkyl, e.g., methyl, 2-hydroxyethy, etc., for $R_{14}$.

Q represents a substituent that can be substituted on the benzene ring. Concrete examples of Q include alkyl containing 1 to 25 carbon atoms, e.g., methyl, ethyl, propyl, isopropyl, t-butyl, pentyl, hexyl, cyclohexy and the like; halogenated alkyl, e.g., trifluoromethyl, perfluorooctyl and the like; cycloalkyl, e.g., cyclohexyl, cyclopentyl and the like; alkynyl. e.g., propargyl and the like; glycidyl; acrylate; metacrylate; aryl, e.g., phenyl; heterocycles, e.g., pyridine, thiazolyl, oxazolyl, imidazolyl, furyl, pyrrolyl, pyrazinyl, pyrimidinyl, pyridazinyl, selenazolyl, sulforanyl, piperidinyl, pyrazolyl, tetrazolyl and the like; halogen atom, e.g., chlorine atom, bromine atom, iodine atom, fluorine atom and the like; alkoxy, e.g., methoxy, ethoxy, propyloxy, pentyloxy, cyclopentyloxy, hexyloxy, cyclohexyloxy and the like; aryloxy, e.g., phenoxy and the like; alkoxycarbonyl, e.g., methyloxycarbonyl, ethyloxycarbonyl, butyloxycarbonyl and the like; aryloxycarbonyl, e.g., phenyloxycarbonyl and the like; sulfonamide, e.g., methanesulfonamide, ethanesulfonamide, butanesulfonamide, hexanesulfonamide, cyclohexanesulfonamide, benzenesulfonamide and the like; sulfamoyl, e.g., aminosulfonyl, methylaminosulfonyl, dimethylaminosulfohyl, butylaminosulfonyl, hexylaminosulfonyl, cyclohexylaminosulfonyl, phenylaminosulfonyl, 2-pyridylaminosulfonyl and the like; urethane, e.g., methylureido, ethylureido, pentylureido, cyclohexylureido, phenylureido, 2-pyridylureido and the like; acyl, e.g., acetyl, propionyl, butanoyl, hexanoyl, cyclohexanoyl, benzoyl, pyrizinoyl and the like; carbamoyl, e.g., aminocarbonyl, methylaminocarbonyl, dimethylaminocarbonyl, propylaminocarbonyl, pentylaminocarbonyl, cyclohexylaminocarbonyl, phenylaminocarbonyl, 2-pyridylaminocarbonyl and the like; amide, e.g., acetoamide, propionamide, butaneamide, hexaneamide, benzamide and the like; sulfonyl, e.g., methylsulfonyl, ethylsulfonyl, butylsulfonyl, cyclohexylsulfonyl, phenylsulfonyl, 2-pyridylsulfonyl and the like; amino, e.g., amino, ethylamino, dimethylamino, butylamino, cyclopentylamino, anilino, 2-pyridylamino and the like; cyano; nitro; sulfo; carboxyl; hydroxyl; oxamoyl and the like. Further, the groups enumerated above can be substituted by any of themselves. In the general formula (7), n denotes 0 or an integer of 1 or 2, but it is the most preferable when n is 0. When a plurality of Q are substituted, they can be same or different from one another.

The amount of the silver ion reducing agent used for the thermal development photosensitive material according to the present invention varies depending on the types of the organic silver salt and the reducing agent and the other additives. However, in general, it is appropriate that the amount of the silver ion reducing agent is 0.05 to 10 mol, and preferably 0.1 to 3 mol, relative to 1 mol of the organic silver salt. If the amount in total is in the above-defined range, 2 or more types of silver ion reducing agents according to this invention can be used in combination. In the present invention, there can be a preferable case that the reducing agent can be added into the photosensitive emulsion solution comprising the photosensitive silver halide, the organic silver salt particles and a solvent, and it is mixed just before coating the photosensitive emulsion solution, immediately followed by the coating of the emulsion solution added with the reducing agent. In such a case, variation in the photographic performance to be caused during the stationary period can be favorably reduced sometime.

The photothermographic imaging material according to the present invention contains a silver ion reducing agent. In the present invention, known reducing agents can be used in combination with a bisphenol compound represented by the general formula (7) according to the present invention, and such known reducing agents are described in, for example, U.S. Pat. Nos. 3,770,448, 3,773,512 and 3,593,863, RD 17029 and 29963, and the like. Among the reducing agents, bisphenol compounds, particularly hindered phenols bonded with branched alkylene chains, are preferable to use.

In the following, the representative examples of the preferred compounds represented by the general formula (7) are given. However, it should be noted that the bisphenol compounds according to this invention are not limited to the examples given below.

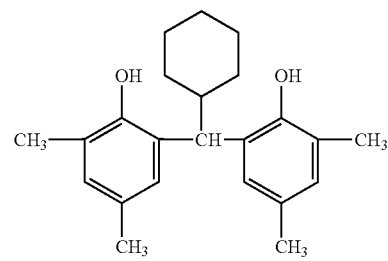

3-1

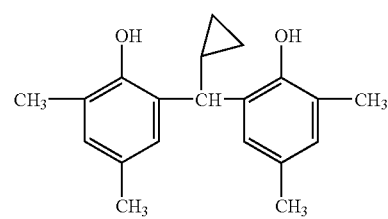

3-2

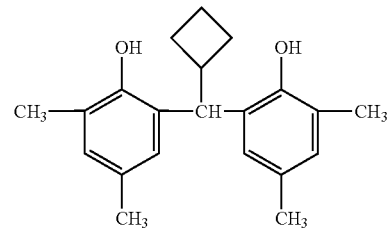

3-3

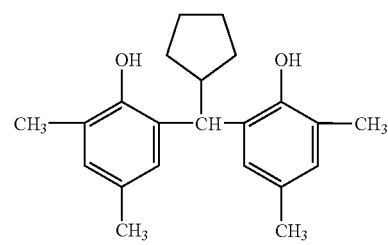

3-4

-continued
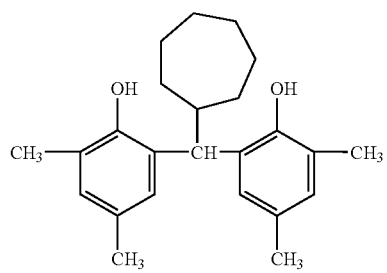
3-5
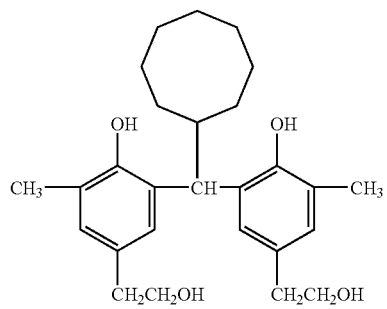
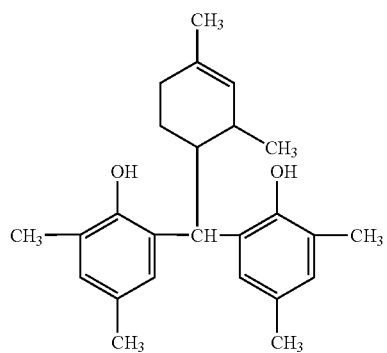
3-7
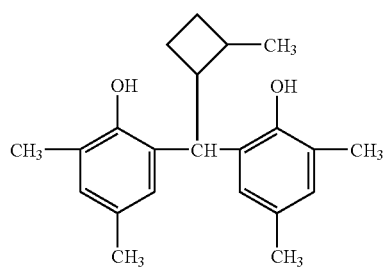
3-8
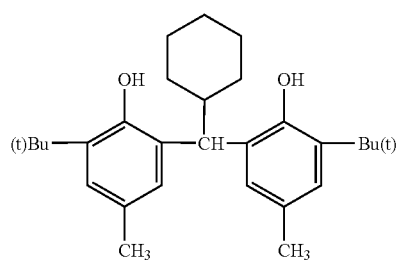
3-9
-continued
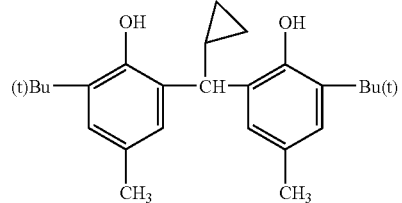
3-10
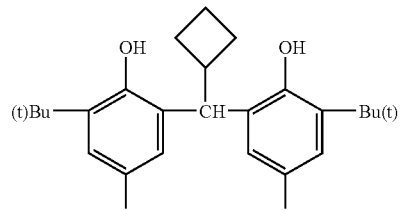
3-11
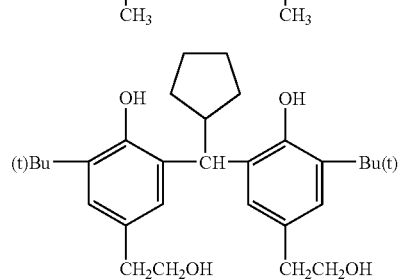
3-12
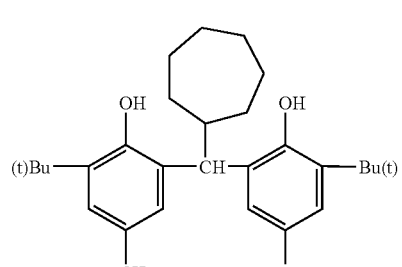
3-13
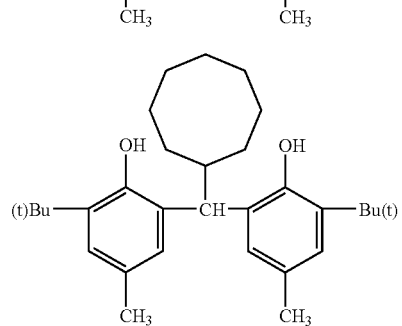
3-14
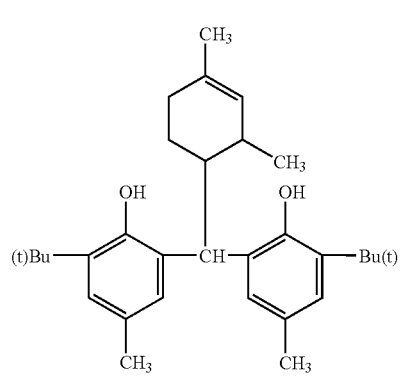
3-15

-continued
3-16
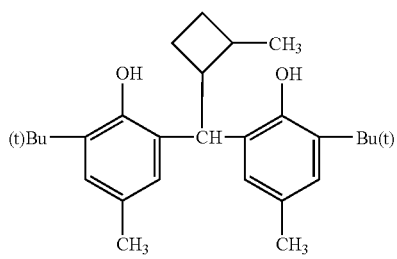
3-17
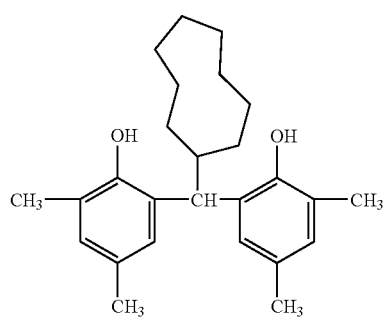
3-18
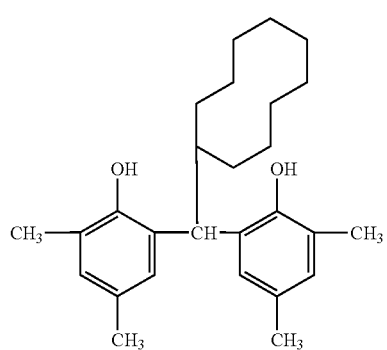
3-19
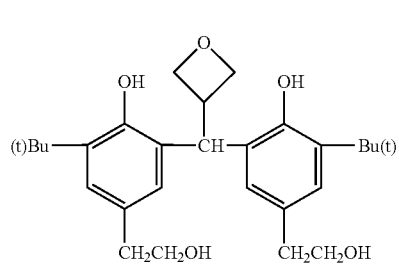
3-20
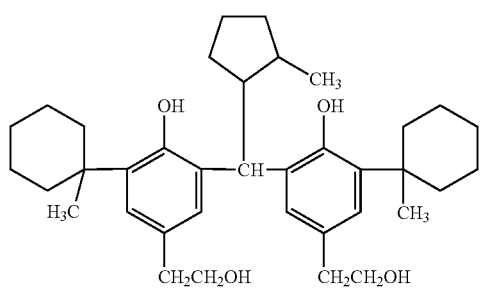
-continued
3-21
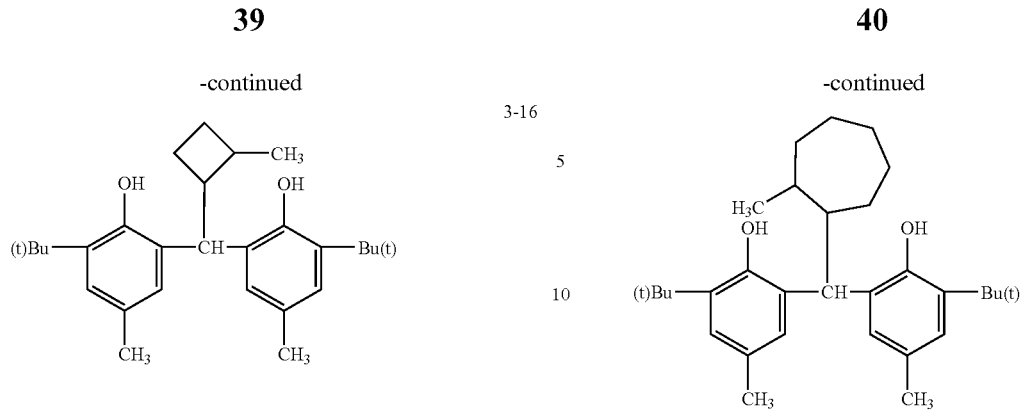
3-22
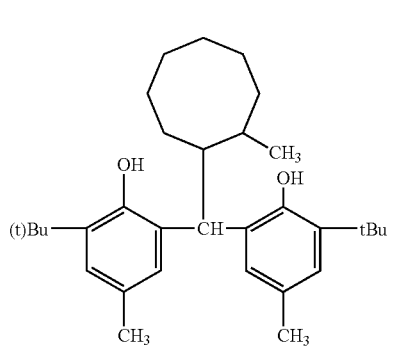
3-23
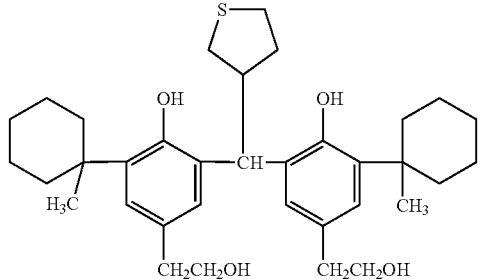
3-24
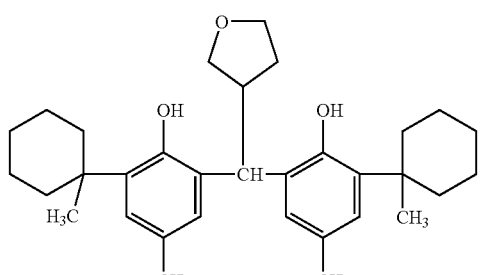
3-25
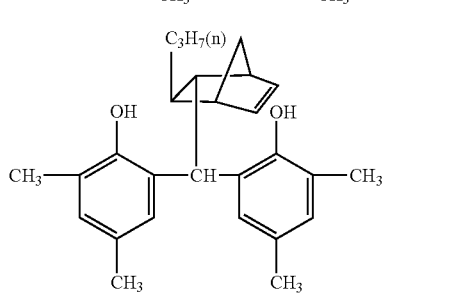

3-26
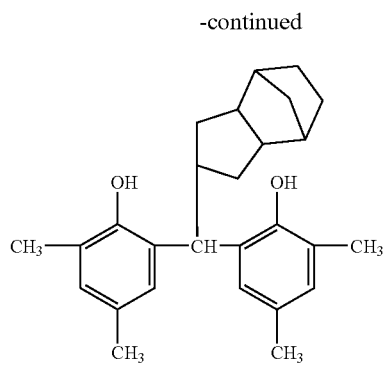
3-31
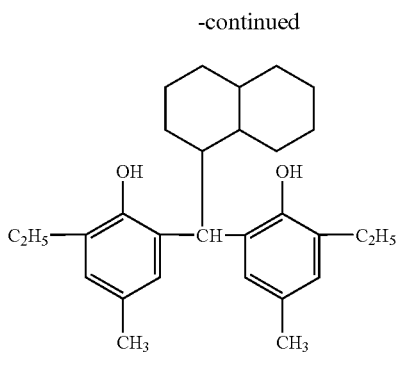
3-27
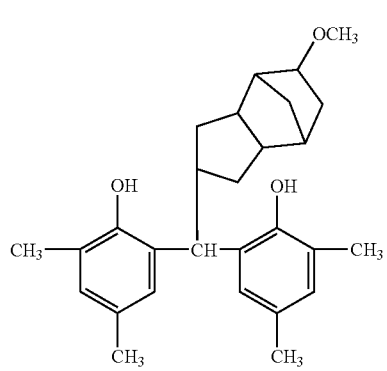
3-32
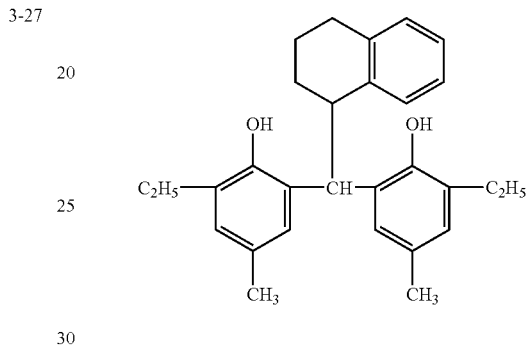
3-28
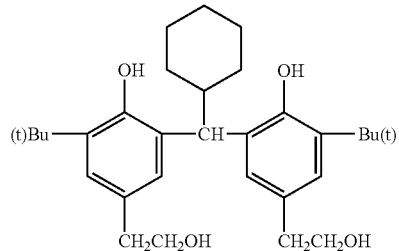
3-33
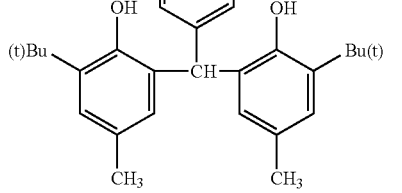
3-29
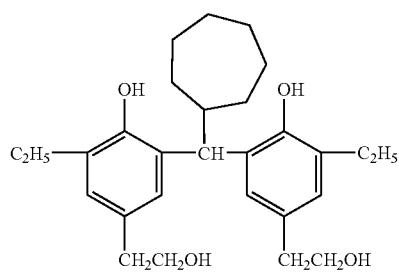
3-34
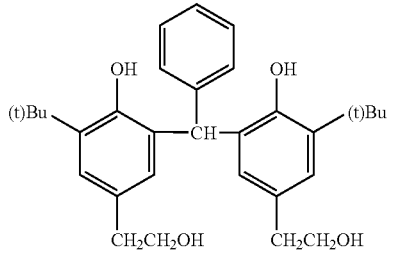
3-30
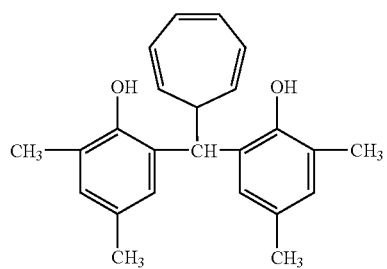
3-35
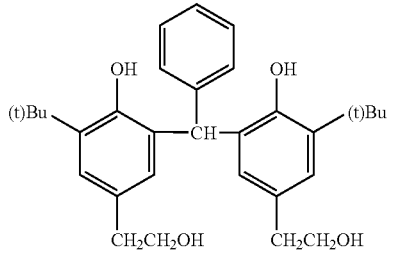

-continued
3-36
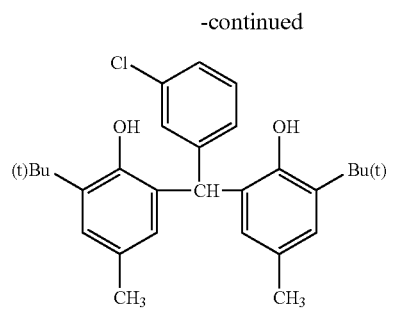
3-37
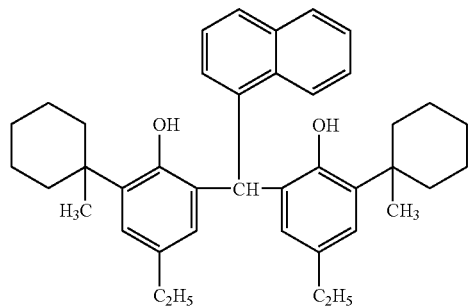
3-38
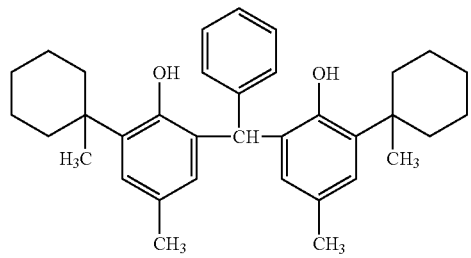
3-39
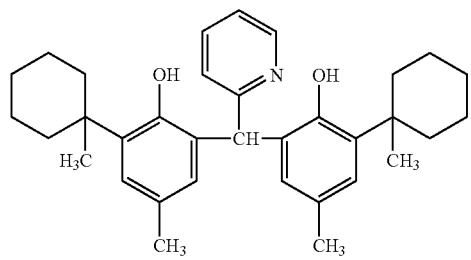
3-40
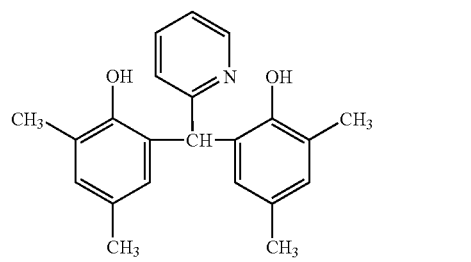
3-41
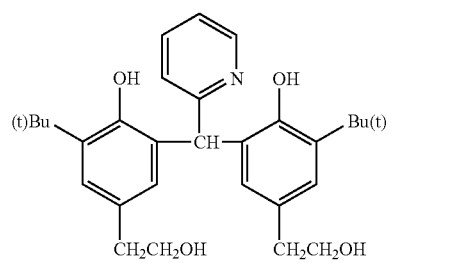
-continued
3-42
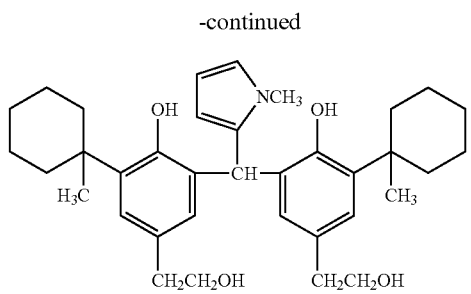
3-43
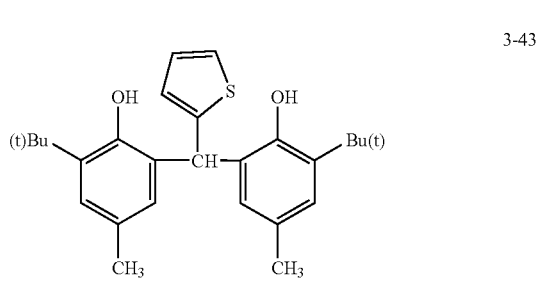
3-44
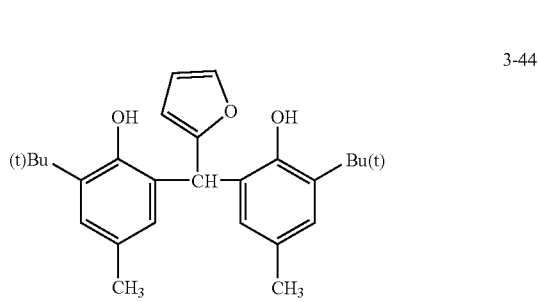
3-45
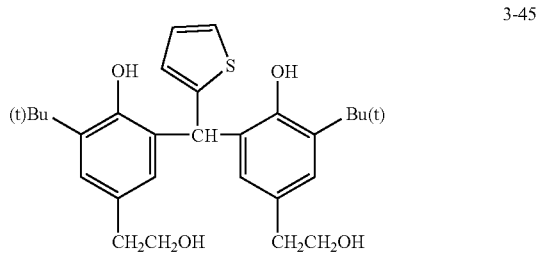
3-46
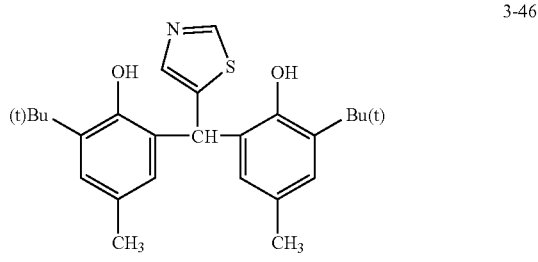
3-47
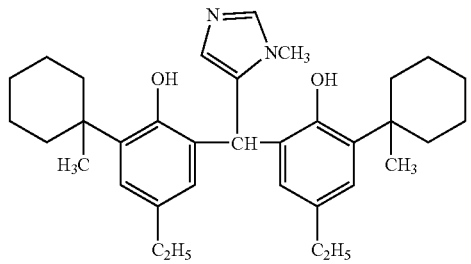

-continued
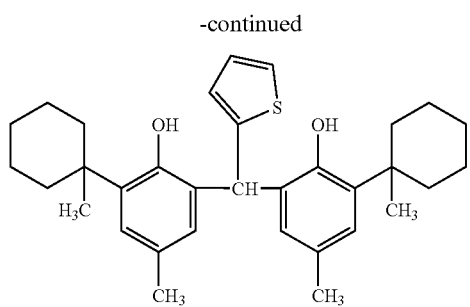
3-48
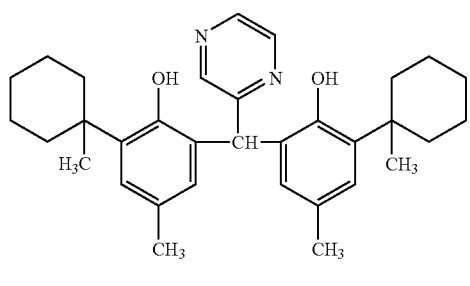
3-49
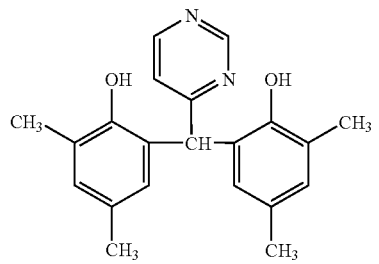
3-50
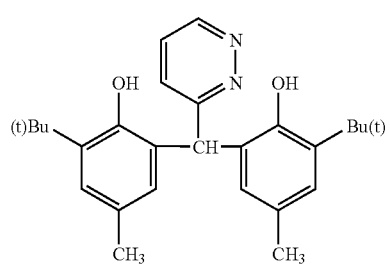
3-51
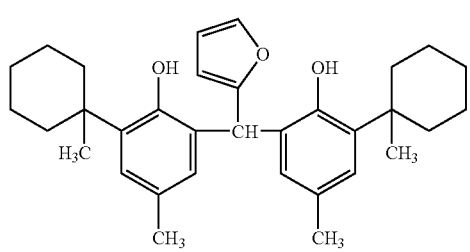
3-52
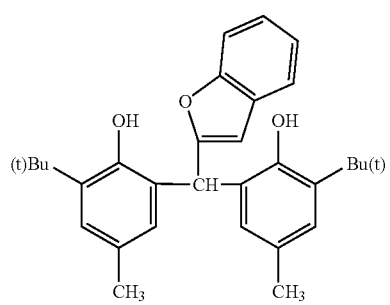
3-53
-continued
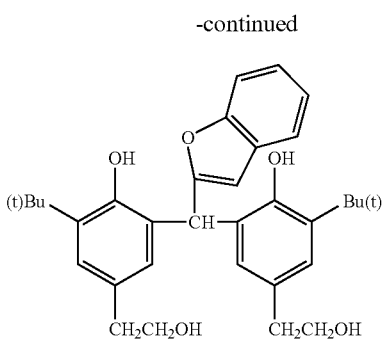
3-54
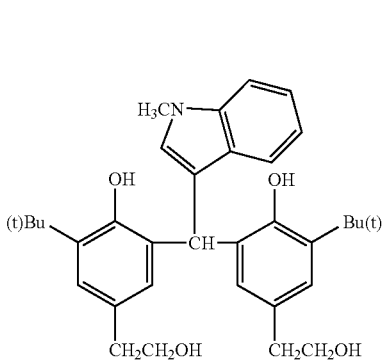
3-55
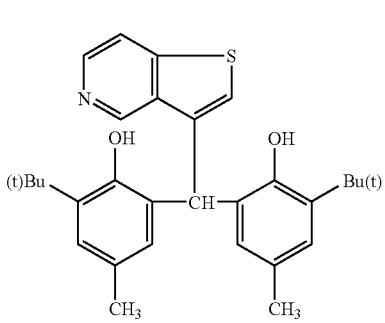
3-56
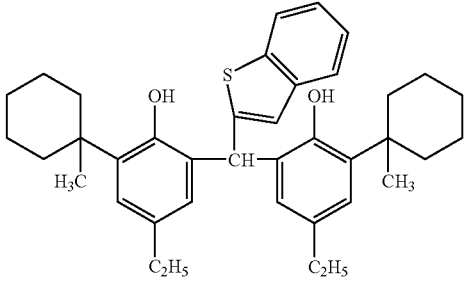
3-57
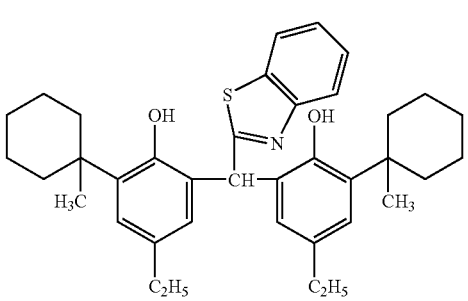
3-58

-continued
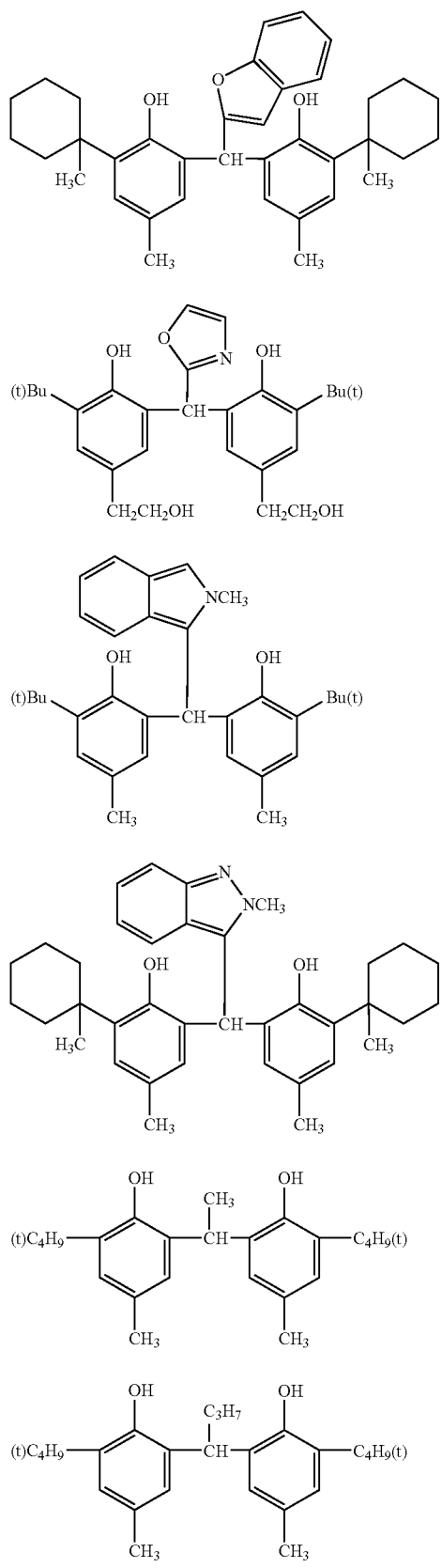
3-59
3-60
3-61
3-62
3-63
3-64
-continued
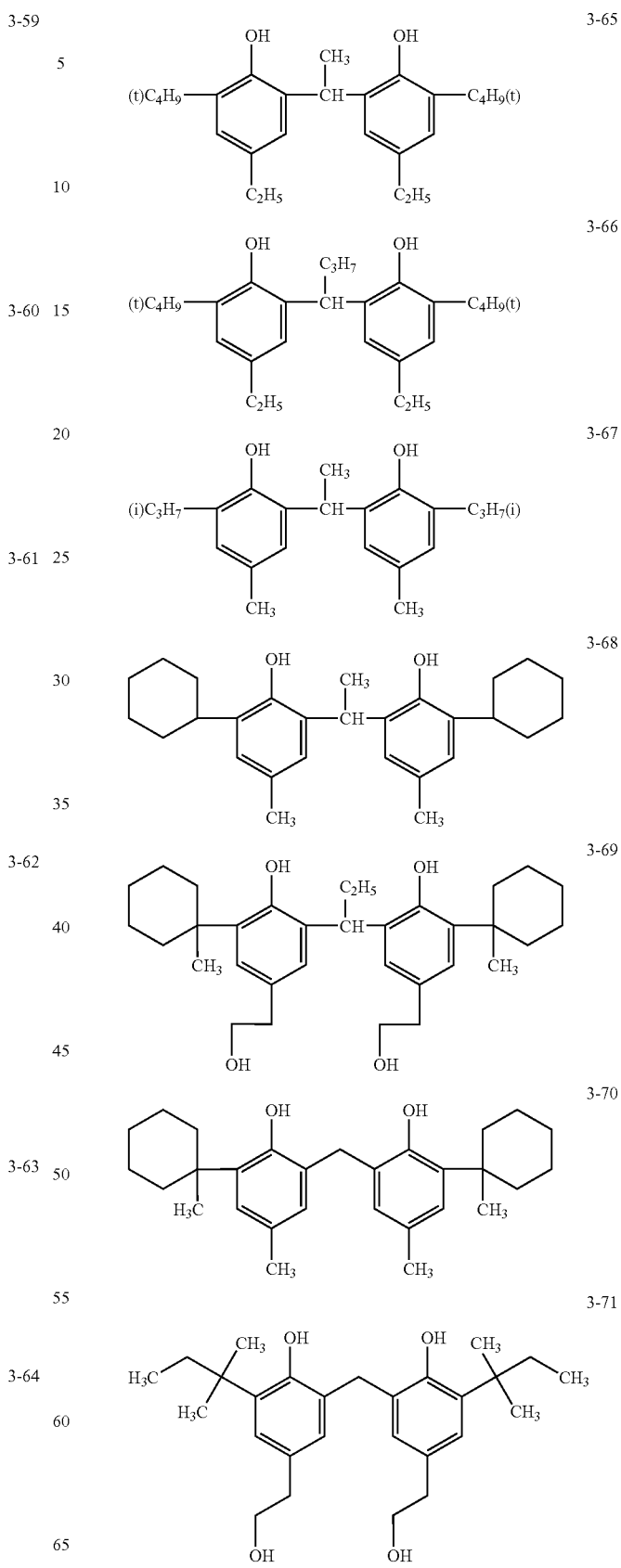
3-65
3-66
3-67
3-68
3-69
3-70
3-71

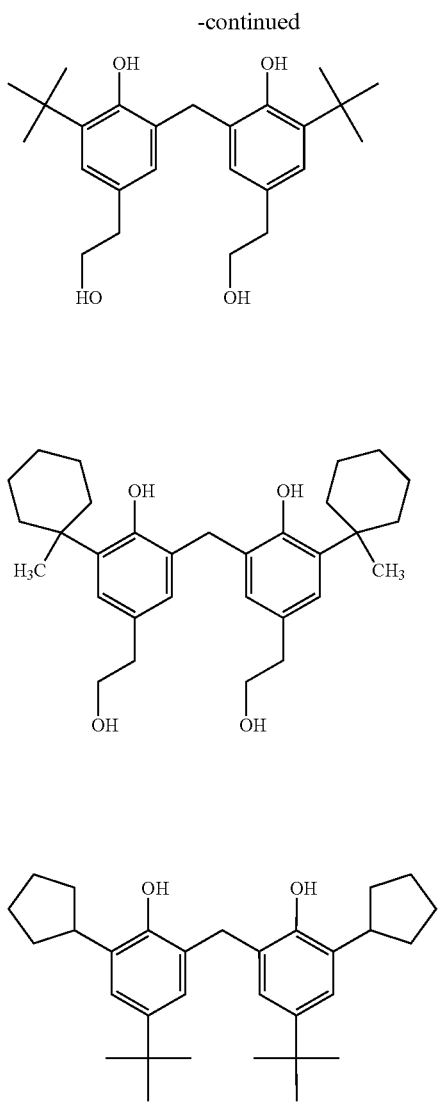

3-72

3-73

3-74

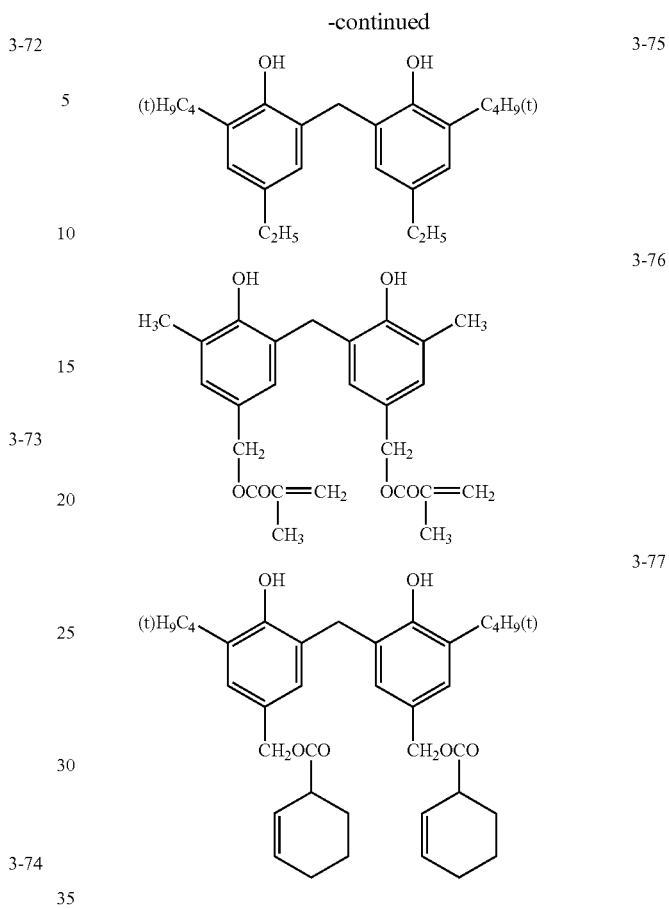

3-75

3-76

3-77

Note that, in the thermal development photography photosensitive material according to the present invention, a sensitizing agent represented by the general formulae (11) and (12) shown below can be contained instead of the compound represented by the general formula (1), or in addition thereto. Now, the sensitizing agents represented by the general formulae (11) and (12) will be described in the following.

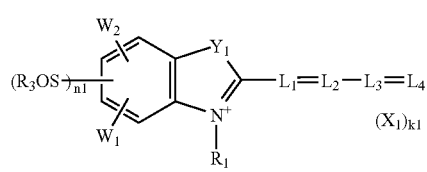

General Formula (11)

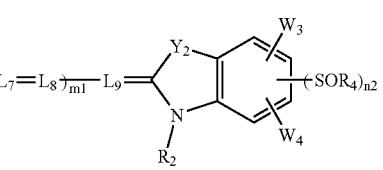

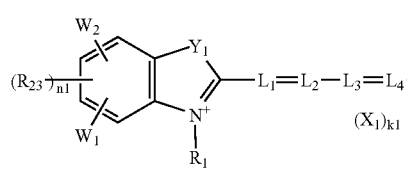

General Formula (12)

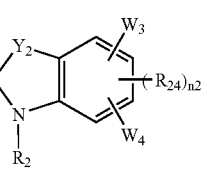

Wherein $Y_1$ and $Y_2$ represent each independently oxygen atom, selenium atom or —CH=CH— group; $L_1$ to $L_9$ represent each independently methine group; $R_1$ and $R_2$ each represent aliphatic group; $R_3$, $R_4$, $R_{23}$ and $R_{24}$ each represent lower alkyl, cycloalkyl, alkenyl, aralkyl, aryl or heterocylic group. $W_1$, $W_2$, $W_3$ and $W_4$ each represent hydrogen atom, a substituent or non-metal atom group required for bonding $W_1$ and $W_2$, and $W_3$ and $W_4$ respectively to form a condensed ring, or $R_3$, $R_4$, $R_{23}$, $R_{24}$, $W_1$, $W_2$, $W_3$ and $W_4$ each represent a non-metal atom group required for bonding $R_3$ and $W_1$, $R_3$ and $W_2$, $R_{23}$ and $W_1$, $R_{23}$ and $W_2$, $R_4$ and $W_4$, $R_{24}$ and $W_3$, and $R_{24}$ and $W_4$ respectively to form a 5- or 6-membered condensed ring; $X_1$ represents an ion required for offsetting electric charge in the molecule, and k1 represents the number of ions required for offsetting the electric charge in the molecule; m1 represent 0 or 1; and n1 and n2 each represent 0 or an integer of 1 or 2, and at least one of n1 and n2 is not 0.

Example of an aliphatic group represented by $R_1$ and $R_2$ in the general formulae (11) and (12) include, for example, branched or straight-chain alkyl containing 1 to 10 carbon atoms, e.g., methyl, ethyl, propyl, butyl, pentyl, isopentyl, 2-ethylhexyl, octyl, decyl and the like; alkenyl containing 3 to 10 carbon atoms, e.g., 2-propenyl, 3-butenyl, 1-methyl-3-propenyl, 3-pentenyl, 1-methyl-3-butenyl, 4-hexenyl and the like; and aralkyl containing 7 to 10 carbon atoms, e.g., benzyl, phenethyl and the like. The above-enumerated groups can further have a substituent of hydrophilic groups including, lower alkyl, e.g., methyl, ethyl, propyl and the like; halogen atom, e.g., fluorine atom, chlorine atom, bromine atom and the like; vinyl; aryl, e.g., phenyl, p-tolyl, p-bromophenyl and the like; trifluoromethyl; alkoxy, e.g., methoxy, ethoxy, methoxyethoxy and the like; aryloxy, e.g., phenoxy, p-tolyloxy and the like; cyano; sulfonyl, e.g., methanesulfonyl, trifluoromethanesulfonyl, p-toluenesulfonyl and the like; alkoxycarbonyl, e.g., ethoxycarbonyl, butoxycarbonyl and the like; amino, e.g., amino, biscarboxymethylamino and the like; aryl, e.g., phenyl, carboxyphenyl and the like; heterocycles, e.g., tetrahydrofurfuryl, 2-pyrrolidinone-1-yl and the like; acyl, e.g., acetyl, benzoyl and the like; ureido, e.g., ureido, 3-methylureido, 3-phenylureido and the like; thioureido, e.g., thioureido, 3-methylthioureido and the like; alkylthio, e.g., methylthio, ethylthio and the like; arylthio, e.g., phenylthio and the like; heterocyclic thio, e.g., 2-thienylthio, 3-thienylthio, 2-imdazolylthio and the like; carbonyloxy, e.g., acetyloxy, propanoyloxy, benzoyloxy and the like; acylamino, e.g., acetylamino, benzoylamino and the like; thioamide, e.g., thioacetoamide, thiobenzoylamino and the like; sulfo; carboxy; phosphono; sulfato; hydroxy; mercapto; sulfino; carbamoyl, e.g., carbamoyl, N-methylcarbamoyl, N,N-tetramethylenecarbamoyl and the like; sulfamoyl, e.g., sulfamoyl, N,N-3-oxapentamethyleneaminosulfonyl and the like; sulfonamide, e.g., methanesulfonamide, butanesulfonamide and the like; sulfonylaminocarbonyl, e.g., methanesulfonylaminocarbonyl, ethanesulfonylaminocarbony and the like; acylaminosulfonyl, e.g., acetoamidesulfonyl, methoxyacetoamidesulfonyl and the like; acylaminocarbonyl, e.g., acetoamidecarbonyl, methoxyacetoamidecarbonyl and the like; sulfinylaminocarbonyl, e.g, methanesulfinylaminocarbonyl, ethanesulfinylaminocarbonyl and the like. Concrete examples of the aliphatic group having at least one substituent of the above-enumerated hydrophilic groups include carboxymethyl, carboxyethyl, carboxybutyl, carboxypentyl, 3-sulfatobutyl, 3-sulfopropyl, 2-hydroxy-3-sulfopropyl, 4-sulfobutyl, 5-sulfopentyl, 3-sulfopentyl, 3-sulfinobutyl, 3-phosphonopropyl, hydroxyethyl, N-methanesulfonylcarbamoylmethyl, 2-carboxy-2-propenyl, o-sulfobenzyl, p-sulfophenetyl, p-carboxybenzyl and the like.

The concrete examples of groups represented by $R_3$, $R_4$, $R_{23}$ and $R_{24}$ in the general formulas (11) and (12) include a straight-chain or branched lower alkyl group containing not more than 5 carbon atoms such as, ethyl, propyl, butyl, pentyl, isopropyl and the like; cycloalkyl such as cyclopropyl, cyclobutyl, cyclopentyl and the like; alkenyl such as 2-propenyl, 3-butenyl, 1-methyl-3-propenyl, 3-pentenyl, 1-methyl-3-butenyl, 4-hexenyl and the like; aralkyl such as benzyl, phenetyl, p-methoxyphenylmethyl, o-acetylaminophenylethyl and the like; aryl such as phenyl, 2-naphthyl, 1-naphthyl, o-tolyl, o-methoxyphenyl, m-chlorophenyl, m-bromophenyl, p-tolyl, p-ethoxyphenyl and the like; and substituted and unsubstituted heterocycles such as 2-furyl, 5-methyl-2-furyl, 2-thienyl, 3-thienyl, 2-imidazolyl, 2-methyl-1-imidazolyl, 4-phenyl-2-thiazolyl, 5-hydroxy-2-benzothiazolyl, 2-pyridyl, 1-pyrrolyl and the like. The respective groups enumerated above can further have at least one substituent of lower alkyl, e.g., methyl, ethyl and like; lower alkoxy, e.g., methoxy, ethoxy and the like; hydroxy; halogen atom, e.g., fluorine atom, chlorine atom, bromine atom, iodine atom and the like; aryl, e.g., phenyl, tolyl, chloroethyl, chlorophenyl and the like; mercapto; lower alkylthio, e.g., methylthio, ethylthio and the like. The particularly preferred for the substituents to be substituted to the groups represented by $R_3$, $R_4$, $R_{23}$ and $R_{24}$ are a group of nonmetal atoms those which are necessary for the respective pairs of $R_3$ and $W_1$, $R_3$ and $W_2$, $R_{23}$ and $W_1$, $R_{23}$ and $W_2$, $R_4$ and $W_4$, $R_{24}$ and $W_3$, and $R_{24}$ and $W_4$ to bond with each other to form 5- or 6-membered condensed rings.

Concrete examples of the substituents respectively represented by $W_1$ to $W_4$ include alkyl, e.g., methyl, ethyl, butyl, isobutyl and the like; monocyclic and multicyclic aryl groups, e.g., phenyl, naphthyl and the like; heterocycles, e.g., thienyl, furyl, pyridyl, carbazolyl, pyrrolyl, indolyl and the like; halogen atom, e.g., fluorine atom, chlorine atom, bromine atom and the like; vinyl; aryl, e.g., phenyl, p-tolyl, p-bromophenyl and the like; trifluoromethyl; alkoxy, e.g., methoxy, ethoxy, methoxyethoxy and the like; aryloxy, e.g., phenoxy, p-tolyloxy and the like; sulfonyl, e.g., methanesulfonyl, p-toluenesulfonyl and the like; alkoxycarbonyl, e.g., ethoxycarbonyl, butoxycarbonyl and the like; amino, e.g., amino, biscarboxymethylamino and the like; aryl, e.g., phenyl, carboxyphenyl and the like; heterocycles, e.g., tetrahydrofurfuryl, 2-pyrrolidinone-1-yl and the like; acyl, e.g., acetyl, benzoyl and the like; ureido, e.g., ureido, 3-methylureido, 3-phenylureido and the like; thioureido, e.g., thioureido, 3-methylthioureido and the like; alkylthio, e.g., methylthio, ethylthio and the like; arylthio, e.g., phenylthio and the like; hydroxy; styryl and the like.

The substituents enumerated above can have a substituent represented by $R_1$ and the like exampled above for the aliphatic groups. Concrete examples of the substituted alkyl include 2-methoxyethyl, 2-hydroxyethyl, 3-ethoxycarbonylpropyl, 2-carbamoylethyl, 2-methanesulfonylethyl, 3-methanesulfonylaminopropyl, benzyl, phenetyl, carboxymethyl, carboxyethyl, allyl, 2-furylethyl and the like. Concrete examples of the substituted aryl include p-carboxyphenyl, p-N,N-dimethylaminophenyl, p-morpholinophenyl, p-methoxyphenyl, 3,4-dimethoxyphenyl, 3,4-methylenedioxyphenyl, 3-chlorophenyl, p-nitrophenyl and the like. Concrete examples of the substituted heterocycle include 5-chloro-2-pyridyl, 5-ethoxycarbonyl-2-pyridyl, 5-carbamoyl-2-pyridyl and the like.

The saturated or unsaturated condensed rings which is formed by the respective bondings of $W_1$ and $W_2$, $W_3$ and $W_4$, $R_3$ and $W_1$, $R_3$ and $W_2$, $R_{23}$ and $W_1$, $R_{23}$ and $W_2$, $R_4$ and $W_3$, $R_3$ and $R_4$, $R_{24}$ and $W_3$, and $R_{24}$ and $W_4$ are, for example, 5- or 6-membered saturated or unsaturated condensed carbocycles. These condensed rings can have substituents at their arbitrary positions. The same groups as the groups substitutable to the aliphatic groups described above can be exampled for the substituents for the carbocycles.

The methylene groups represented by $L_1$ to $L_9$ in the general formulae (11) and (12) represent each independently substituted or unsubstituted methylene. Concrete examples of the groups to be substitutent of the methylene groups include substituted or unsubstituted lower alkyl, e.g., methyl, ethyl, isopropyl, benzyl and the like; alkoxy, e.g., methoxy, ethoxy and the like; aryloxy, e.g., phenoxy, naphthoxy and the like; aryl, e.g., phenyl, naphthyl, p-tolyl, o-carboxyphenyl and the like; —N($V_1$ $V_2$); —SR; and heterocycles, e.g., 2-thienyl, 2-furyl, N,N'-bis(methoxyethyl)barbiturate and the lie.

R represents lower alkyl, aryl or a heterocycle as described above, $V_1$ and $V_2$ each represent substituted or unsubstituted, lower alkyl or aryl, and $V_1$ and $V_2$ can be bonded each other to form a 5- or 6-membered nitrogen-containing heterocycle. Furthermore, the methylene group can bond with the adjacent methylene groups or with the methylene groups beyond the next methylene groups thereof to form a 5- or 6-membered ring.

When a group having cationic or anionic charges is substituted on the compound represented by the general formulae (11) and (12), pair-ions are formed with the equivalent anionic or cationic ions so that the charges in the molecules can be counterbalanced. For example, in connection to the ions required to counterbalance the charges represented by $X_1$ in the molecules, concrete examples of the cations include protons, organic ammonium ions (e.g., ions of each of triethylammonium, triethanolammonium and the like), inorganic cations (e.g., cations of each of lithium, sodium, potassium and the like) and the like, and concrete examples of the acid anions include halogenous ions (e.g., chlorine ions, bromine ions, iodine ions and the like), p-toluenesulfonic acid ions, perchloric acid ions, boron tetrafluoride ions, sulfuric acid ions, methylsulfuric acid ions, ethylsulfuric acid ions, methanesulfonic acid ions, trifluoromethanesulfonic acid ions and the like.

Now, the representative examples of the photosensitive colorant represented by the general formulae (11) and (12) will be given in the following. However, it should be noted that the scope of the photosensitive colorant according to this invention is not limited to the examples given below.

11-1

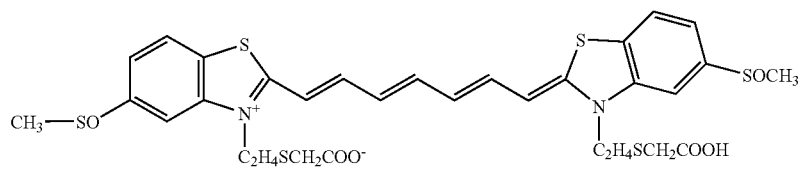

11-2

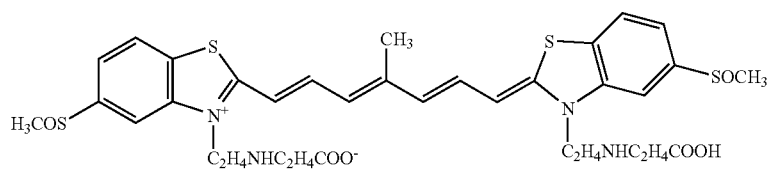

11-3

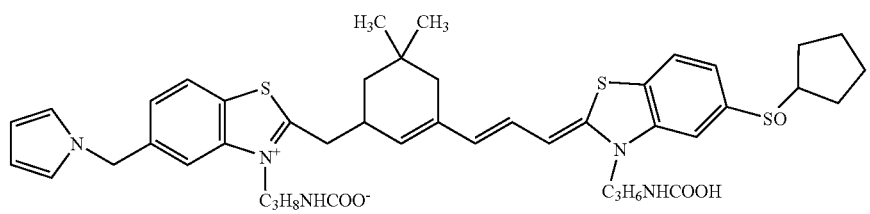

11-4

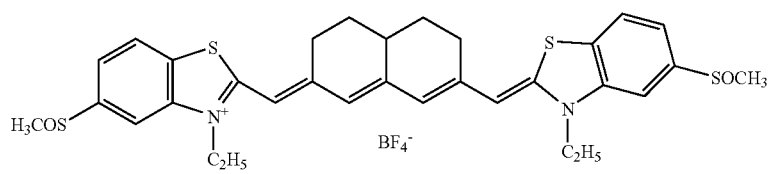

11-5

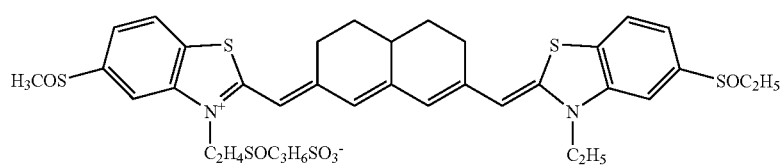

11-6
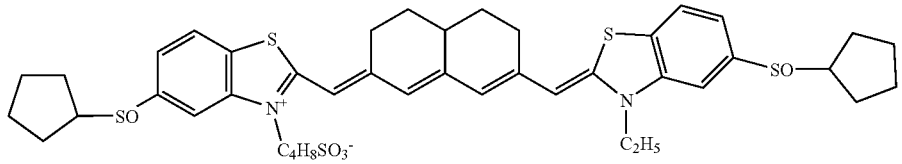
11-7
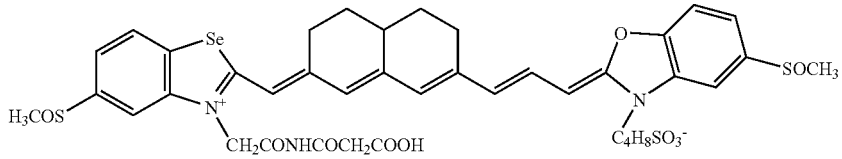
11-8
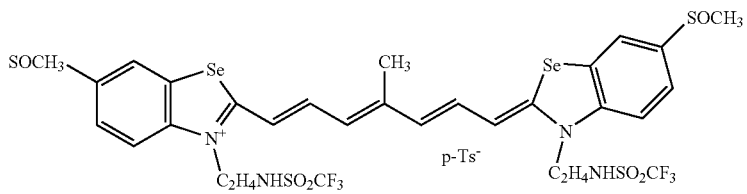
11-9
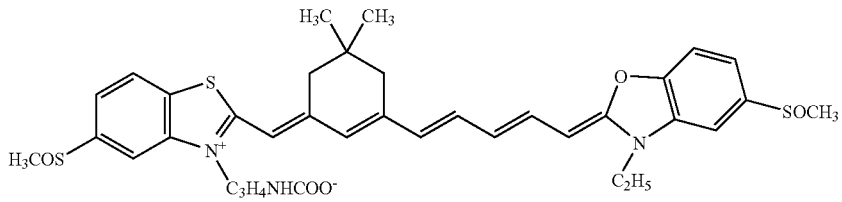
11-10
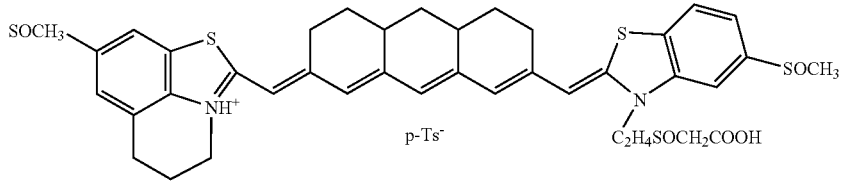
11-11
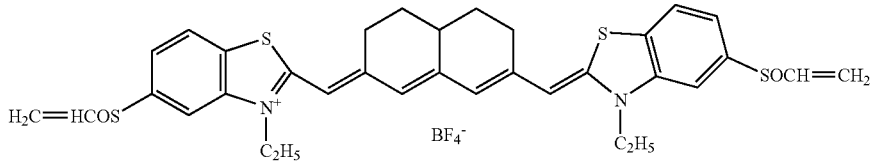
11-12
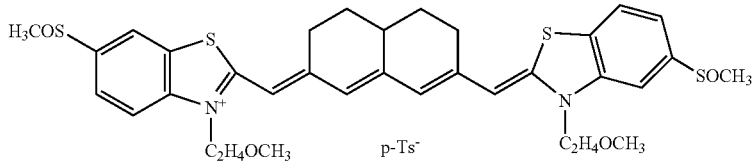
11-13
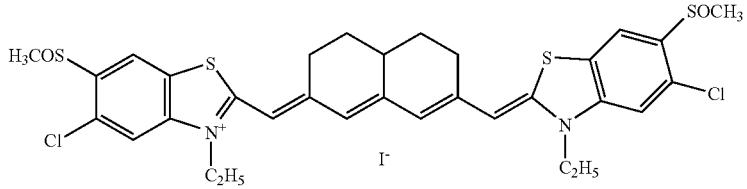

-continued
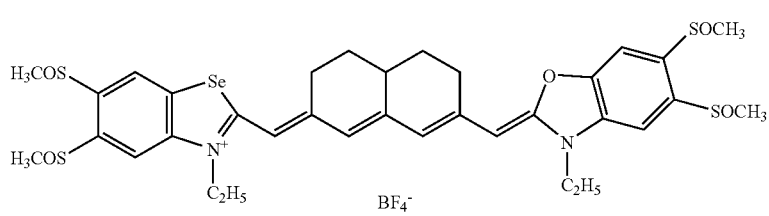
11-14
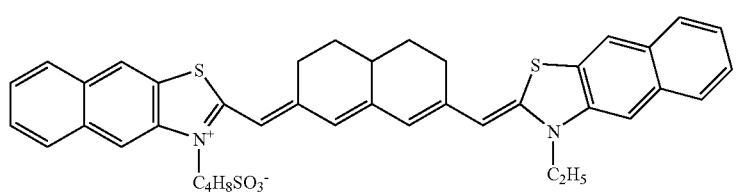
12-1
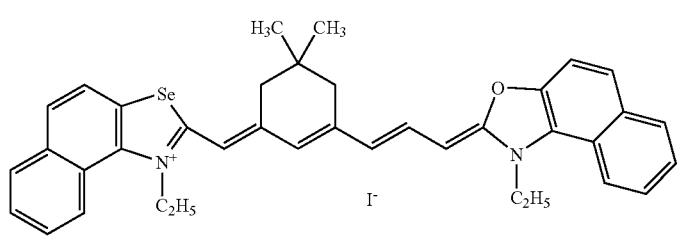
12-2
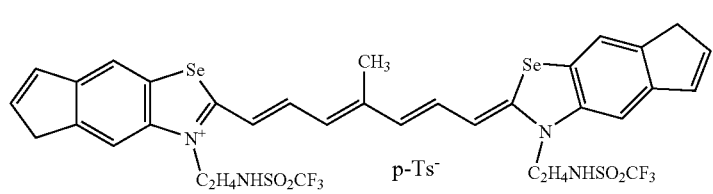
12-3
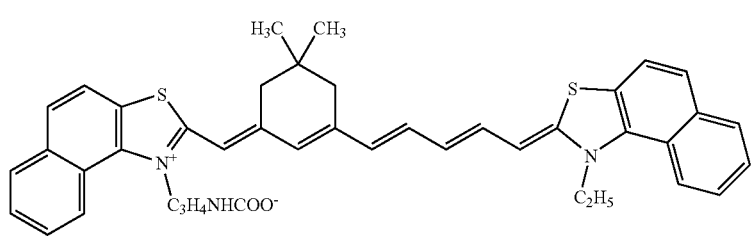
12-4
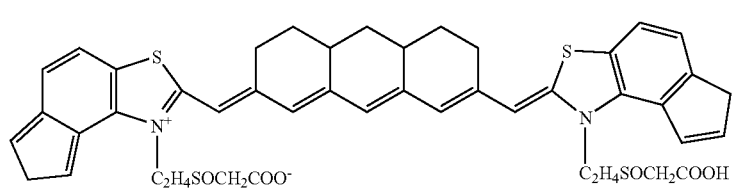
12-5
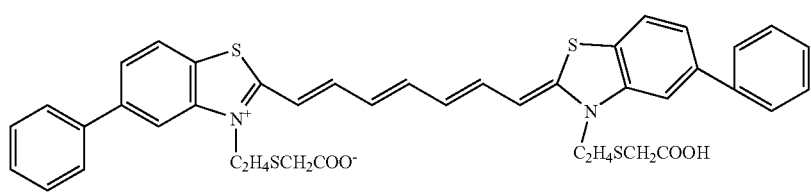
12-6
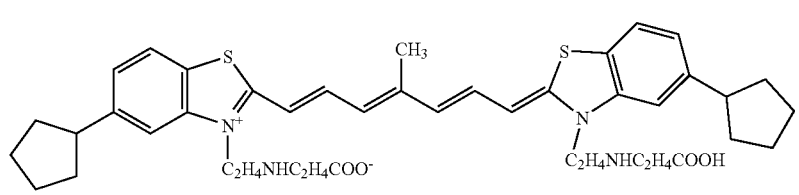
12-7

12-8
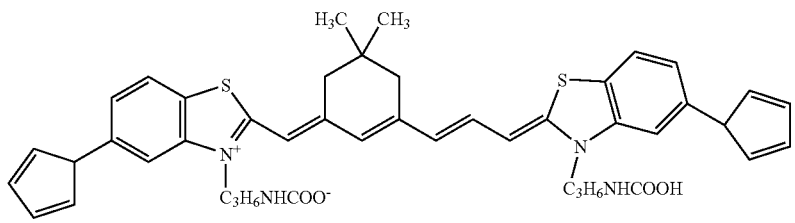
12-9
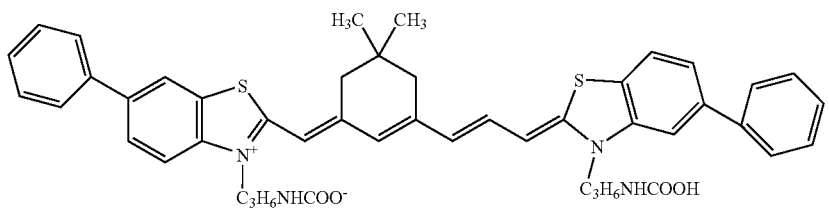
12-10
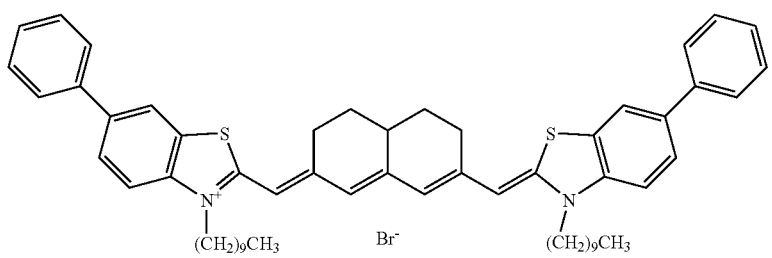
12-11
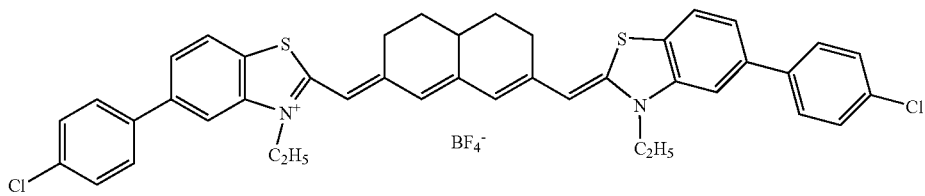
12-12
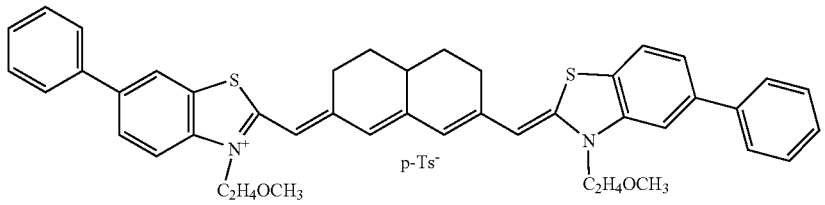
12-13
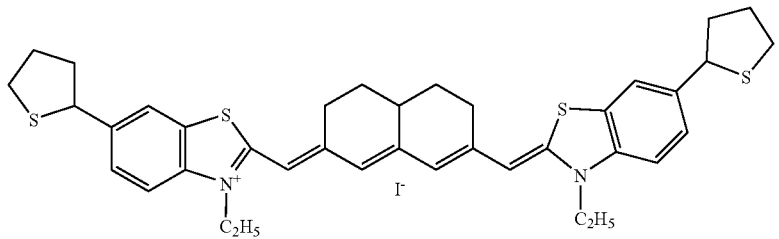
12-14
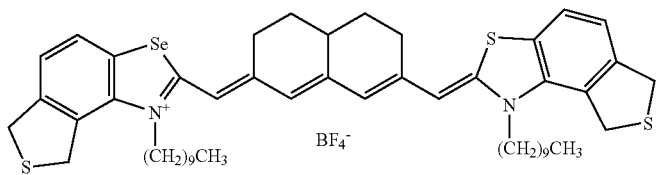

-continued

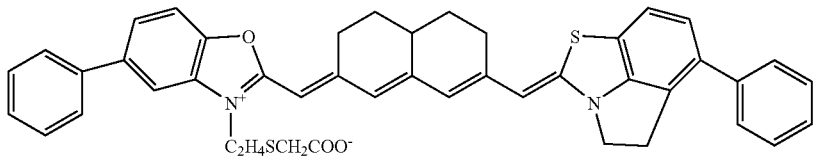
12-15

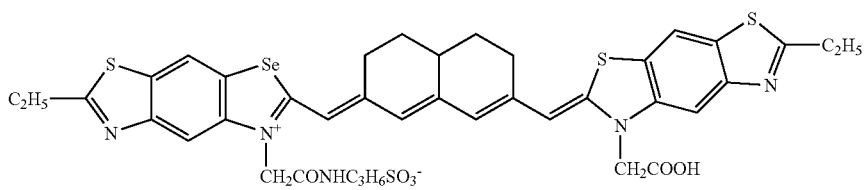
12-16

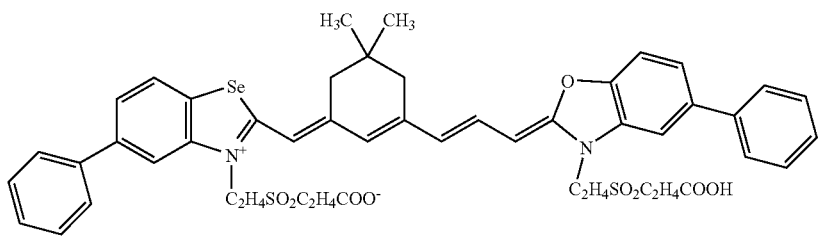
12-17

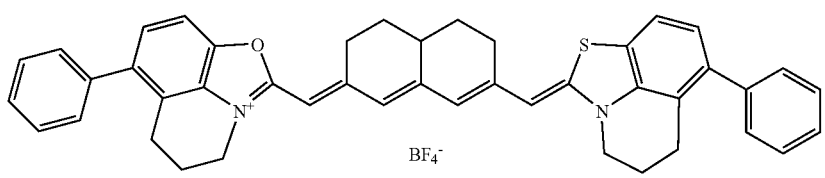
12-18

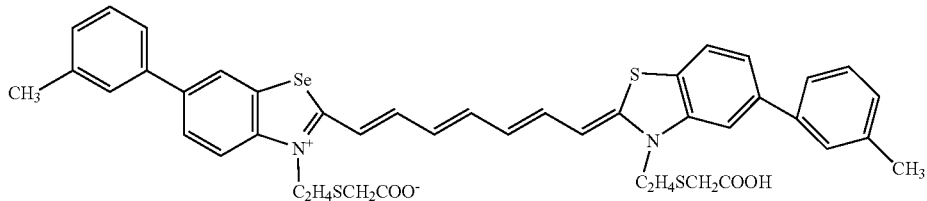
12-19

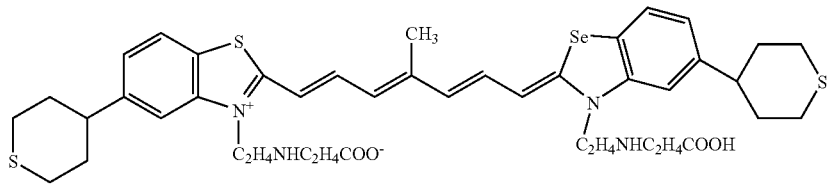
12-20

The infrared-sensitizing colorants describe above can be synthesized according to the processes described in, for example, "The chemistry of Heterocyclic Compounds", by F. M. Harmer, vol. 18, "The Cyanine Dyes and Related Compound" (Published by A. Weissberger ed. Interscience Inc., New York, 1964), JP Tokukaihei-3-138638, 10-73900 and 9-510022, U.S. Pat. No. 2,734,900, the specification of UK Patent No. 774,779, JP Tokukai-2000-95958 and the specification of JP Tokuganhei-11-58686.

In the present invention, the infrared-sensitizing colorant can be used solely, but 2 or more thereof can be used in combination. When the infrared-sensitizing colorant is used solely, and 2 or more thereof are used in combination, the colorants are contained in total in the silver halide emulsion at a rate of $1 \times 10^{-6}$ mol to $5 \times 10^{-3}$ mol, preferably $1 \times 10^{-5}$ mol to $2.5 \times 10^{-3}$ mol, and more preferably $4 \times 10^{-5}$ mol to $1 \times 10^{-3}$ mol, relative to 1 mol of the silver halide. Besides, in the present invention, when the infrared-sensitizing colorants are used in combination, they can be contained in the silver halide emulsion at arbitrary combination ratios.

The photosensitive colorant according to this invention can be dispersed directly in the emulsion in accordance with the so-called solid dispersion method. Alternatively, the photosensitive colorant can be dissolved in an appropriate solvent, e.g., methyl alcohol, ethyl alcohol, n-propanol, methylcellosolve, acetone, water, pyridine or a mixed solvent thereof, in advance and then added into the emulsion in a form of the solution. For dissolving the photosensitive colorant, supersonic can also be used. For the addition of the photosensitive colorant, a method of dissolving the colorant in a volatile organic solvent, followed by dispersing the solution in hydrophilic colloids and then adding the dispersion into the emulsion, as described in U.S. Pat. No. 3,469, 987, etc.; a method of dissolving the colorant with use of a compound to shift the colorant to long wavelength side and adding the solution into the emulsion, as described in JP Tokukaisho-51-74624; a method of dissolving the colorant in an acid substantially free of water and adding the solution into the emulsion, as described in JP Tokukaisho-50-80826, and the like can be preferably employed. In addition to the above methods, other methods described in U.S. Pat. Nos. 2,912,343, 3,342,605, 2,996,287, 3,429,835, etc. can be employed for adding the photosensitive colorant according to this invention into the emulsion.

The photosensitive colorant according to this invention can be uniformly dispersed in the silver halide emulsion before the emulsion is applied onto an appropriate support. In this concern, there is no limitation for the timing of the addition of the colorant, and it can be dispersed at any stage.

When 2 or more of the photosensitive colorants according to this invention are used in combination, the colorants can be dispersed independently into the silver halide emulsion or in a manner that the colorants are combined in advance and then dispersed in the emulsion according to the procedures as described above. In addition to the photosensitive colorants according to this invention, a colorant having the absorption at the visible light range, a colorant having no spectral sensitization activity by own, or a substance that substantially does not absorb visible light and exerting strong color sensitization performance can be contained in the emulsion. The useful sensitizing colorants, the details of combinations of colorants with which the strong color sensitization is exerted and substances exerting the strong color sensitization performance are described in, Research Disclosure, vol. 176, 17643 (published in 1978), page 23IV, section J; JP Publications Nos. sho-49-25500 and sho-43-4933; and JP Tokukaisho-59-19032, 59-192242, H3-15049 and 62-123454.

Further, the above-described colorants and substances can be added, instead of the silver halide emulsion, into the thermal development photosensitive layer containing a dispersion of silver halide and an organic silver salt in which the silver halide and the organic silver salt are mixed and are in contacting state with each other. In this case, a spectral sensitizing colorant is properly dissolved in the coating solution for the thermal development photosensitive layer so that it can be added to the photosensitive layer. There is no limitation for the timing of the addition, and the addition can be made at any stage. However, in general, it is convenient in view of the manufacturing to perform the addition during a period between the stage following to the preparation of the organic silver salt dispersion containing the silver halide emulsion and the stage before performing the coating. In this case as well, the spectral sensitizing colorant can be added solely, or a plurality thereof can be added in combination, or it can be added together with the substance exerting the strong color sensitization performance. Further, the spectral sensitizing colorant can be added in the solid dispersion state, that is, in which the particles of an insoluble colorant is dispersed in a solvent.

Now, the photothermographic imaging material according to the present invention will be described. The organic silver salt according to the present invention is a silver source capable of being reduced and is an organic acid that contains silver ion source capable of being reduced. The organic acid used in the present invention includes aliphatic carboxylic acids, carbocyclic carboxylic acids, heterocyclic carboxylic acids and heterocyclic acids, however, it is preferable to use particularly an aliphatic carboxylic acid in a long chain (having 10 to 30 carbon atoms, preferably 15 to 25 carbon atoms), a heterocyclic carboxylic acid including a nitrogen-containing heterocycle or the like. Further, it is also useful to use an organic silver salt complex of which ligand having a total stability constant of 4.0 to 10.0 against silver ions.

An example of the above-described organic acid silver salt is described in Nos. 17029 and 29963 of Research Disclosure (hereinafter referred to RD). In particular, silver salts of fatty acids are preferably used in this reference, and the particularly preferred are silver behenate, silver arachidate and silver stearate.

The organic silver compound described above can be obtained by mixing an aqueous silver compound and a compound forming a complex with silver. For this mixing, any of normal mixing method, reversible mixing method and simultaneous mixing method is preferably used. It is also possible to use the controlled double jet method as described in JP Tokukaihei-9-127643A.

In the present invention, it is preferable that the organic silver salt has an average particle size of 1 μm or less and is monodispersed. The average particle size of the organic silver salt is defined as the diameter of the particle converted into a spherical shape of the organic silver salt, of which volume is equal to the volume of any of the other shapes, when the particle of the organic silver salt is in any of spherical, rod-like or flat shape. The average particle size of the organic silver salt is preferably in a range of 0.01 to 0.8 μm, and is particularly preferable if it is in a range of 0.05 to 0.5 μm. The state of monodispersed is synonymous with that of silver halide will be described later, and the monodispersed degree of the organic silver salt is preferably in a range of 1 to 30%. In the present invention, it is more preferable that the organic silver salt comprises monodispersed particles having the average particle size of 1 μm or less, and images with higher density are obtainable by preparing the average size into the above-defined range. Furthermore, it is preferable that the rate of the flat-shaped particles of the organic silver salt in number relative to the whole particles of the organic silver is 60% or more. In this invention, the flat-shaped particle is defined as a particle of which rate of the average particle size to the thickness, that is so-called aspect ratio (hereinafter referred to as AR) represented by the equation described below, is 3 or more.

$$AR = \text{Average particle size (μm)/Thickness (μm)}$$

It is preferable that the particles of organic silver salt as described above are preliminary dispersed with a binder, a surfactant or the like upon requirement and then dispersed/crushed by a media dispersing apparatus or a high-pressure homogenizer. The dispersing apparatus usable in the preliminary dispersion includes, for example, ordinary stirrers of anchor type, propeller type and the like, stirrers of high-speed rotary centrifugal emission type (dissolver) and stirrers of high-speed rotary shearing type (homomixer). Further, examples of the media dispersing apparatus include rotary mills, such as a ball mill, a planet ball mill and a vibrating ball mill, a beads mill that is a medium stirring mill, atoriter, other basket mills and the like. Besides, as the high-pressure homogenizer, for examples, various types including the type of impacting against plugs and the like, the type of separating liquid into plural portions and then impacting the portions with each other at high speed, the type of passing through fine orifices and the like can be used.

In the apparatuses to be used for dispersing the organic silver particles used in the present invention, it is preferable to use, for example, ceramics, such as zirconia, alumina, silicon nitride and boron nitride, or diamond as a material for the members to which the organic silver particles contact. Among the above materials, it is particularly preferable to use zirconia.

The organic silver particles used in the present invention preferably contain Zr at a rate of 0.01 to 0.5 mg per 1 g of silver, and particularly preferable to contain Zr at a rate of 0.01 to 0.3 mg. When the above-described dispersion is carried out, it is greatly preferable to optimize the concentration of a binder, the preliminary dispersion method, the operational conditions for the dispersing apparatus, the frequency of dispersing and so on for obtaining the organic silver particles to be used in the present invention.

The smaller average particle size the photosensitive silver halide according to the present invention has, the more preferable it is in view of inhibiting whitening after image forming and obtaining better image quality. The preferred average particle size is 0.1 μm or less, more preferably in a range of 0.01 to 0.1 μm, and particularly preferably in a range of 0.02 to 0.08 μm. The particle size defined here denotes the diameter of a circle that has an area equivalent to that of the individual particle image observed with an electron microscope (circle-equivalent diameter). Further, the silver halide is preferably monodispersed. The monodispersed state used herein means that the monodispersed degree given from the equation described below is to be 40% or less. The monodispersed degree of the particles is more preferably 30% or less, and the particles of which monodispersed degree comes to 20% or less are particularly preferable.

Monodispersed Degree=(Standard Deviation of Particle Size)/(Value of Average Particle Size)×100

Although there is no particular limitation to the shape of the photosensitive silver halide particles, it is preferable that the proportion occupied by the Miller indices surface <100> is high. The preferred rate is 50% or more, the more preferred is 70% or more, and the particularly preferred is 80% or more. The proportion of the Miller indices surface <100> can be measured according to the reference of T. Tani, J. Imaging Sci., 29, 165 (1985), where absorption dependency of <111> surface and <100> surface upon absorption of a sensitizing colorant is utilized.

In the present invention, another preferable shape of the photosensitive silver halide particle is plate-like. The plate-like particle defined herein means that the particle has an aspect ratio (r/h) of 3 or more when the square root of the projected area is r μm and the thickness in the vertical direction is h μm. In the above-defined range of the aspect ratio, the preferred is in the range of 3 to 50. Further, the particle size of the plate-shaped particle is preferably 0.1 μm or less, and more preferably in a range of 0.01 to 0.08 μm. There is a description on such plate-shaped particles in U.S. Pat. Nos. 5,264,337, 5,314,798, 5,320,957, etc., and therefore, it is possible to easily obtain purposive plate-shaped particles.

There is no particular limitation to the photosensitive halogen composition, and it can be any of silver chloride, silver chloride/bromide, silver chloride/bromide/iodide, silver bromide, silver iodide/bromide and silver iodide. The emulsion used in the present invention can be prepared according to the processes described in such publications as, Chimie et Physique Photographique, by P. Glafkides (Published by Paul Montel Inc., 1967); Photographic Emulsion Chemistry, by G. F. Duffin (Published by The Focal Press, 1966); Making and Coating Photographic Emulsion, by V. L. Zelikman et al (Published by The Focal Press, 1964); and the like.

The photosensitive silver halide according to the present invention preferably contains metal ions of metals those belong to any of the groups 6 to 11 of the periodic table. Among those metals, W, Fe, Co, Ni, Cu, Ru, Rh, Pd, Re, Os, Ir, Pt and Au are preferable.

These metal ions can be incorporated into the silver halide in the form of a metal complex or a metal complex ion. The metal complex or a metal complex ion is preferably a six-coordinate metal complex represented by a general formula given below.

$[ML_6]^m$   General Formula

In the above formula, M is a transition metal selected from the elements belonging to the groups 6 to 11 of the periodic table, L is a ligand, and m denotes an integer of 0, −1, −2, −3 and −4. Specific examples of the ligand represented by L include, a ligand of each of halides (fluorides, chlorides, bromides and iodides), cyanides, cyanates, thiocyanates, selenocyanates, tellurocyanates, azides and aquos, and nitrosyls, thionitrosyls and the like. Among the above-exemplified, the preferred is aquo, nitrosyl, thionitrosyl and the like. When the aquo ligand exists, it is preferable that the aquo ligand occupies one or two ligands. The ligands represented by L can be same or different from one another.

M is preferably rhodium (Rh), ruthenium (Ru), rhenium (Re), iridium (Ir) and osmium (Os), and specific examples of the transition metal complex ion containing any of the above-exemplified elements include $[RhCl_6]^{3-}$, $[RuCl_6]^{3-}$, $[ReCl_6]^{3-}$, $[RuBr_6]^{3-}$, $[OsCl_6]^{3-}$, $[IrCl_6]^{4-}$, $[Ru(NO)Cl_5]^{2-}$, $[RuBr_4(H_2O)]^{2-}$, $[Ru(NO)(H_2O)Cl_4]^-$, $[RhCl_5(H_2O)]2-$, $[Re(NO)Cl_5]2-$, $[Re(NO)(CN)_5]^{2-}$, $[Re(NO)Cl(CN)_4]^{2-}$, $[Rh(NO)_2Cl_4]^-$, $[Rh(NO)(H_2O)Cl_4]^-$, $[Fe(CN)_6]^{3-}$, $[Rh(NS)Cl_5]^{2-}$, $[Os(NO)Cl_5]^{2-}$, $[Cr(NO)Cl_5]^{2-}$, $[Re(NO)Cl_5]^-$, $[Os(NS)Cl_4(TeCN)]^{2-}$, $[Ru(NS)Cl_5]^{2-}$, $[Re(NS)Cl_4(SeCN)]^{2-}$, $[Os(NS)Cl(SCN)_4]^{2-}$, $[Ir(NO)Cl_5]^{2-}$, $[Ir(NS)Cl_5]^{2-}$, and the like.

The metal ion, metal complex or metal complex ion described above can be one kind or can be a combination of two or more metals of the same or different kinds, respectively. Generally the content of the metal ion, metal complex and metal complex ion is suitably in a range of $1 \times 10^{-9}$ to $1 \times 10^{-2}$ mol, and preferably in a range of $1 \times 10^{-8}$ to $1 \times 10^{-4}$, relative to 1 mol of silver halide.

It is preferable that a compound that supplies any of the above-described metals is added at the time of forming the silver halide particles and incorporated into the particles of the silver halide. Although the compound can be added at an arbitrary stage prior to or after the preparation of the silver halide particles, that is, forming cores, developing, physical aging and chemical sensitization, it is particularly preferable to add the compound at the stage of forming cores, developing and physical aging, more preferably at the stage of forming cores and developing, and most preferably at the stage of forming cores.

A quantity of the compound can be divided into portions to add the portions over several times. The compound can be distributed uniformly in the silver halide particles or incorporated so that the compound forms a distribution pattern in the particles as described in JP Tokukaisho-63-29603A and Tokukaihei-2-306236A, 3-167545A, 4-76534A, 6-110146A, 5-273683A and so on. It is preferable that the compound forms any distribution pattern in the silver halide particles. Each of the metallic compounds can be added in the form of solution in either water or an appropriate solvent (e.g., alcohols, ethers, glycols, ketones, esters and amides). More specifically, the metallic compound can be added in accordance with any of the following methods, for example, a method of adding in advance an aqueous solution of a powdered metallic compound or an aqueous solution in which a metallic compound, NaCl and KCl are dissolved together to a solution of aqueous silver salt or a solution of aqueous halide, that is under forming particles; a method of adding the metallic compound as the third aqueous solution when a silver salt solution and a halide solution are simultaneously incorporated, to prepare the silver halide particles in a manner of simultaneous incorporation of the three solutions; a method to charge an aqueous solution of a metallic compound in a required amount into a reaction vessel under forming the particles; and a method of adding another portion of silver halide particles having been doped with the ions or complex ions of a metal in advance at the time of preparing the silver halide and dissolve them. Among those methods described above, it is preferable to employ the method of adding an aqueous solution, in which an aqueous solution of a powdered metallic compound or a metallic compound is dissolved together with NaCl and KCl, to a solution of an aqueous halide.

When adding the metallic compound to the surfaces of the particles, it is also possible to charge a required amount of the metallic compound solution into a reaction vessel just after forming the particles, or on the way or after completion of the physical aging, or during the chemical aging.

In the present invention, desalting of the photosensitive silver halide particles following to forming the particles can be or can not be required. However, when the desalting is applied, washing and desalting can be carried out according to a known method in the field, for example, the noodle method, the flocculation method or the like.

It is preferable for the silver halide particles to be chemically sensitized. The methods for chemically sensitizing the particles usable in the present invention include sulfur sensitization method, selenium sensitization method, tellurium sensitization method and the like, which are well known in the field. Besides, the noble metal sensitization method using a gold, platinum, palladium, or iridium compound and the reduction sensitization method also can be used.

As the compounds suitably used for the above-described methods of sulfur sensitization method, selenium sensitization method and tellurium sensitization method, compounds in the public domain can be used. For example, compounds disclosed in JP Tokukaihei-7-128768A can be used for such methods. As a tellurium sensitizing agent, for example, diacyltellurides, bis(oxycarbonyl)tellurides, bis(carbamoyl) tellurides, diacyltellurides, bis(oxycarbonyl)ditellurides, bis(carbamoyl)ditellurides, compounds each having P—Te bond(s), tellurocarboxylates, Te-organyltellurocarboxylic acid esters, di(poly)tellurides, tellurides, tellurols, telluroacetals, tellurosulfonatos, compounds each having P-Te bond(s), Te-containing heterocycles, tellurocarbonyl compounds, inorganic tellurium compounds, colloidal tellurium, and the like can be used.

As the compounds suitably used in the noble metal sensitization method, for example, chloroauric acid, potassium chloroaurate, potassium aurithiocyanate, gold sulfide, gold selenide, and compounds disclosed in U.S. Pat. No. 2,448,060 and UK Patent No. 618,061, etc. can be given.

As the compound used in the reduction sensitization method, for example, in addition to ascorbic acid and thiourea dioxide, stannous chloride, aminoiminomethanesulfinic acid, hydrazine derivatives, borane compounds, silane compounds, polyamine compounds and the like can be used. In addition, the reduction sensitization can be achieved by retaining pH of the solver halide emulsion at 7 and pAg thereof at 8.3 or less and then carrying out the aging. Also, the reduction sensitization can be achieved by incorporating the single addition portion of solver ions under forming the particles.

It is preferable for the photothermographic imaging material according to the present invention to contain a reducing agent. Generally-known reducing agents can be used for the photothermographic imaging material of the present invention. For example, phenols, polyphenols each including 2 or more phenol groups, naphthols, bisnaphthols, polyhydroxybenzenes each including 2 or more hydroxy groups, polyhydroxynaphthalenes each including 2 or more hydroxy groups, ascorbic acids, 3-pyrazolidones, pyrazoline-5-ones, pyrazolines, phenylenediamines, hydroxylamines, hydroquinone monoethers, hydroxamic acids, hydrazides, amidoximes, N-hydroxyureas can be given as examples of the reducing agent. More specifically, the reducing agents specifically disclosed in U.S. Pat. Nos. 3,615,533, 3,679,426, 3,672,904, 3,751,252, 3,782,949, 3,801,321, 3,794,488, 3,893,863, 3,887,376, 3,770,448, 3,819,382, 3,773,512, 3,839,048, 3,887,378, 4,009,039, 4,021,240, UK Patent No. 1,486,148, Belgium Patent No. 786,086, JP Tokukaisho-50-36143A, 50-36110A, 50-116023A, 50-99719A, 50-140113A, 51-51933A, 51-23721A and 52-84727A, and JP Sho-51-35851B can be given. Any of the reducing agents in the public domain exemplified above can be selected fitly to use for the present invention. In the selection of the reducing agent, it is the most efficient way to practically prepare the photothermographic imaging materials each containing a respective reducing agent and directly assess its photographic performance to check propriety of the reducing agent.

Among the reducing agents exemplified above, when an aliphatic carboxylic acid silver salt is used as an organic silver salt, preferred ones include: polyphenols in each of those which two or more phenol groups are connected by alkylene groups or sulfur atoms; in particular, polyphenols in each of those which two or more phenol groups each being substituted with alkyl (e.g., methyl, ethyl, propyl, t-butyl, cyclohexy, etc.) or acyl (e.g., acetyl, propionyl, etc.) on at least one of positions adjacent to hydrogen-substituted position in the phenol group are connected by alkylene groups or sulfur atoms; polyphenol compounds disclosed in U.S. Pat. Nos. 3,589,903 and 4,021,249, UK Patent No. 1,486,148, JP Tokukaisho-51-51933, 50-36110, 50-116023, 52-84727 and JP Sho-51-35727B, that is, for example, 1,1-bis(2-hydroxy-3,5-dimethylphenyl)-3,5,5-trimethylhexane, 1,2-bis(2-hydroxy-3-t-butyl-5-methylphenyl)methane, 1,1-bis(2-hydroxy-3,5-di-t-butylphenyl)methane, (2-hydroxy-3-t-butyl-5-methylphenyl)-(2-hydroxy-5-methylphenyl)methane, 6,6'-benzylidene-bis(2,4-di-t-butylphenol), 6,6'-benzylidene-bis(2-t-butyl-4-methylphenol), 6,6'-benzylidene-bis(2,4-dimethylphenol), 1,1-bis(2-hydroxy-3,5-dimethylphenyl)-2-methylpropane, 1,1,5,5,-tetrakis(2-hydroxy-3,5-dimethylphenyl)-2,4-ethylpentane, 2,2-bis(4-hydroxy-3,5-dimethylphenyl)propane, 2,2-bis(4-hydroxy-3,5-di-t-butylphenyl)propane and the like; bisnaphthols disclosed in U.S. Pat. No. 3,672,904, for example, 2,2'-dihydroxy-1,1'-binaphthyl, 6,6'-dibromo-2,2'-dihydroxy-1,1'-binaphthyl, 6,6'-dinitro-2,2'-dihydroxy-1, 1'-binaphthyl, bis(2-hydroxy-1-naphthyl)methane, 4,4'-dimethoxy-1,1'-dihydroxy-2,2'-binaphthyl and the like; sulfonamidephenols or sulfonamidenaphthols as disclosed in U.S. Pat. No. 3,801, 321, that is, for example, 4-benzenesulfonamidephenol, 2-benzenesulfonamidephenol, 2,6-dichloro-4-benzenesulfonamidephenol, and 4-benzenesulfonamidenaphthol; polyphenol compounds disclosed in JP Tokugan-2002-

32225 and 2002-119143; and the like. Among the compounds exemplified above, the particularly preferred are polyphenol compounds disclosed in JP Tokugan-2002-32225 and 2002-119143.

An appropriate quantity of the reducing agent used for the photothermographic imaging material according to the present invention varies depending on the type of the organic silver salt to be used, the type of the reducing agent, and the other additives. However, the appropriate quantity to be used is typically in a range of 0.05 to 10 mol, preferably 0.1 to 3 mol, relative to 1 mol of the organic silver salt. Note that 2 or more of the reducing agents exemplified above can be used in combination as far as the quantity thereof in total falls within the above-defined range. In the present invention, it is preferable to add the reducing agent to the coating solution for the photosensitive layer just before applying the coating solution in order to minimize fluctuation in the photographic performance due to the effect deriving from the stationary period of time of the coating solution for the photosensitive layer.

Now, the constitutional elements of the photothermographic imaging material according to the present invention except the characteristics having been explained above will be described below.

The photothermographic imaging material according to the present invention is formed by laminating an image forming layer containing the above-explained organic silver salt, photosensitive silver halide and a reducing agent and a protective layer in this order onto a support. In addition, upon requirement, an intermediate layer is further formed between the support and the image forming layer to thereby provide the photothermographic imaging material in a preferable form.

Further, the photothermographic imaging material provided with a backing layer on the face opposing to the image forming layer for securing the feeding performance and preventing from blocking with the protective layer can be suitably used. Note that each of those layers can comprise a single layer or, 2 or more layers comprising the same or different compositions.

In the present invention, a resin binder is preferably used for forming the respective layers described above. For such a resin binder, any of transparent or opaque resins for binder use having been conventionally used can be appropriately selected and used. Examples of such a resin binder include, poly(vinyl acetal) resins, such as poly(vinyl formal), poly(vinyl acetoacetal) and poly(vinyl butylal); cellulose system resins, such as ethyl cellulose, hydroxyethyl cellulose and cellulose acetate butyrate; styrene resins, such as polystyrene, styrene-acrylonitrile copolymer and styrene-acrylonitrile-acryl rubber copolymer; vinyl chloride resins, such as poly(vinyl chloride) and chlorinated polypropylene; polyesters, polyurethanes, polycarbonates, polyacrylates, epoxy resins, acryl resins, and the like. These resins exemplified above can be used either alone or in combination of 2 or more thereof.

Any of the binder resins can be used selectively upon requirement for the protective layer, the intermediate layer, or the back coat layer. The back coat layer is provided if it is necessary, unless the use of the resin does not impair the object of the present invention. Note that an epoxy resin, an acryl monomer and the like, that are curable with active energy rays, can be used as the binder resin for forming the layers. In the present invention, aqueous binder resins as exemplified below can also be preferably used.

As the preferable resin to be used, water-soluble polymers or water-dispersible hydrophobic polymers (latexes) can be given. Examples of such polymers include poly(vinylidene chloride), copolymer of vinylidene chloride and acrylic acid, copolymer of vinylidene chloride and itaconic acid, poly(sodium acrylate), poly(ethylene oxide), copolymer of acrylic amide and acrylate, copolymer of styrene and maleic anhydride, acrylonitrile-butadiene copolymer, copolymer of vinyl chloride and vinyl acetate, copolymer of styrene and butadiene and acrylic acid, and the like. Although each of these polymers is in the state of aqueous coating solution, it is dried after the coating was made and forms a uniform film of resin at the time when formation of the coated film was completed. When any of such polymers is used, an organic silver salt, silver halide, a reducing agent or the like is used as an aqueous dispersant and mixed with any of said latexes to prepare a uniform dispersion, followed by coating of the dispersion, allowing to form the thermal development image forming layer. The particles of the latex are fused during drying to form a uniform film. Further, it is preferable to use a polymer having glass transition point is in a range of from −20 to 80° C., and particularly preferable from −5 to 60° C. This is because, a temperature required for the thermal development becomes high if the glass transition point is higher than the above-defined range, while fogging tends to occur, which causes deterioration of the sensitivity and induce soft focus if the glass transition point is lower than the above-defined range. As the water-dispersible polymer, it is preferable to use the one in which the particulates having the average particle size in a range of from 1 nm to several µm are dispersed. Water-dispersible hydrophobic polymer is called latex. Among latexes having been used widely for aqueous coatings, it is preferable to use latex that can improve resistance to water. The quantity of the latex to be used as a binder for improving resistance to water is determined in consideration of the coating property. However, in view of the moisture-resistant property, it is believed that the greater quantity gives better result in the moisture resistance. Thus, the rate of the latex to the whole mass of the binder is preferably in a range of from 50 to 100%, and particularly preferable from 80 to 100%.

In the present invention, the solid content of any of the binder resins is preferably 0.25 to 10 times of the quantity of silver to be coated. For example, when the coated quantity of silver is 2.0 g/m², the quantity of the polymer to be coated is preferably in a range of from 0.5 to 20 g/m². More preferably, the solid content of the binder resin is in a range of from 0.5 to 7 times of the coated quantity of silver. In this case, for example, when the coated quantity of silver is 2.0 g/m², the solid content of the polymer is 1.0 to 14 g/m². On the other hand, it becomes useless because silver tone greatly deteriorates when the quantity of the binder resin is less than 2.5 times of the coated quantity of silver, while it becomes useless because of soft focus when the quantity of the binder resin is greater than 10 times of the coated quantity of silver.

In addition, various additives, such as an antifoggant, a toner, a sensitizing colorant, and a substance inducing supersensitization (also designated as a supersensitization agent), can be added upon necessity to the image forming layer according to the present invention in addition to the above-described essential components and the binder resin.

In the present invention, for example, compounds disclosed in U.S. Pat. Nos. 3,874,946 and 4,756,999, heterocyclic compounds each including one or more substituents represented by a formula —C($X^1$)($X^2$)($X^3$), (wherein $X^1$ and $X^2$ each represent a halogen atom, and $X^3$ represents hydrogen or a halogen atom), compounds disclosed in JP Tokukaihei-9-288328 and 9-90550, U.S. Pat. No. 5,028,523, European Patent Nos. 600,587, 605,981 and 631,176, etc. can be used as an antifoggant upon necessity.

Examples of the toner that is added for improving silver tone after development include, imides (e.g., phthalimide); cyclic imides, pyrazoline-5-ones, and quinazoline (e.g., succinimide, 3-phenyl-2-pyrazoline-5-one, 1-phenylurazole, quinazoline and 2,4-thiazolidinedione); naphthalimides (e.g., N-hydroxy-1,8-naphthalimide); cobalt complexes (e.g., hexamine trifluoroacetate of cobalt), mercaptans (e.g., 3-mercapto-1,2,4-triazole); N-(aminomethyl)aryldicarboxyimides (e.g., N-(dimethylaminomethyl)phthalimide); blocked pyrazoles, combinations of isothiuronium derivatives and a certain kind of photobleaching agent (e.g., a combination of N,N'-hexamethylene(l-carbamoyl-3,5-dimethylpyrazole), 1,8-(3,6-dioxaoctane)bis(isothiuroniumtrifluoroacetate) and 2-(tribromomethylsulfonyl)benzothiazole); merocyanine dyes (e.g., 3-ethyl-5-((3-ethyl-2-benzothiazolinylidene (benzothiazolinylidene))-l-methylethylidyne)-2-thio-2,4-oxazolidinedione); phthalazinone, phthalazinone derivatives or metal salts thereof (e.g., 4-(1-naphthyl)phthalazinone, 6-chlorophthalazinone, 5,7-dimethyloxyphthalazinone, and 2,3-dihydro-1,4-phthalazinedione); combinations of phthalazinone and sulfinic acid derivatives (e.g., 6-chlorophthalazinone+sodium benzenesulfinate, or 8-methylphthalazinone+sodium p-trisulfonate); combinations of phthalazine and phthalic acid; combinations of phthalazine (including adducts of phthalazine), maleic anhydride and at least one selected from a group consisting of phthalic acid, 2,3-naphthalenedicarboxylic acid, or o-phenylenic acid derivatives and anhydrides thereof (e.g., phthalic acid, 4-methylphthalic acid, 4-nitrophthalic acid and tetrachlorophthalic anhydride); quinazolinediones, benzoxazine, nartoxazine derivatives; benzoxazine-2,4-diones (e.g., 1,3-benzoxazine-2,4-dione); pyrimidines and asymmetric-triazines (e.g., 2,4-dihydroxypyrimidine), and tetraazapentalene derivatives (e.g., 3,6-dimercapto-1,4-diphenyl-1H,4H-2,3a,5,6a-tetraazapentalene). Among the examples recited above, the preferred toners are phthalazone and phthalazine. Note that the toner in only a certain quantity range that will not inhibit the object of the present invention can be added to the protective layer described later.

As the supersensitizing agent, compounds disclosed in RD No. 17643, JP Hei-9-25500B, 43-4933B, JP Tokukai-sho-59-19032A, and 59-192242A and Tokukaihei-5-341432A, etc. can be selected to use upon necessity. In the present invention, aromatic heterocyclic mercapto compounds represented by the following general formula (M) and disulfide compounds represented by a general formula (Ma) substantially generating the above-described mercapto compounds can be used as the supersensitizing agent.

Ar—SM  General Formula (M)

Ar—S—S—Ar  General Formula (Ma)

In the general formula (M), M represents hydrogen or an alkali metal atom, and Ar presents an aromatic heterocycle or a condensed aromatic heterocycle, having one or more atoms selected from a group consisting of nitrogen, sulfur, oxygen, selenium and tellurium. The aromatic heterocycle is preferably benzimidazole, naphthoimidazole, benzothiazole, naphthothiazole, benzoxazole, naphthoxazole, benzoselenazole, benzotellurazole, imidazole, oxazole, pyrazole, triazole, triazine, pyrimidine, pyridazine, pyrazine, pyridine, purine, quinoline or quinazoline. In the general formula (Ma), Ar is synonymous with the general formula (M).

The aromatic heterocycle described above can include substituents selected from a group consisting of, for example, halogen atoms (e.g., Cl, Br and I), hydroxy, amino, carboxyl, alkyl (e.g., alkyl groups each containing one or more carbon atoms, and preferably 1 to 4 carbon atoms) and alkoxy (e.g., alkoxy groups each containing one or more carbon atoms, and preferably 1 to 4 carbon atoms).

It is preferable for the supersensitizing agent used in the present invention to be used in the emulsion layer containing particles of an organic silver salt and silver halide in a quantity range of from 0.001 to 1.0 mol per 1 mol of silver, and particularly preferable in the range of from 0.01 to 0.5 mol per 1 mol of silver.

In the image recording layer according to the present invention, it is possible to render the layer to contain a large cyclic compound containing hetero atoms. The large cyclic compound is preferably at least 9-membered, more preferably 12- to 24-membered, and still further preferably 15- to 21-membered cyclic compound, containing as the hetero atoms at least one species of atom selected from nitrogen, oxygen, sulfur and selenium.

The representative compounds of the large cyclic compounds are crown ethers, those which are ones synthesized by Pederson in 1967 and various ones having been synthesized following to that special report. These compounds are described in C. J. Pederson, Journal of American chemical society vol. 86(2495), 7017–7036 (1967), G. W. Gokel, S. H. Korzeniowski, "Macrocyclic polyether synthesis", Springer-Vergal (1982), etc.

Other than the additives described above, for example, a surfactant, an oxidant, a stabilizing agent, a plasticizer, a ultraviolet radiation absorbent, and a coating auxiliary can be used in the image forming layer according to the present invention. For these additives and the additives described previously, compounds described in RD Item 17029 (June, 1978, pages 9 to 15) are preferably used.

In the present invention, the image forming layer can comprise a single layer or a plurality of layers consisting of the same or different compositions. Note that the thickness of the image forming layer is normally in a range of from 10 to 30 μm.

Now, the support and the protective layer, which are essential compositions for forming the layers of the photothermographic imaging material according to the present invention, will be described below.

For the support used for the photothermographic imaging material of the present invention, a resin film of, for example, acrylates, metacrylates, poly(ethylene terephthalate), poly(butylene terephthalate), poly(ethylene naphthalate), polycarbonate, polyallylate, poly(vinyl chloride), polyethylene, polypropylene, polystyrene, nylon, aromatic polyamide, polyether ether ketone, polysulfone, polyether sulfone, polyimide, polyether imide, triacetyl cellulose, etc., a resin film comprising two or more of the resins exemplified above in the form of laminated layers, or the like can be used.

In the image recording method that will be described later, the support according to the present invention is developed by heat to form images following to forming of the latent images. Therefore, the support having been drawn into a film shape and thermally set is preferable in view of the dimension stability. Within a range by which the advantageous effect of the present invention is not impaired, a filler, such as zinc oxide, barium sulfate and calcium carbonate, can be added. Note that the support is formed in a thickness in a range of from 10 to 500 μm, and preferably from 25 to 250 μm.

As the protective layer to be used for the photothermographic imaging material according to the present invention, the binder resins described above in connection with the image forming layer can be used by selecting any of them upon requirement.

As the additive to be incorporated to the protective layer, it is preferable to contain a filler in order to prevent the images after their thermal development from having damages and to secure the feeding performance of the layer. When a filler is incorporated, the content thereof in the whole composition forming the layer is preferably in a range of 0.05 to 30% by mass.

Furthermore, a lubricant and an antistatic agent can be incorporated into the protective layer for improving the lubrication and electrification properties thereof. Examples of such a lubricant include, fatty acids, fatty acid esters, fatty acid amides, polyoxyethylene, polyoxypropylene, (denatured) silicon oils, (denatured) silicon resins, fluororesins, carbon fluoride, waxes, etc. Examples of the antistatic agent include, cationic surface-active agents, anionic surface-active agents, nonionic surface-active agents, macromolecular antistatic agents, metal oxides and electro-conductive polymers, compounds listed in "11,290 Items of Commercialized Chemicals", issued by Kagaku Kogyo Nippo Co., Ltd., pages 875–876, compounds described in U.S. Pat. No. 5,244,773, columns 14 to 20, and the like. Further, within the range by which the object of the present invention is not impaired, various types of additives to be added into the image forming layer can be incorporated into the protective layer also. The quantity of each of the additives to be incorporated into the protective layer is preferably in a range of 0.01 to 20% by mass with respect to the whole compositions forming the protective layer, and more preferably from 0.05 to 10% by mass.

In the present invention, the protective layer can be a single layer or a plurality of layers consisting of the same or different compositions. Note that the thickness of the protective layer is normally in a range of from 1.0 to 5.0 µm.

In the present invention, in addition to the image forming layer, the support and the protective layer, an intermediate layer adapted to improve film adhesion between the support and the image forming layer and a back coat layer for providing feeding and antistatic performance can be formed. When these layers are formed, the thickness of the intermediate layer is normally in a range of 0.05 to 2.0 µm, and that of the backing layer is normally in a range of 0.1 to 10 µm.

Each of the coating solutions for the image forming layer, and the protective layer, and further the intermediate and backing layers, the later two layers are formed upon necessity, can be prepared by dissolving or dispersing the components as described above, respectively, into a solvent.

As the solvent usable in the preparation described above, any of solvents each having a solubility parameter value in a range of 6.0 to 15.0, which are set forth in a reference, "Solvent Pocket Book" edited by Organic Synthesis Chemistry Association, etc., can be used. Examples of the solvents usable for the coating solutions for forming the respective layers according to the present invention include ketones such as, for example, acetone, isophoron, ethyl amyl ketone, methyl ethyl ketone, methyl isobutyl ketone and the like; alcohols such as, for example, methyl alcohol, ethyl alcohol, n-propyl alcohol, isopropyl alcohol, n-butyl alcohol, isobutyl alcohol, diacetone alcohol, cyclohexanol, benzyl alcohol and the like; glycols such as, for example, ethylene glycol, diethylene glycol, triethylene glycol, propylene glycol, hexylene glycol and the like; ether alcohols such as, for example, ethylene glycol monomethyl ether, diethylene glycol monoethyl ether and the like; ethers such as, for example, ethyl ether, dioxane, isopropyl ether and the like; esters such as, for example, ethyl acetate, butyl acetate, amyl acetate, isopropyl acetate and the like; hydrocarbons such as, for example, n-pentane, n-hexane, n-heptane, cyclohexane, benzene, toluene, xylene and the like; and chlorides such as, for example, methyl chloride, methylene chloride, chloroform, dichlorobenzene and the like. However, the usable solvents are not limited to the examples recited above, and any solvents can be used unless they impair the advantageous effect of the present invention.

The solvents exemplified above can be used either alone or in combination of several kinds thereof. Note that the residual amount of the solvent in the photothermographic imaging material can be controlled by appropriately setting the conditions such as temperature in the step of drying following to the coating process. The residual amount of the solvent is preferably in a range of from 5 to 1,000 mg/m$^2$, and more preferably from 10 to 300 mg/m$^2$ in total.

When it is required to apply dispersing at the time of preparing the coating solutions, a conventionally well-known dispersing apparatus can be selected from, for example, double roll mill, triple roll mill, ball mill, pebble mill, cobol mill, tron mill, sand mill, sand grinder, Sqegvari atolighter, high-speed impeller dispersing apparatus, high-speed stone mill, high-speed impact mill, disper, high-speed mixer, homogenizer, supersonic dispersing apparatus, open kneader, continuous kneader and the like, and appropriately used for the dispersion.

For applying the coating solutions prepared as described above, a coater station known in the earlier development can be selected from, for example, extruding coater of the extrusion system, reverse roll coater, gravure roll coater, air doctor coater, blade coater, air knife coater, squeeze coater, impregnation coater, bar coater, transfer roll coater, kiss coater, cast coater, spray coater and the like, and appropriately used for the application. Among the coaters exemplified above, it is preferable to use an extruding coater of the extrusion system or a roll coater such as reverse roll coater in order to prevent unevenness in the thickness of the formed layer from occurring.

Besides, there is no particular limitation to the coater in case the image forming layer will not be damaged by the coater. However, if there is a fear that the solvent used for the coating solution for forming the protective layer dissolves the image forming layer when the protective layer is applied, among the coater stations exemplified above, it is needed to use an extruding coater of the extrusion system, a gravure coater, a bar coater or the like. Note that, when a contacting-type coater, such as a gravure coater and a bar coater, is used, the rotating direction of the gravure coater or bar coater can be either forward or reverse. If the rotating direction is forward, the rotation can be effectuated either at uniform speed or at a speed with a certain circumferential speed difference.

When laminating the respective constitutional layers, coating and drying can be repeated for each of the layers. Alternatively, it is also allowable to simultaneously coat the superimposed layers by employing the wet-on-wet system and then dry the layers. In this case, the coating can be achieved by using, for example, any of reverse roll coater, gravure roll coater, air doctor coater, blade coater, air knife coater, squeeze coater, impregnation coater, bar coater, transfer roll coater, kiss coater, cast coater, spray coater and the like, and extruding coater of the extrusion system in combination. In the coating of superimposed layers by the wet-on-wet system, adhesion between the upper and lower layers can be improved because the upper layer is coated while the lower layer is still remained in wet condition.

Furthermore, in the present invention, at least following to applying the coating solution for the image forming layer, it is preferable to set the temperature for drying the coated film at a range of 65 to 100° C. in order to efficiently achieve the object of the present invention. If the drying temperature is lower than 65° C., the reaction can be completed insufficiently, leading to cause fluctuations in the sensitivity along with the lapse of time. Besides, if the drying temperature is higher than 100° C., it is unfavorable since fogging (coloring) can occur in the photothermographic imaging material itself in the state right after the manufacture thereof. In addition, although it is not possible to flatly defined the drying period of time because it depends on the volume of blowing air at the time of drying, it is preferable to dry the coated film within 2 to 30 minutes if it is under a normal condition.

Besides, with respect to the drying temperature, the coated film can be dried just after the coating at the temperature in the above-defined range, or the coated film can be dried at a temperature lower than 65° C. in the initial stage and then at the above-defined range in view of the object preventing Marangoni effect caused by the coating solution during drying and the unevenness (orange peel-like surface texture) of the film caused by the initial drying in the vicinity of the surface due to dried warm blowing air from occurring.

As described above, with the photothermographic imaging material and the suitable process for manufacturing the same according to the present invention, the object of the present invention can be achieved. Furthermore, by optimizing the image forming method, it becomes possible to obtain clear images with no interference fringes.

Now, the image forming method suitable for the photothermographic imaging material according to the present invention will be described in detail.

The image forming methods usable in this invention are classified into three major aspects based on the angle given by a surface to be exposed and the direction of laser beams, the wavelength of the laser beams, and the number of the laser beams to be used. Each of the classified aspects can come into effect solely, or two or more of the aspects can be combined to achieve the image forming method. By constituting the method in such a way, it becomes possible to obtain clear images with no interference fringes.

In this invention, the suitable aspect of the image forming method is to form images by scanning exposure using laser beams which give an angle that never be substantially vertical with respect to the surface of the photothermographic imaging material to be exposed. It is understood that, since light pass difference reaching the image forming layer is increased by forcing the incident angle to be out of the vertical direction even when reflection light is supposed to be generated at the interface of the layers, scattering in the light pass and attenuation of the laser beams occurs to thereby cause less occurrence of the interference fringes. Note that the wording of "never be substantially vertical" means that the angle closest to the vertical direction during laser scanning is preferably in a range of from 55° to 88°, and more preferably from 60° to 86°, and still more preferably from 65° to 84°.

In addition, a further suitable aspect of the image forming method according to the present invention is to form images by scanning exposure using longitudinal multi-laser of which exposure wavelength is not single. By scanning with such longitudinal multi-laser beams of which wavelength having a certain width, the occurrence of the interference fringes becomes less comparing to scanning laser beams of the longitudinal single mode. Note that the wording of "longitudinal multi" used here means that the exposure wavelength is not single. Normally, the distribution of the exposure wavelengths is required to be 5 nm or more, and preferably 10 nm or more. Although there is no particular limitation to the upper limit of the exposure wavelength distribution, it is normally 60 nm more or less.

In the image recording method described above, any of generally-known lasers including solid lasers, such as ruby laser, YAG laser, and glass laser; gas lasers, such as He—Ne laser, Ar ion laser, Kr ion laser, $CO_2$ laser, Co laser, He—Cd laser, $N_2$ laser and excimer laser; semiconductor lasers, such as InGaP laser, AlGaAs laser, GaAsP laser, InGaAs laser, InAsP laser, $CdSnP_2$ laser and GaSb laser; chemical lasers; pigment lasers; and the like can be appropriately selected to use for a desired application. However, the image forming method is characterized in that the semiconductor laser having a wavelength in a range of 600 to 1,200 nm is preferably used among the above-exemplified lasers in view of the maintenance and the size of the light source.

Besides, with respect to the laser used by a laser imager and a laser image setter, the beam spot diameters on the exposing surface of the photothermographic imaging material when scanning is applied to said photothermographic imaging material are generally in a range of 5 to 75 μm for that of the short axis and in a range of 5 to 100 μm for that of long axis. The laser beam scanning speed can be fixed at an optimum value for each photothermographic imaging material according to the sensitivity at a laser oscillation wavelength inherent to the photothermographic imaging material and laser power.

Next, the photothermographic imaging material of the invention is further explained.

The photothermographic imaging material of the invention comprises a photosensitive silver halide and silver salt of aliphatic carboxylate, wherein a photosensitive emulsion is prepared in that the photosensitive silver halide is not present in a synthesis of non-photosensitive aliphatic carboxylate, and the photosensitive silver halide is mixed after completion of the synthesis.

In the following, the photosensitive silver halide, an organic fatty acid silver salt, a binder, a crosslinking agent and various additives, the coating technique, and condition for light exposure and development, all of those which are used for the photothermographic imaging material according to this invention, will be described in turn.

(Photosensitive Silver Halide)

The photosensitive silver halide functions as a light sensor, and it is therefore preferable that the particle size of the photosensitive silver halide is less in the dimension in order to diminish the whitening after image formation and to form images with good image quality. The average particle size of the silver halide is less than 0.08 μm, preferably in a range of 0.01 to 0.08 μm, and particularly preferable in a range of 0.02 to 0.06 μm. It is preferable that the content of the particles having the smaller particle size is 70% or higher. On the other hand, in view of the sensitivity and the tone adjustment, the particles have preferably somewhat larger particle size. Therefore, the average particle size of the silver halide is preferably less than 0.1 μm, more preferably in a range of 0.04 to 0.1 μm, and the most preferably in a range of 0.05 to 0.08 μm. The content of the particles having the larger particle size is preferably not higher than 30%.

There is no particular limitation for the shape of the particles of the photosensitive silver halide, and the particles can take any form of normal crystal forms, such as cubical and octahedral, and abnormal crystal forms, such as spherical, virgate, and plate-like. In addition, there is no particular limitation for the source of the silver halide, and any of silver chloride, silver chloride/bromide, silver chloride/iodide/bromide, silver bromide, silver iodide/bromide, and silver iodide can be used.

The amount of the photosensitive silver halide to be used as a sensing material is preferably in a range of 2 to 8%, and more preferably 3 to 6% in terms of the silver rate relative to the amount of the nonphotosensitive aliphatic silver carboxylate that will be described later.

It is preferable that the photosensitive silver halide according to this invention contains metal ions of metals those which belong to the groups of 6 to 11 of the periodic law table of the elements in the half portion at the surface side of the volume of the particles. As the metals, the prefered are W, Fe, Co, Ni, Cu, Ru, Rh, Pd, Re, Os, Ir, and Pt, and in particular preferred are Fe, Co, Ru, Rh, Re, Os and Ir. It is preferable that ions of at least one of the above-enumerated elements are contained in the portion of the surface side from the three fifth portion of the volume of the silver halide particles, and more preferable that ions of the metals of the equivalent mol are contained in the portion of the surface side from three fourth portion of the volume of the silver halide particles.

The ions of the metals can be introduced into the silver halide in the form of metal complexes or metal complex ions. As the metal complex or metal complex ions, a six-coordination complex represented by the following general formula is preferred.

$$[ML_6]^m \text{ General} \qquad \text{general formula}$$

In the formula shown above, M represents a transition element selected from the elements belonging to the groups 6 to 11 of the periodic law table, L represents a ligand, and m is 0, 2, 3 or 4. Concrete examples of the ligand represented by L include ligands of halides, (e.g., fluorides, chlorides, bromides and iodides), cyanides, cyanates, selenocyanatos, tellurocyanatos, azides and aquos, and nitrosyl, thionitrosyls and the like. The preferred are acquo ligand, nitrosyl, thionitrosyl, etc. When the aquo presents, it is preferable that it occupies one or two ligands. L can be same or different from one another.

Preferred concrete examples of M include rhodium (Rh), ruthenium (Ru), rhenium (Re), iridium (Ir) and osmium (s).

The metal ions, metal complexes and metal complex ions to be used can be one type, or those of 2 or more of the same metal or different metals can be used in combination. The contents of those metal ions, metal complexes and metal complex ions are appropriately in a range of $1\times10^{-9}$ mol to $1\times10^{-2}$ mol relative to 1 mol of the silver halide in general, and preferably in a range of $1\times10^{-8}$ mol to $1\times10^{-4}$ mol.

The compounds supplying the above-described metals are preferably added during the preparation of the silver halide particles so that the compound is incorporated in the silver halide particles. The addition of the compounds can be carried out at any stages during the preparation of the silver halide particles, that is, before or after the seed formation, the growth and physical aging of the particles, and the application of chemical sensitization. However, it is preferable to add the compounds at the stage of the seed formation, the growth or the physical aging, and more preferable at the stage of the seed formation or the growth, and most preferably at the stage of the seed formation.

The addition of the compound can be performed by dividing the compound into several portions to incorporate each portion into the silver halide particles over several times, or can be performed so as to form a given distribution of the compound in the particles in accordance with methods described in JP Tokukaisho-63-29603, and Tokukaihei-2-306236, -3-167545, -4-76534, -6-110146 and -5-273683, etc. The method of forming a distribution of the compounds in the particles is preferred.

The compounds supplying the metals can be added following to dissolving the compound in water or an appropriate organic solvent, e.g., alcohols, ethers, glycols, ketones, esters, and amides. Alternatively, the compound can be added according to, for example, a method to add the aqueous solution of the powdered metal compound or the solution in which the metal compound, sodium chloride and potassium chloride are dissolved in together into the aqueous solution of silver salt or the aqueous halide solution during formation of the particles; a method to add the metal compound in a form of the third aqueous solution into the silver salt solution and the halide solution when they are mixed at the same time to prepare the silver halide particle in a manner of simultaneous mixing of three solutions; a method to charge a required quantity of the aqueous solution of the metal compound into a reactor during formation of the particles; or a method to add the other silver halide particles having been doped in advance with metal ions or metal complex to dissolve the metal compound during the preparation of the silver halide. The particularly preferred is the method to add the solution, in which the aqueous solution of the powdered metal compound or the metal compound, sodium chloride, and potassium chloride are dissolved in together, into the aqueous halide solution.

Alternatively, when the metal compound is added onto the surface of the particles, a required quantity of metal compound in an aqueous solution can be charged into the reactor just after the particles formation, or during or after the end of the physical aging, or at the time of the chemical aging.

The photosensitive silver halide particles need to be or need not to be desalted after the formation of particles. When they are desalted, the desalting can be performed by washing according to any of known methods in the field including the noodle method, the flocculation method and so on.

As the methods for preparing the silver halide emulsion containing the photosensitive silver halide particles according to this invention, the methods described in "Chimie et Physique Photographique", by P. Glafkides (published by Paul Montel Corp., 1967); "Photographic Emulsion Chemistry", by G. F. Duffin (published by The Focal Press, 1966); and "Making and Coating Photographic Emulsion", by V. L. Zelikman et al (published by The Focal Press, 1964) are given. The silver halide emulsion used for the present invention can be prepared according to any of these methods. That is, the silver halide emulsion can be prepared by any of the acidic method, the neutral method, the ammonia method and the like, and for reacting a soluble silver salt and a soluble halogenous salt, any of the one side mixing method, the simultaneous mixing method and the combination thereof can be employed.

As the representative example, the silver halide emulsion is prepared by mixing an aqueous solution of a silver salt and an aqueous solution of a halide in a protective colloid solution (a hydrophilic colloids, such as gelatin, is used) that will be the reaction mother liquor, followed by the seed formation and crystal growth. However, the double jet method is generally used as the method for adding a halide solution and an aqueous silver salt solution. Further, among the double jet method, the control double jet method, that mixes each of the components while controlling pAg and pH to perform the seed formation and the crystal growth is the representative method. Further, the double jet method includes various variations, for example, a method to perform the addition through two steps, that is, the first step to prepare the seed particles (the seed formation), followed by the second step to perform the growth of the particles under the same conditions or the alternative conditions. In short, it is well-known in the field to control the crystal habit and the size of the crystals in various ways following to fixing the conditions for mixing an aqueous solution of a silver salt and an aqueous solution of a halide in the mixing step in the aqueous protective colloid solution. Following to the mixing step, a desalting step for removing excess salts from the prepared emulsion is carried out. As the desalting process, the flocculation method that adds a flocculant to the prepared silver halide emulsion to flocculate the silver halide particles together with gelatin functioning as the protective colloids to separate the silver halide particles from the supernatant containing the salts. In the desalting process, the supernatant is removed by decantation operation, and dissolution, flocculation, and decantation operations are repeated in order to remove excess salts contained in the gelatin precipitation containing the silver halide particles having been flocculated and precipitated. Besides, it is well-known to remove soluble salts according to the ultrafiltration. The ultrafiltration is a method to remove the undesired salts with low molecular weights with the use of a synthesized ultrafiltration film that does not allow particles having large particle sizes like the silver halide particles and gelatin to pass therethrough.

The content of the hydrophilic colloids contained in the photosensitive silver halide particles used in this invention is 40 g or less relative to 1 mol of silver. The particularly preferred is 35 g or less.

Furthermore, in this invention, the amount of the hydrophilic colloids is $6 \times 10^{-6}$ g or more relative to 1 mol of the transition elements contained in the silver halide particles, which is selected from the elements belonging to the groups 6 to 11 of the periodic law table. Namely, the contents of the hydrophilic colloids and the transition elements contained in the photosensitive silver halide are selected so as to satisfy the above-described conditions.

The photosensitive silver halide prepared according to the various methods as described above can be chemically sensitized with any of, for example, sulfur-containing compounds, aurous compounds, platinous compounds, palladium compounds, silver compounds, tin compounds, chromic compounds, or the combinations thereof. The details of the process and procedures of the chemical sensitization are described in, for example, U.S. Pat. No. 4,036,650, UK Patent No. 1,518,850, JP Tokukaisho-51-22430, -51-78319, -51-81124, etc. Alternatively, at the time of converting the part of the organic silver salt into the photosensitive silver halide with use of the components for forming the silver halide, an amide compound can be coexisted as described in U.S. Pat. No. 3,980,482 in order to achieve the sensitization.

In the present invention, more preferred embodiments can be achieved by fixing the pH though the whole process of forming the photosensitive silver halide in a range of 3 to 6, and preferably 4 to 6. Note that, though the prepared photosensitive silver halide particles can be desalted according to known desalting methods, such as the noodle method, the flocculation method, ultrafiltration and electrodialysis, it is possible to use the prepared photosensitive silver halide particles for the photothermographic imaging material without applying the desalting.

(Organic Fatty Acid Silver Salt)

In this invention, organic silver salts are reducible silver source, and silver salts of organic acids and hetero organic acids, particularly aliphatic silver carboxylate with long chains (containing 10 to 30, preferably 15 to 25 carbon atoms) and nitrogen-containing heterocyclic compounds, are preferable to use. The inorganic or organic complexes each of those which ligands having the total stability constant to silver ions of 4.0 to 10.0 as described in "Research Disclosure" (hereinafter referred to as "RD", occasionally), 17029 and 29963 are also preferable to use. As examples of the preferred silver salt, the followings can be given.

Silver salts of Organic acids: Silver salts of gallic acid, oxalic acid, behenic acid, stearic acid, arachidic acid, palmitic acid, lauric acid. Carboxyalkylthiourea salt of silver: Silver salts of 1-(3-carboxypropyl)thiourea, 1-(3-carboxypropyl)-3,3-dimethylthiourea and the like. Silver salts or complexes of polymer reaction products of aldehyde and hydroxy-substituted aromatic carboxylic acid: Silver salts or complexes of the reaction product of aldehydes (formaldehyde, acetaldehyde, butylaldehyde, etc.) and hydroxy-substituted acids (salicylic acid, benzoic acid, 3,5-dihydroxybenzoic acid, etc.). Silver salts or complexes of thiones: Silver salts or complexes of 3-(2-carboxyethyl)-4-hydroxymethyl-4-thiazoline-2-thione, 3-carboxymethyl-4-thiazoline-2-thione and the like. Complexes or salts of a nitrogen acid selected from imidazole, pyrazole, urazole, 1,2,4-thiazole, 1H-tetrazole, 3-amino-5-benzylthio-1,2,4-triazole and benzotriazole, and silver. Silver salts of saccharin, 5-chlorosalicylaldoxime and the like, and silver salts of mercaptides.

Among the above, the preferred are silver behenate, silver arachidate and silver stearate. In this invention, 2 or more organic silver salts are preferably mixed in view of improving developing performance and forming silver images with high densities and high contrasts. For example, it is preferable to mix a silver ion solution with a mixture of 2 or more organic acids to prepare the organic silver salts.

The organic silver salt compound is prepared by mixing an aqueous silver compound and a compound of forming a complex with silver, and for this purpose, the normal mixing method, the back mixing method, the simultaneous mixing method, the control double jet method as described in JP Tokukaihei-9-127643 and the like are preferably employed. For example, an alkali metal salt (e.g., sodium hydroxide, potassium hydroxide, etc.) is added to an organic acid to prepare an organic alkali metal soap (e.g., sodium behenate, sodium arachidate, etc.), followed by mixing of the soap and silver nitrate or the like to prepare the crystals of an organic silver salt. During this reaction, the silver halide particles can be contained in the mixture.

The organic silver salt according to this invention can be used in various forms, however, the salt in plate-like shape is preferably used. In particular, the organic silver salt in plate-shaped granules having the aspect ratio of 3 or more and the average ratio of the aciform particles, when it is measured from the main plane direction, in a range of 1.1 to 10.0 is preferably used, since it is required to lessen the geometric anisotropy of two planes (main planes) having the maximum area and opposing to each other in parallel to thereby carry out the charging in the photosensitive layer. Note that the more preferable ratio of the aciform particles is more than 1.1 and less than 5.0.

In this invention, the plate-shaped organic silver salt particles having the aspect ratio of 3 or more means that the plate-shaped organic silver salt particles occupy 50% or more of the total organic silver salt particles in number of the particles. Moreover, in the organic silver salt according to this invention, the plate-shaped particles with the aspect ratio of 3 or more preferably occupy 60% or more of the total particles in number of the particles, more preferably 70% or more (in number of the particles), and particularly preferably 80% or more (in number of the particles).

The aspect ratio (abbreviated as AR) is represented by the following equation.

$$AR = \text{Average Particle Size } (\mu m)/\text{Average Thickness } (\mu m)$$

The aspect ratio of the plate-shaped organic silver salt particles according to this invention is preferably 2.0, more preferably in a range of 3 to 10. Because, the organic silver salt particles will tend to be compacted too much, if the aspect ratio is too low, and the other hand, the organic silver salt particles tend to be heavy and easily dispersed in a state that they are adhered to each other, followed by easy occurrence of light scattering that accordingly lowers the transparency property of the photothermographic imaging material, if the aspect ratio is too high. Therefore, it is considered that the preferred ratio of the aspect ratio is the above-described range.

For determining the average particle size, the dispersed organic silver salt is diluted, dispersed on the grid provided with a support film made of carbon, and then photographed by a transmission electron microscope (manufactured by Nihon Densi: Type 2000FX) at a direct magnification of 5,000 for the measurements. The photographed negatives are taken as the digital images by a scanner for measuring the particle sizes (diameter corresponding to a circle) of more than 300 particles with the use of an appropriate image processing software to calculate the average particle size.

Besides, the average thickness is determined according to the method using a transmission electron microscope (TEM) as will be described hereunder.

Firstly, the photosensitive layer coated onto a support is stuck to an appropriate holder and then cut in a direction perpendicular to the surface of the support with a diamond knife to prepare the ultrathin section with a thickness of 0.1 to 0.2 μm. The ultrathin section is placed on a mesh grid made of copper, then transferred onto a carbon film having been made hydrophilic by glow discharge, and the illuminated field images of the section are observed under TEM at a magnifications of 5,000 to 40,000 while cooling the section at −130° C. or lower with liquid nitrogen. The images are recorded quickly on a film, an imaging plate or in a CCD camera. At this time, the parts of the section containing no breaks and sags are preferably selected as the field to be observed.

As the carbon film, it is preferable to use a carbon film supported by an organic film, such as ultra-thin collodion and formbar, and more preferable to use a single carbon film prepared by forming a carbon film onto a substrate made of rock salt and then dissolving the rock salt to remove it, or by removing the organic film with an organic solvent or by ion etching. The preferred acceleration voltage of TEM is in a range of 80 to 400 kV, and particularly preferable in a range of 80 to 200 kV.

The details of the observation techniques with use of an electron microscope and the sample preparation techniques can be referred to "Observation Techniques by Electron Microscope for Medicine and Biology" edited by Japanese Association of Electron Microscope, Kanto Branch" (published by Maruzen), "Preparation Technique of Biological Samples for Electron Microscope" edited by Japanese Association of Electron Microscope, Kanto Branch" (published by Maruzen), respectively.

The TEM images recorded onto an appropriate medium are preferably decomposed to at least 1024×1024 pixels, and preferably to more than 2048×2048 pixels, and subjected to the image processing on a computer. In order to perform the image processing, it is preferable to convert the analog images recorded on the film by a scanner or the like and apply shading correction, contrast edge accent, etc. for the occasion that has arisen. Then, the histogram is prepared, and the images are subjected to the process of changing into two values to extract the portion corresponding to the organic silver. The thicknesses of more than 300 of the extracted organic silver particles are manually measured with use of an appropriate software to give the average value.

Beside, the average value of the aciform ratio of the plate-shaped organic silver salt particles can be worked out according to the following method. First of all, the binder in the photosensitive layer is swelled with an organic solvent that can dissolve the binder to exfoliate the photosensitive layer containing the plate-shaped organic silver salt particles from the support. Then, supersonic washing with use of the above-mentioned solvent, centrifugation and removal of the supernatant are repeated 5 times for the photosensitive layer. Note that all of the above-described operations are carried out under a safe light.

Then, the photosensitive layer is diluted with methyl ethyl ketone (MEK) so that the solid content of the organic silver is adjusted to 0.01%. The dilution is dispersed with supersonic and added by dropping onto a polyethylene terephthalate film having been made hydrophilic by glow discharge, followed by drying.

The film applied with the particles is preferably used for the observations following to the application of bias deposition with Pt-C having a thickness of 3 nm using electronic beams at an angle of 30 degree with respect to the film surface in a vacuum deposition apparatus.

The prepared sample is observed as the fabricated electronic image by a field emission scanning electron microscope (FE-SEM) at the acceleration voltage of 2 to 4 kV and at magnifications of 5000 to 20000, and the image is stored in an appropriate recording medium.

It is convenient for the above-described operation to use a device capable of AD-converting the image signal from the electron microscope main body and directly recording as the digital information on a memory. However, analog images recorded on a Polaroid film or the like are also usable by converting the analog images into the digital images with use of a scanner and applying shading correction, contrast edge accent, etc. for the occasion that has arisen.

In the procedure for the image processing described above, a histogram is prepared at first, and the images are subjected to the process of changing into two values to extract the portion corresponding to the organic silver having the aspect ratio of 3 or more. The unwillingly-flocculated particles are cut by appropriate algorithm or manual operations and then subjected to a peripheral extraction. Then, the maximum length (MX LNG) and the minimum width (WIDTH) of each particle are measured for at least 1000 particles, respectively, and followed by working out of the aciform ratio for each particle according to the following equation. The maximum length of particle is defined here as the maximum value of length when two points in the particle is connected with a line. Besides, the minimum width of particle is defined here as the minimum value of the distance between two parallel lines when the two parallel lines are drawn such that they are circumscribed to a particle.

Aciform Rate=(MX LNG)/(WIDTH)

Then, the average value of the aciform ratio for the whole measured particles is worked out. When the measurements are carried out according to the above-described procedure, it is preferable to thoroughly make correction of the length per one pixel (scale correction) and correction of the two-dimensional distortion of the measuring system in advance with use of a standard sample. Uniform Latex Particles (DULP) commercialized by US Dow Chemical Inc. is preferably used as the appropriate standard sample. As the standard sample, polystyrene particles having a variation coefficient of less 10% with respect to a particle size of 0.1 to 0.3 µm is preferred to use. Specifically, a lot of polystyrene particles that secures a particle size of 0.212 µm and the standard deviation of 0.0029 µm is available The details of the image processing technique can be referred to "Applied Techniques for Image Processing, edited by Hiroshi Tanaka (published by Kogyo Chosakai)". There is no particular limitation for the image processing program and the image processing apparatus, as far as it is feasible to carry out the above-described operations. Luzex-III manufactured by Nireco Inc. can be given as an example.

There is no particular limitation for the method for forming the organic silver salt particles having the shape as described above. However, it is advantageous to keep the mixing state at the time of forming the organic alkali metal salt soap and/or the mixing state at the time of adding silver nitrate into the soap in good conditions and to optimize the mixing ratio of silver nitrate for the reaction with the soap.

For the occasion that has arisen, it is preferable to preliminarily disperse the plate-shaped organic silver salt particles together with a binder, a surface-active agent, etc., and then dispersed and ground by a media disperser, a high-pressure type homogenizer or the like. For the preliminary dispersing operation, general stirrers such as the anchor-type and propeller-type stirrers, high-speed centrifuge emission type stirrer (Dissolver), and high-speed rotary shearing type stirrer (Homomixer) can be used.

As the media disperser, tumbling mills, such as ball mill, planet ball mill and vibrating ball mill, and medium stirring mills, such as beads mill, atoracter, and other basket mills can be used. As the high-pressure homogenizer, various types of homogenizers, for example, a type of causing the particles to impact against a plug or the like, a type of dividing liquid to a plurality of liquid portions and causing those portions to impact to one another at a high speed, a type of causing particles to pass through fine orifices and the like can be used.

Examples of ceramics preferably used for the ceramic beads that is used at performing the media dispersion include $Al_2O_3$, $BaTiO_3$, $SrTiO_3$, MgO, ZrO, BeO, $Cr_2O_3$, $SiO_2$, $SiO_2$—$Al_2O_3$, $Cr_2O_3$—MgO, MgO—CaO, MgO—C, MgO—$Al_2O_3$ (spinel), SiC, $TiO_2$, $K_2O$, $Na_2O$, BaO, PbO, $B_2O_3$, $SrTiO_3$ (strontium titanate), $BeAl_2O_4$, $Y_3Al_5O_{12}$, $ZrO_2$—$Y_2O_3$ (cubic zirconia), $3BeO$—$Al_2O_3$—$6SiO_2$ (synthesized emerald), C (synthesized diamond), $Si_2O$—$nH_2O$, silicon nitride, yttrium-stabilized zirconia, zirconia-reinforced alumina, and the like. Among the above ceramics, yttrium-stabilized zirconia and zirconia-reinforced alumina (hereinafter these ceramics containing zirconia are abbreviated as zirconia) are particularly preferably used, in view of generation of less impurity due to abrasion with the beads and the disperser at the dispersing operation.

In the devices used at dispersing the plate-shaped organic silver salt particles, the material of the members to which the organic silver salt particles contact is preferably ceramics, such as zirconia, alumina, silicon nitride and boron nitride, or diamond, and it is most preferable to use zirconia.

When the above-described dispersion is carried out, the concentration of the binder to add is preferably in a range of 0.1 to 10% relative to the mass of the organic silver, and it is preferable that the temperature of the solution does not exceed 45° C. during the whole period of from the preliminary dispersion until the essential dispersion. With respect to the conditions for the dispersion operation, in case a high-pressure homogenizer is used for dispersing, the operation is carried out preferably under a pressure in a range of 29.42 to 98.06 MPa and the operation is carried out preferably at least twice. Further, in case a media disperser is used for dispersing, the operation is preferably carried out at a circumferential speed of 6 to 13/sec.

It is also feasible to use zirconia as the parts of the beads and the members and to incorporate zirconia into the dispersion emulsion at carrying out the dispersion. This method is preferable and effective for improving the photographic performance. Alternatively, it can be also effective to add pieces of zirconia into the dispersion emulsion afterward or to add in advance at the time of the preliminary dispersion. There is no particular limitation for the method for the addition. As an example, the zirconia solution with high concentrations can be prepared by filling zirconia beads into a beads mill and circulating MEK therein. This highly-concentrated zirconia solution can be added at an appropriate stage and at an appropriate concentration into the dispersion emulsion.

In the photosensitive emulsion containing the photosensitive silver halide and an organic silver salt, zirconium is preferably contained at a rate of 0.01 to 0.5 mg per 1 g of silver, and more preferably 0.01 to 0.3 mg per 1 g of silver. Further, zirconium is preferably contained in the form of particulates having particle sizes of 0.02 µm or less.

Although there is no particular limitation for the conditions for preparing the photosensitive emulsion having the characteristics as described above, the following can be given as the preferred conditions, that is, to keep the mixing state at the time of forming the organic acid alkali metal salt soap and/or the mixing state at the time of adding silver nitrate to the soap in good condition, to optimize the rate of silver nitrate to be reacted with the soap, to use the media disperser or a high-pressure homogenizer at the time of dispersing and grinding, to add the binder at a rate of 0.1 to 10% by mass relative to the mass of the organic silver salt at the time of dispersing, to maintain the temperature at 45° C. or lower through the period from the drying until the essential dispersion, and to use a dissolver at the preparation and stir the emulsion at a circumferential speed of 2.0 m/sec or faster.

The projection area of the organic silver particles having a specific projection area as described above and the ratio thereof to the whole projection area are given by extracting the portions corresponding to the organic silver according to the method using TEM in the same manner as described in the section describing about the determination of the average thickness of the plate-shaped particles having an aspect ratio or 3 or more. At that time, the flocculated particles are treated as one particle so that the areas of the respective particles are given. Similarly, the areas of the particles are determined with at least 1,000 particles, preferably with 2,000 particles, and the given areas are classified into three groups, that is, A: less than 0.026 µm², B: 0.025 µm² or greater to less than 0.2 µm² and C: 0.2 µm² or greater. The photothermographic imaging material according to this invention preferably satisfy to contain the particles in such a manner that the total sum of the areas of the particles belonging to the A group occupies 70% or more of the area measured for the whole particles, and the total sum of the areas of the particles belonging to the C group is 10% or less of the area measured for the whole particles.

When the above-described procedure is used to carry out measurements, it is preferred to sufficiently make correction of the length per one pixel (scale correction) and correction of the two-dimensional distortion in the measuring system in advance with use of the standard sample.

The organic silver salt particles are preferably monodispersed particles, and the preferred degree of monodispersion is 1 to 30%. Images with high densities can be given by making the particles into the monodispersed particles within this monodispersion range. The degree of monodispersion used here is defined by the following equation.

Degree of Monodispersion=(Standard Deviation of Particle Size)/(Average of Particle Sizes)×100

The average particle size of the organic silver salt is preferably in a range of 0.01 to 0.2 µm, and more preferably 0.02 to 0.15 µm. The average particle size (a diameter corresponding to a circle) is meant as a diameter of a circle that has the equivalent area as that of the image of an individual particle observed by an electron microscope.

In order to prevent the photothermographic imaging material from loosing transparency, the total amount of the silver halide and the organic silver salt is preferably in a range of 0.5 to 2.2 g per square meter as a value converted to the amount of silver. Images with hard tones can be given by adjusting the total amount within this range.

(Binder)

The binder suitable for the photothermographic imaging material is either transparent or semi-transparent, and is generally colorless. Examples of the binder include media for forming natural polymer synthetic resins, polymers and copolymers, and other films, including gelatin, gum arabic, poly(vinyl alcohol), hydroxyethyl cellulose, cellulose acetate, cellulose acetate butyrate, poly(vinyl pyrrolidone), casein, starch, polyacrylic acid, polymethylmetacrylic acid, poly(vinyl chloride), polymetacrylic acid, copoly(styrene-maleic anhydride), copoly(styrene-acrylonitrile), copoly (styrene-butadiene), polyvinyl acetals (polyvinylformal, polyvinylbutylal, etc.), polyesters, polyurethanes, phenoxy resins, Poly(vinylidene chloride), polyepoxides, polycarbonates, poly(vinyl acetate), cellulose esters, polyamides. The exampled above can be either hydrophilic or nonhydrophilic.

The material of the binder suitable for the photothermographic imaging material is any of polyvinylacetals, and the particularly preferred for the binder is polyvinylbutylal. Besides, for the nonphotosensitive layers, such as an overcoating layer, and an undercoating layer, in particular, a protective layer and a backcoating layer, cellulose esters having higher softening temperatures, particularly polymers, such as triacetyl cellulose and cellulose acetate butylate, are preferably used. Note that, for the occasion that has arisen, any of the above-enumerated binders can be used in combination.

The polyvinylacetals given below can be used as the binder that can be suitably used in this invention.

| POLYMER | ACETOACETAL (mol %) | BUTYRAL (mol %) | ACETAL (mol %) | ACETYL (mol %) | HYDROXYL (mol %) | Tg VALUE (° C.) |
|---|---|---|---|---|---|---|
| P-1 | 6 | 4 | 73.7 | 1.7 | 24.6 | 85 |
| P-2 | 3 | 7 | 75.0 | 1.6 | 23.4 | 75 |
| P-3 | 7 | 3 | 71.1 | 1.6 | 27.3 | 88 |
| P-4 | 3 | 7 | 74.4 | 1.6 | 24.0 | 75 |
| P-5 | 3 | 7 | 75.4 | 1.6 | 23.0 | 74 |

The binders shown in the table are used in an effective range so that they can function as a binder, respectively. Such an effective range can be determined easily by persons who are skilled in the art. For example, as the guidance for the minimum amount of the organic silver salt to be retained in the photosensitive layer, the ratio of the binder and the organic silver salt is preferably in a range of 15:1 to 1:2, and particularly preferably in a range of 8:1 to 1:1. That is, the amount of the binder in the photosensitive layer is preferably in a range of 1.5 to 6 g/m², and more preferably 1.7 to 5 g/m². If the amount is less than 1.5 g/m², the density in the unexposed portion will be increased to a great extent, images with which cannot stand for the practical use.

(Crosslinking Agent)

As the crosslinking agent used in this invention, various crosslinking agents having been conventionally used for ordinary photograph photosensitive material use, for example, aldehydes, epoxy compounds, ethylene imines, vinylsulfones, sulfonates, acryloyls, carbodiimides and silane compounds can be used. However, the preferred includes isocyanate compounds, silane compounds and epoxy compounds, as disclosed in JP Tokukaisho-50-96216. The details of these compounds are described in JP Tokukai-2001-249428.

In this invention, a matting agent is preferably contained in the photosensitive layer, and the matting agent is preferably provided in the surface of the photographic material for preventing the thermally developed images from being damaged. The matting agent is preferably contained at a rate of 0.5 to 10% by mass relative to the mass of the whole binder contained in the photosensitive layer side. The material of the matting agent used in this invention can be either an organic compound or an inorganic compound. Examples of the inorganic matting agent usable in this invention include silica disclosed in Swiss Patent No. 330,158, glass powder disclosed in French Patent No. 1,296,995, alkaline metals or carbonates of cadmium, zinc, etc. disclosed in U.K. Patent No. 1,173,181. Examples of the organic matting agent usable in this invention include starch disclosed in U.S. Pat. No. 2,322,037, starch derivatives disclosed in Belgian Patent No. 625,451 and U.K. Patent No. 981,198, poly(vinyl alcohol) disclosed in JP Publication Sho-44-

3643, polystyrene or polymetacrylate disclosed in Swiss Patent No. 330,158, polyacrylonitrile disclosed in U.S. Pat. No. 3,079,257, polycarbonate disclosed in U.S. Pat. No. 3,022,169, etc. and so on.

The shape of the matting agent can be either regular or irregular. However, the matting agent in a regular shape, particularly in spherical shape is preferred. The size of the matting agent is represented by the diameter of a spherical particle which is converted from the volume of the particles of the matting agent, and the particle size of the matting agent used in this invention denotes the diameter of the spherical particle converted from the volume. The average particle size of the matting agent used in this invention is preferably in a range of 0.5 to 10 μm, and more preferably 1.0 to 8.0 μm. The variation coefficient of the particle size distribution of the matting agent is preferably 50% or less, more preferably 40% or less, and particularly preferably 30% or less. The variation coefficient of the particle size distribution used here is represented by an equation that is equivalent to the variation coefficient used for the silver salt particles. The matting agent can be contained in an arbitrary structural layer, but the matting agent is added preferably into a structural layer other than the photosensitive layer, and more preferably into the outermost layer from the support. As the method for adding the matting agent in this invention, a method to disperse the matting agent in a coating solution in advance and then coat the solution, or a method to apply a coating solution at first and then spray the matting agent solution over the coating solution before the coating solution having been dried, can be employed. Furthermore, when a plurality of types of matting agents are added, the both methods described above can be employ in combination.

It is preferred to add a color toning agent into the photothermographic imaging material according to this invention. Examples of the suitable color toning agent are disclosed in RD17029, and the following are concrete examples enumerated therein.

Imides, e.g., phthalimide; cyclic imides, pyrazoline-5-ones and quinazolines, e.g., succinimide, 3-phenyl-2-pyrazoline-5-one, 1-phenylurazole, quinazoline, 2,4-thiazolidinedione and the like; naphthalimides. e.g., N-hydroxy-1,8-naphthalimide and the like; cobalt complex, e.g., hexaminetrifluoroacetate of cobalt and the like; mercaptans, e.g., 3-mercapto-1,2,4-triazole and the like; N-(aminomethyl)aryldicarboxyimides, e.g., N-(dimethylaminomethyl) phthalimide and the like; combinations of blocked pyrazoles, isothiuronium derivatives and a certain types of photobleaching agents, e.g., combinations of N,N'-hexamethylene(1-carbamoyl-3,5-dimethylpyrazole, 1,8-(3,6-dioxaoctane)bis(isothiuroniumtrifluoroacetate) and 2-(tribromomethylsulfonyl)benzothiazole; merocyanine dyes, e.g., 3-ehtyl-5-((3-ethyl-2-benzothiazolinylidene(benzothiazolinylidine))-1-methylethylidene)-thio-2,4-oxazolidinedione and the like; phthalazinone, phthalazinone derivatives and the metal salts thereof, e.g., 4-(1-naphthyl)phthalazinone, 6-chlorophthalzinone, 5,7-dimethyloxyphthalazinone, and 2,3-dihydro-1,4-phthalazinedione; combinations of phthalazinone and sulfinic acid derivatives, e.g., 6-chlorophthalazinone+sodium benzenesulfinate or 8-methylphthalazinone+sodium p-trisulfonate; combinations of phthalazine and phthalic acid; combinations of phthalazine (including the addition products of phthalazine) and maleic anhydride, and at least one selected from phthalic acid, 2,3-naphthalenedicarboxylic acid or o-phenylenic acid derivatives and the anhydride thereof (anhydrides of phthalic acid, 4-methylphthalic acid, 4-nitrophthalic acid and tetrachlorophthalic acid); quinazolinediones, benzoxazine, nartoxazine derivatives; benzoxazine-2,4-diones, e.g., 1,3-benzoxazine-2,4-dione and the like; pyrimidines and asynmetric-triazines, e.g., 2,4-dihydroxypyrimidine and the like; and tetraazapentalene derivatives, e.g., 3,6-dimercapto-1,4-diphenyl-1H,4H-2,3a,5,6a-tetraazapentalene and the like. Among the above examples, the particularly preferred color toning agents is phthalazone or phthalazine.

(Layer Configuration)

The photothermographic imaging material according to this invention includes at least one layer of photosensitive layer on the support. The photosensitive layer can be formed solely on the support, however, it is preferable to form at least one nonphotosensitive layer onto the photosensitive layer. A filter layer can be formed on the same side or the opposite side of the photosensitive layer, or the dyes according to this invention or known pigments can be directly contained in the photosensitive layer, in order to control the quantity of light passing through the photosensitive layer or wavelength distribution. A plurality of photosensitive layers can be formed, and for the purpose of controlling the color gradation, the photosensitive layers can comprise layers of different photosensitivities, for example, highly-photosensitive/low-photosensitive or low-photosensitive/highly-photosensitive layers.

Various additives can be added into any of the photosensitive layer, the nonphotosensitive layer or the other formed layers. A surface-active agent, an oxidant, a stabilizer, a plasticizer, an ultraviolet absorbent, an auxiliary for coating can be used for the photographic materials according to this invention.

(Coating Technique)

The photothermographic imaging material according to this invention is preferably prepared by preparing a plurality of coating solutions in those which the materials for the above-described structural layers are dissolved in a solvent, respectively, applying those coating solution to form superimposed-layers at the same time, and then heating the layers. The wording of "applying the plurality of coating solution to form superimposed-layers at the same time" means that, when coating solution for forming the respective structural layers (e.g., photosensitive layer, protective layer, etc.) are prepared and then applied onto the support, the respective structural layer can be formed under the situation such that the coating solutions are simultaneously applied to form superimposed-layers thereof and simultaneously dried. The wording does not mean that the coating solutions are separately applied and dried in a repeated manner to form the respective layers in turn. Namely, the upper layer is formed before the remaining content of the whole solvent in the lower layer has decreased to 70% by mass or less.

There is no particular limitation for the method for coating the coating solutions to simultaneously form the respective structural layers into the superimposed form, and any of the publicly-known methods, such as bar coater method, curtain coat method, dipping method, air knife method, hopper coating method and extrusion coating method, can be employed for this purpose. Among the above-exampled methods, the more preferred is the extrusion coating method of the pre-mensuration type. In the extrusion coating, volatilization on the surface plane does not occur like it happens in the slide coating method. Therefore, the extrusion coating method suits for accurate coatings and coatings of organic solvents. The coating methods to the side where the photosensitive layer resides are described in the above, however, it can be carried out in the same way when the backcoating layer is formed together with the undercoating layer.

(Conditions for Exposure)

For the exposure of the photothermographic imaging material, a light appropriate to the color sensitivity provided to the photographic material is preferably used. For example, when the photographic material is sensitive to infrared light, though it is applicable for any light source as far as the light source emits light in the infrared region, it is more preferred to use an infrared semiconductor laser (780 to 820 nm) because the laser has high power and transparent photographic materials can be used.

The exposure is preferably performed by laser scanning exposure. However, various methods can be employed for the exposure. For example, the first preferred method is to use a laser scanning light exposure apparatus with which the angle between the plane to be exposed of the photographic material and the scanning laser beams substantially never be at right angle. The wording of "substantially never be at right angle" means that the closest angle to right angle during the laser scanning is preferably 55 to 88 degree, more preferably 60 to 86 degree, still more preferably 65 to 84 degree, and most preferably 70 to 82 degree.

The diameter of the beam spot on the exposure plane when laser beams are scanned on the photographic material is preferably 200 μm or less, and more preferably 100 μm or less. This is because that the smaller spot diameter is preferred in view of a feasibility to reduce the offset angle of the laser incident angle from the right angle. Note that the lower limit of the beam spot diameter is 10 μm. By performing the laser scanning exposure as described above, the deterioration in the image quality due to the reflection light, such as occurrence of unevenness in the images like fringes by interference.

Further, as the second method, it is also preferable to carry out the exposure with use of a laser scanning exposure apparatus that emits scanning laser beams of the vertical multi-mode. With this method, the deterioration in the images such as occurrence of unevenness in the images like the interference fringes can be reduced comparing to laser beams of the vertical single-mode. To convert to the vertical multi-mode, methods to use jointed waves, to utilize returning light and to apply high-frequency superimposition can be preferably employed.

Note that the vertical multi-mode means that the wavelength applied for an exposure is not single, and the distribution of the wavelengths for an exposure is generally 5 nm or more, and preferably 10 nm or more. There is no particular limitation for the upper limits of the exposure wavelength, however, it is 60 nm more or less in general.

Furthermore, as the third method, it is also preferred to use 2 or more laser beams to perform scanning exposure to thereby form images.

Such an image recording method using a plurality of laser beams is a technology having been used for the image printing included in laser printers and digital copying machines, in which images are printed with a plurality of lines for one time scanning for responding to requirements for high resolution and high-speed performance. This method has been known from the disclosure of JP Tokukai-sho-60-166916, etc. In this method, laser beams irradiated from a light source unit are deflection-scanned by a polygon mirror via an fθ lens or the like to form images onto a photosensitive body, and a laser scanning optical apparatus based on this technology is in principle same as a laser imager and the like.

In the image forming onto a photosensitive body included in the image printing of a laser printer or a digital copying machine, the next laser beam is shifted by one line from the position of images formed by the previous laser beam to form images, since the apparatus is adapted to print images with a plurality of line at one time scanning. Specifically, two laser beams are close to each other in the subscanning direction at a distance in the order of 10 μm on the image forming surface, the printing density is 400 dpi (dpi is meant as the number of dots per one inch, that is 2.54 cm), and the subscanning direction pitch of the two laser beams is fixed at 63.5 μm. When the printing density is 600 dpi, the pitch is fixed at 42.3 μm.

Unlike the method of shifting the lines on the photosensitive body by one portion of resolution in the subscanning direction, it is also preferred in this invention to alter the incident angles of two or more laser beams so that the laser beams concentrate onto the same surface to be exposed to form an image. In this method, the exposure energy on the surface to be exposed in the normal operation where printings are performed with one laser beam (wavelength λ nm) is given as E, and when n rays of laser beams used for an exposure have the equivalent wavelength (λ nm) and the equivalent exposure energy (En), the exposure energy is preferably fall with the range of $0.9 \times E \leq En \times N \leq 1.1 \times E$. By fixing the En in this range, the energy on the surface to be exposed is retained, and the reflection of the respective laser beams to the image forming layer is reduced because the exposure energy is low, and the interference fringes is prevented from occurring, accordingly.

Note that the wavelength of the plurality of laser beams is given as λ in the above, different wavelengths can be used. When using different wavelengths, they preferably fall within the range of $(\lambda-30) < \lambda 1, \lambda 2, \ldots, \lambda n \leq (\lambda+30)$.

In the image forming methods of the first to third embodiments, commonly-known lasers can be used as the laser used for the scanning exposure. Examples of the laser include solid laser, such as ruby laser, YA laser and glass laser; gas laser, such as He—Ne laser, Ar ion laser, Kr ion laser, $CO_2$ laser, CO laser, He—Cd laser, $N_2$ laser and excimer laser; semiconductor laser, such as InGaP laser, AlGaAs laser, GaAsP laser, InGaAs laser, InAsP laser, $CdSnP_2$ laser and GaSb laser; chemical laser; pigment laser and the like, and any of these lasers can be selected appropriately corresponding to the usage. However, among the above, semiconductor laser with a wavelength of 600 to 1200 nm is preferably used in view of the maintenance and the dimension of the light source. Besides, in the lasers used by a laser imager and a laser image setter, the beam spot diameter on the exposure surface of a photographic material when images are scanned onto a photo-thermal photographic material is generally in a range of 5 to 75 μm for the short axis and 5 to 100 μm for the long axis. The laser beam scanning speed can be fixed to an optimal speed for every photographic material in accordance with the sensitivity and laser power at the laser oscillation wavelength inherent to the photothermographic imaging material.

(Conditions for Development)

The conditions for the development of the photothermographic imaging material vary depending on the hardware, apparatuses to be used. However, during developing operations, the photographic materials having been exposed and formed images are typically heated at appropriate temperatures. Latent images formed following to the exposure are developed by heating the photographic materials for sufficient period of time (developing process for 5 to 15 seconds is preferred in this invention) at moderately high temperatures (80 to 200° C., preferably 100 to 150° C.).

If the heating temperature is lower than 80° C., images with sufficient image density cannot be formed in a short time. Besides, if the heating temperature is higher than 200° C., the binder could fuse, and high temperatures give damages not only to the images themselves but also to the feeding performance such as the transfers to rollers and the developing devices. Heating accelerates the oxidation and reduction reactions between the organic silver salt (functioning as an oxidant) and a reducing agent to form silver images. This reaction process proceeds without any supply including water, the processing solution and the like from the exterior.

The devices, apparatuses used for the heating can be a typical heat generating as a heat generator using a hot plate, an iron, a hot roller, carbon, white titanium or the like. More preferably, in case that the photothermographic imaging material is provided with a protective layer, it is preferable to render the heating to contact the side face of the protective layer in view of performing even heating, heating efficiency and handlings, and then to feed, heat and develop the photosensitive material while causing the protective layer side to contact the heat controller.

EXAMPLES

Hereinafter, the present invention is described in detail with reference to the examples. However, the present invention is not limited to the following embodiments.

Example 1

Preparation of Undercoated Support for Photograph

<Preparation of PET-undercoated Support for Photograph>

Corona discharge was applied to the both sides of a commercially available PET film having been biaxially oriented and thermally fixed, having a thickness of 175 μm and colored blue at an optical density of 0.170 (measured by densitometer PDA-65 manufactured by Konica). An undercoat coating solution a-1 will be described below was coated onto one side of the film so that the coating after dried was formed in a thickness of 0.8 μm, and the coating was then subjected to drying to give an undercoat layer A-1. Besides, an undercoat coating solution b-1 was coated onto the opposite side of the film so that the coating after dried was formed in a thickness of 0.8 μm, and the coating was subjected to drying to give an undercoat layer B-1.

<<Undercoat Coating Solution a-1>>

| Copolymer latex solution (solid content 30%) comprising: | 270 g |
|---|---|
| Butyl acrylate (30% by mass) | |
| t-Butyl acrylate (20% by mass) | |
| Styrene (25% by mass), and | |
| 2-Hydroxyethyl acrylate (25% by mass) | |
| C-1 | 0.6 g |
| Hexamethylene-1,6-bis(ethyleneurea) | 0.8 g |

Water is added to the whole components to adjust the whole volume to 1 liter.

<<Undercoat Coating Solution b-1>>

| Copolymer latex solution (solid content 30%) comprising: | 270 g |
|---|---|
| Butyl acrylate (40% by mass) | |
| Styrene (20% by mass) and | |
| Glycidyl acrylate (40% by mass) | |
| C-1 | 0.6 g |
| Hexamethylene-1,6-bis(ethyleneurea) | 0.8 g |

Water is added to the whole components to adjust the whole volume to 1 liter.

Subsequently, corona discharge with a power of 8 W/m²/min. was applied to the upper surfaces of the undercoat layers A-1 and B-1. An upper undercoat coating solution a-2 described below was coated onto the undercoat layer A-1 so that the coating after dried was formed in a thickness of 0.1 μm, thereby forming an upper undercoat layer A-2. Besides, an upper undercoat coating solution b-2 was coated onto the undercoat layer B-1 so that the coating after dried was formed in a thickness of 0.8 μm, thereby forming an upper undercoat layer B-2 having antistatic performance.

<<Upper Undercoat Coating Solution a-2>>

| Gelatin | The mass to be 0.4 g/m² |
|---|---|
| C-1 | 0.2 g |
| C-2 | 0.2 g |
| C-3 | 0.1 g |
| Silica particles (Average particle size 3 μm) | 0.1 g |

Water is added to the whole components to adjust the whole volume to 1 liter.

<<Upper Undercoat Coating Solution b-2>>

| C-4 | 60 g |
|---|---|
| Latex solution comprising C-5 (solid content 20%) | 80 g |
| Ammonium sulfate | 0.5 g |
| C-6 | 12 g |
| Polyethylene glycol | 6 g |

(Mass Average Molecular Weight 600)

Water is added to the whole components to adjust the whole volume to 1 liter.

<<Coating to Back Surface Side>>

To methyl ethyl ketone (MEK) in an amount of 830 g while being stirred were added 84.2 g of cellulose acetate butylate (manufactured by Eastman Chemical, Inc., CAB381-20) and 4.5 g of polyester resin (manufactured by Bostic, Inc., Vitel PE2200B) to prepare a solution. Then, to the solution was added 0.30 g of a dye 1, followed by additions of 4.5 g of fluorinated surfactant (manufactured by Asahi Glass Co., Ltd., Surflon KH40) having been dissolved in 43.2 g of methanol and 2.3 g of fluorinated surfactant (manufactured by Dainippon Ink Chemicals Co., Ltd., Megaface F120K), and further followed by thorough stirring to dissolve the added active agents. As the last procedure, 75 g of silica (manufactured by W. R. Grace, Inc., Siloid 64X6000) having been dispersed by a dissolver-type homogenizer was added to methyl ethyl ketone at a concentration of 1% by mass, and the mixture was stirred to give a coating solution for the back surface side.

The back surface side coating solution prepared as described above was coated with using an extruding coater onto the upper undercoat layer B-2 so that the coating after dried is formed in a thickness of 3.5 μm, followed by drying. The drying was carried out for 5 min. at a temperature of 100° C. with dried blowing air of which exposure temperature is 10° C.

C-1

$C_9H_{19}$—[benzene ring with $C_9H_{19}$]—$O(CH_2CH_2O)_{12}SO_3Na$

C-2

$C_9H_{19}$—[benzene ring with $C_9H_{19}$]—$O(CH_2CH_2O)_8SO_3Na$

C-3

$CH_2$=$CHCO$—N[triazine ring]N—$COCH$=$CH_2$
                         |
                         $COCH$=$CH$

C-4

—(—$CH_2$—$CH_2$—)$_x$— —(—$CH$—$CH$—)$_y$—   $\overline{M}_n = 5000$
                              |     |
                              COOH COOH
[phenyl with S]

(Mn is number average molecular weight.)
x:y = 75:25 (ratio by mass)

C-5

—(—$CH_2$—$CH_2$—)$_p$— —(—$CH_2$—$CH$—)$_q$—
    |                           |
    [phenyl]                    COOH —(—$CH_2$—$CH$—)$_r$—
         |
         $COOC_4H_9$ —(—$CH_2$—$CH$—)$_s$— —(—$CH_2$—$C(CH_3)$—)$_t$—
         |                         |
         $CONH_2$                  $COOC_4H_9$ p:q:r:s:t = 40:5:10:5:40 (ratio by mass)

C-6

$CH_2OCH_2CH$—$CH_2$          $CH_2OCH_2CH$—$CH_2$
         \O/                            \O/
$CHOCH_2CH$—$CH_2$            $CHOH$
         \O/
$CH_2OCH_2CH$—$CH_2$          $CH_2OCH_2CH$—$CH_2$
         \O/                            \O/

-continued $CH_2$—$CHCH_2OCH_2CHCH_2OCH_2CHCH_2OCH_2CH$—$CH_2$
  \O/            |              |            \O/
                OH           $OCH_2CH$—$CH_2$
                                   \O/

C6 is a mixture of three compounds represented by above formulas.

Dye 1

(t)$H_9C_4$—[pyrylium-S ring]—CH=[cyclobutenone with O and O⁻]=CH—[pyrylium-S⁺ ring]—$C_4H_9$(t)
with (t)$H_9C_4$ and $C_4H_9$(t) substituents <<Preparation of Photosensitive Silver Halide Emulsion>>

| A1 | |
|---|---|
| Gelatin of phenylcarbamoyl form | 88.3 g |
| Compound (A) | 10 ml |
| (In 10% aqueous solution of methanol) | |
| Potassium bromide | 0.32 g |

Water is added to the whole components to adjust the whole volume to 5,429 ml.

| B1 | |
|---|---|
| Aqueous solution of silver nitrate | 2,635 ml |
| (Concentration: 0.67 mol/L) | |

| C1 | |
|---|---|
| Potassium bromide | 51.55 g |
| Potassium iodide | 1.47 g |

Water is added to the whole components to adjust the whole volume to 660 ml.

| D1 | |
|---|---|
| Potassium bromide | 154.9 g |
| Potassium iodide | 4.41 g |
| Iridium chloride (1% solution) | 0.93 ml |

Water is added to the whole components to adjust the whole volume to 1,982 ml.

| E1 | |
|---|---|
| Aqueous solution of potassium bromide (0.4 mol/L) | Amount for controlling silver potential indicated below |

| F1 | |
|---|---|
| Potassium hydroxide | 0.71 g |

Water is added to adjust the whole volume to 20 ml.

| G1 | |
|---|---|
| 56% Aqueous solution of acetic acid | 18.0 ml |
| H1 | |
| Anhydrous sodium carbonate | 1.72 g |

Water is added to adjust the whole volume to 151 ml.

HO(CH$_2$CH$_2$O)$_n$—(CH(CH$_3$)CH$_2$O)$_{17}$—(CH$_2$CH$_2$O)$_m$H     Compound (A)

(m+n=5 to 7)

To the solution (A1) were added one fourth of the whole quantity of the solution (B1) and the whole quantity of the solution (C1)) over 4 minutes 45 seconds according to the simultaneous mixing method with using the mixing stirrer shown in JP Sho-58-58288B and 58-58289B while maintaining the temperature at 45° C. and pAg at 8.09. One minute later, the whole quantity of the solution (F1) was added. In the meantime, pAg was appropriately adjusted with the solution (E1). Six minutes later, three fourth of the whole quantity of the solution (B1) and the whole quantity of the solution (D1) were added into the foresaid solution over 14 minutes 15 seconds according to the simultaneous mixing method while maintaining the temperature at 45° C. and pAg at 8.09. Following to stirring for 5 minutes, lowering the temperature to maintain at 40° C., and the whole quantity of the solution (G1) was added to the solution to precipitate silver halide emulsion. The supernatant was removed while keeping 2,000 ml of precipitated portion remained. Then, 10 liters of water was added to the precipitated portion, followed by stirring, causing precipitation of the silver halide emulsion once again. The supernatant was removed while keeping 1,500 ml of precipitated portion remained. Further, 10 liters of water was added to the precipitated portion, followed by stirring, then causing precipitation of the silver halide emulsion. The supernatant was removed while keeping 1,500 ml of precipitated portion remained. Then, the solution (H1) was added to the precipitated portion, and the temperature of the solution was raised to 60° C., and the solution was further stirred for 120 min. Lastly, pH of the solution was adjusted to 5.8, and water was added so that the weight of the silver halide emulsion comes to 1,161 g per 1 mol of silver to give photosensitive silver halide emulsion A.

This emulsion is monodispersed cube-shaped silver iodide/bromide particles having an average particle size of 0.058 μm, a fluctuation coefficient of the particle size of 12%, and surface [100] proportion of 92%.

Next, 240 ml of a sulfur sensitizing agent S-5 in 0.5% methanol solution and a gold sensitizing agent Au-5 in an amount equivalent to one twentieth of the amount of the sulfur sensitizing agent by mol was added to the emulsion, and the mixture was stirred for 120 min. at 55° C. to apply chemical sensitization.

Sulfur Sensitizing Agent S-5

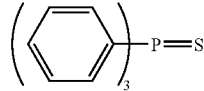

-continued

Gold Sensitizing Agent Au-5

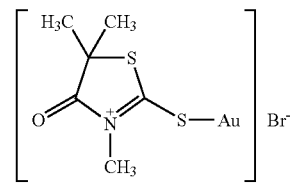

<<Preparation of Powered Organic Silver Salt>>

Into 4,720 ml of pure water were dissolved 130.8 g of behenic acid, 67.7 g of arachidinic acid, 43.6 g of stearic acid and 2.3 g of palmitic acid at 80° C. Then, 540.2 ml of aqueous solution of sodium hydroxide having a concentration of 1.5 M/L was added to the solution, followed by an addition of 6.9 ml of concentrated nitric acid. Cooling was then applied to the solution to keep it at 55° C. so that the solution of fatty acid sodium salt was given. While keeping the temperature of the fatty acid sodium salt solution at 55° C., 45.3 g of said photosensitive silver halide emulsion and 450 ml of pure water were added to the solution and stirred for 5 min.

Next, 702.6 ml of silver nitrate solution having a concentration of 1 M/L was added over 2 min., and the solution was stirred for 10 min. to give a dispersion of an organic silver salt. Thereafter, the dispersion of organic silver salt obtained was transferred into a container for washing, added with deionized water, stirred, then allowed to stand to float the dispersed product of organic silver salt so as to be separated, and the aqueous salts remained underneath was removed. Next, washing of the separated dispersed product with deionized water was repeated until the electric conductivity of the waste water comes to a value of 2 μS/cm, and the product was then subjected to a centrifugal dehydration to give the organic silver salt in the cake state. The cake-like organic silver salt obtained was dried until the water content thereof came to a rate of 0.1% under an operational condition, that is under the atmosphere of nitrogen gas and at a temperature of blowing air at the inlet of a drier, by a air current-type drier, Flash Jet Drier (manufactured by Seishin Kigyo Co., Ltd.) to give a powered organic silver salt A in the dried state. Note that an infrared ray moisture meter was used for measuring the moisture content of the organic silver salt composition.

<<Preparation of Preliminary Dispersion A>>

To 1,457 g of methyl ethyl ketone was dissolved 14.57 g of powdered poly(vinyl butylal) (manufactured by Monsanto, Inc., Butvar B-79), followed by a gradual addition of 500 g of powdered organic silver salt A while stirring the solution with using a dissolver, DISPERMAT, Type CA-40M (manufactured by VMA-GETZMANN, Inc.) and further by thorough mixing to give a preliminary dispersion A.

<<Preparation of Photosensitive Emulsion Dispersion 1>>

The preliminary dispersion A was fed to a media-type dispersing apparatus, DISPERMAT, Type: SL-C12EX (manufactured by VMA-GETZMANN, Inc.), wherein 80% of the internal space is filled with zirconia beads (manufactured by Toray Co., Ltd., Treseram) having a diameter of 0.5 mm, by using a pump so that the dispersion abides in the mill for 1.5 min., and the dispersion was then dispersed at a mill circumferential speed of 8 m/s to prepare a photosensitive emulsion dispersion 1.

<<Preparation of Stabilizing Agent Solution>>

To 4.97 g of methanol were dissolved 1.0 g of a stabilizing agent 1 and 0.31 g of potassium acetate to prepare a stabilizing agent solution.

<<Preparation of Infrared Sensitizing Colorant Solution A>>

An infrared sensitizing colorant (described in Table 1 of $2.7 \times 10^{-5}$ mol, 1.488 g of 2-chloro-benzoic acid, 2.779 g of a stabilizing agent and 365 mg of 5-methyl-2-mercaptobenzimidazole were dissolved in 31.3 ml of MEK in a dark place to prepare an infrared sensitizing colorant solution A.

<<Preparation of Additive Solution a>>

To 110 g of MEK were dissolved 27.98 g of 1,1-bis(2-hydroxy-3,5-dimethylphenyl)-3,5,5-trimethylhexane functioning as a developer, 1.54 g of 4-methylphthalic acid and 0.48 g of the foresaid dye 1 to prepare an additive solution a.

<<Preparation of Additive Solution b>>

To 40.9 g of MEK were dissolved 3.56 g of an antifoggant 2 and 3.43 g of phthalazine to prepare an additive solution b.

<<Preparation of Photosensitive Layer Coating Solution>>

The foresaid photosensitive emulsion dispersion 1 (50 g) and 15.11 g of MEK are kept at 21° C. while stirring under the atmosphere of an inactive gas (nitrogen 97%), added with 390 μl of an antifoggant 1 in 10% methanol solution and then further stirred for an hour, followed by an addition of calcium bromide (10% methanol solution) in a volume of 494 μl and stirring for 20 min. Then, the solution was added with 167 ml of a stabilizing agent solution and allowed to stirring for 10 min., followed by an addition of 1.32 g of the infrared sensitizing colorant A and subsequent stirring for an hour. Temperature of the solution was then lowered to 13° C., followed by stirring the solution for 30 min. While keeping the temperature at 13° C., 13.31 g of poly(vinyl butylal) (manufactured by Monsanto, Inc., Butvar B-79) was added and stirred for 30 min., followed by an addition of 1.084 g of tetrachlorophthalic acid in 9.4% by mass MEK solution and stirring for 5 min. While continuing the stirring further, 12.43 g of the additive solution a, 1.6 ml of an aliphatic isocyanate in 10% MEK solution manufactured by Mobay, Inc., Desmodur N3300 and 4.27 g of the additive solution b were added to the solution in turn, and then stirring the solution to give a desired photosensitive coating solution.

<<Preparation of Matting Agent Dispersion>>

Cellulose acetate butylate (manufactured by Eastman Chemical, Inc., 7.5 g of CAB171-15) was dissolved in 42.5 g of MEK. Then, to the solution obtained was added 5 g of calcium carbonate (manufactured by Speciality Minerals, Inc., Super-Pflex 200), and the solution was dispersed at a revolving speed of 8,000 rpm for 30 min. by a dissolver-type homogenizer to prepare a desired matting agent dispersion.

<<Preparation of Surface-protective Layer Coating Solution>>

To 865 g of MEK (methyl ethyl ketone) having been stirred were added 96 g of cellulose acetate butylate (manufactured by Eastman Chemical, Inc., CAB 171-15), 4.5 g of polymethylmetacrylic acid (manufactured by Rohm and Haas, Inc., Pararoid A-21), 1.5 g of a vinyl sulfone compound (VSC), 1.0 g of benztriazole, and 1.0 g of F-containing active agent (manufactured by Asahi Glass Co., Ltd., Surflon KH40), dissolving them therein. Following thereto, 30 g of the foresaid matting agent dispersion was added and stirred to prepare a desired surface-protective layer coating solution.

Stabilizing Agent 1

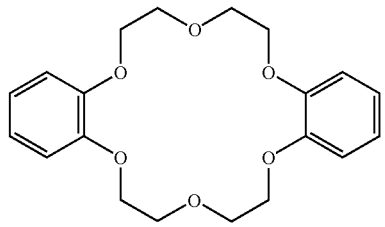

Antifoggant 1

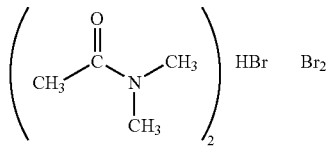

Stabilizing Agent 2

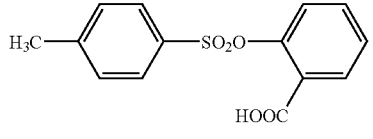

Antifoggant 2

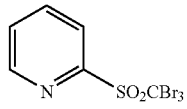

Vinyl Slufonate compound (VSC)

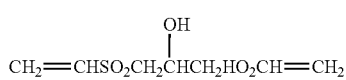

<<Coating of Photosensitive Layer Side>>

The foresaid photosensitive layer coating solution and the surface-protective layer coating solution were simultaneously coated onto the upper undercoat layer A-2 of the support, of which back surface having been coated, in the superimposed state by an extruding (extrusion) coater to prepare the photothermographic imaging material. The coating was carried out so that the photosensitive layer was applied with the coating solution at a rate of 1.9 g/m² converted to the amount of silver and the surface-protective layer was formed in the thickness after dried of 2.5 μm. Then, the coating solutions were dried for 10 min. with dried blowing air of which drying temperature being 75° C. and dew point being 10° C. to give the coating samples (photothermographic imaging materials) 1-1 through 1-14.

<<Exposure and Development Processes>>

A light exposure by the laser scanning using a light exposure apparatus that uses a semiconductor laser converted to the longitudinal multi-mode of a wavelength of 800 to 820 nm by high-frequency folding as a light exposure source was applied from the emulsion surface side of the photothermographic imaging material prepared as described above. At this time, images were formed on the assumption that the angle between the surface to be exposed of the photothermographic imaging material and the exposing laser beams is 75°. (Note that, with this angle, it was noted that the degree of unevenness in the images was less comparing to the case where the angle was set to 90°, and that images with good quality, particularly excellent definition, were unexpectedly obtained.)

Following to the above, development process was carried out for 15 seconds at 110° C. by an automatic developer including a heat drum in the state that the protective layer of the photothermographic imaging material and the surface of the heat drum are contacted with each other. At that time, the exposure and development processes were conducted in a room maintained at a temperature of 23° C. and 50% R.H. The evaluation of the obtained images was implemented by a densitometer. The results of the measurement were evaluated as to the sensitivity (a reciprocal of the ratio of light exposure quantity giving a density that is 1.0 higher than the non-exposed parts) and the fogging in images, expressed with the relative values with respect to the sensitivity value of Sample 1-1 being adjusted to 100, and are shown in Table 1.

"Evaluation of Shelf Life in fresh State"

Three coated samples were placed in a sealed container of which interior having been maintained at 25° C. and a relative humidity of 55% and kept for 7 days (forcible elapse). Among the three, the second sample was treated in the same way as that applied for the sensitometry evaluation described above to evaluate the sensitivity and fogging.

TABLE 1

| SAMPLE No. | INFRARED SENTISISING COLORATNT | FOG | SENSITIVITY | AFTER PRESERVATION AT 50° C. FOR 7 DAYS | | REMARKS |
|---|---|---|---|---|---|---|
| | | | | FOG | SENSITIVITY | |
| 1-1 | 2-3 | 0.20 | 100 | 0.29 | 89 | FOR COMPARISON |
| 1-2 | 2-11 | 0.21 | 82 | 0.26 | 70 | FOR COMPARISON |
| 1-3 | 2-24 | 0.23 | 90 | 0.34 | 81 | FOR COMPARISON |
| 1-4 | 1-1 | 0.17 | 108 | 0.21 | 103 | PRESENT INVENTION |
| 1-5 | 1-4 | 0.16 | 110 | 0.20 | 105 | PRESENT INVENTION |
| 1-6 | 1-5 | 0.16 | 110 | 0.20 | 105 | PRESENT INVENTION |
| 1-7 | 1-7 | 0.15 | 112 | 0.19 | 105 | PRESENT INVENTION |
| 1-8 | 1-11 | 0.18 | 109 | 0.22 | 104 | PRESENT INVENTION |
| 1-9 | 1-13 | 0.17 | 108 | 0.21 | 102 | PRESENT INVENTION |
| 1-10 | 1-16 | 0.15 | 110 | 0.18 | 105 | PRESENT INVENTION |
| 1-11 | 1-20 | 0.19 | 115 | 0.23 | 111 | PRESENT INVENTION |
| 1-12 | 1-23 | 0.15 | 111 | 0.18 | 108 | PRESENT INVENTION |
| 1-13 | 1-26 | 0.14 | 110 | 0.16 | 108 | PRESENT INVENTION |
| 1-14 | 1-27 | 0.15 | 113 | 0.18 | 110 | PRESENT INVENTION |

As seen from Table 1, it is understood that, even though the samples according to the present invention are provided with high photosensitivity, they exhibit to have properties of causing less fogging and excellent conservativeness before development process comparing to the comparative samples.

Example 2

Except the following reference, samples 2-1 through 2-16 of the photothermographic imaging material were prepared according to the same process described for Example 1.

<<Preparation of Infrared Sensitizing Colorant Solution B>>

Following to an addition of two kinds of infrared sensitizing colorants those which concentration in total mol being $2.7 \times 10^{-5}$ mol (the loading quantity of each sensitizing colorant is shown in Table 2), 1.488 g of 2-chloro-benzoic acid, 2.779 g of a stabilizing agent and 365 mg of 5-methyl-2-mercaptobenzimidazole were dissolved in 31.3 ml of MEK in a dark place to prepare the infrared sensitizing colorant solution B.

The light exposure, development process and various evaluations were performed in the same way as those described in Example 1. The results are shown in Table 2. Note that the sensitivity of each sample was indicated with the relative value with respect to the sensitivity value of the sample 2-1 being adjusted to a value of 100.

Example 3

The photothermographic imaging material was prepared according to the method described below. Note that "%" in the Example 3 denotes "% by mass", unless otherwise specified.

<<Preparation of Photosensitive Silver Halide Emulsion>>

| (A1) | |
| --- | --- |
| Phenylcarbamoylated gelatin | 88.3 g |
| Compound A (10% methanol solution) | 10 ml |
| Potassium bromide | 0.32 g |

Water was added to make the whole volume to 5429 ml.

| (C1) | |
| --- | --- |
| Potassium bromide | 51.55 g |
| Potassium iodide | 1.47 g |

Water was added to make the whole volume to 660 ml.

TABLE 2

| SAMPLE No. | INFRARED SENSITIZING COLORANT 1 | INFRARED SENSITIZING COLORANT 2 | LOADING AMOUNT ($\times 10^{-5}$ mol) | | FOG | SENSITIVITY | AFTER PRESERVATION AT 50° C. FOR 7 DAYS | | REMARKS |
| --- | --- | --- | --- | --- | --- | --- | --- | --- | --- |
| | | | INFRARED SENSITIZING COLORANT 1 | INFRARED SENSITIZING COLORANT 2 | | | FOG | SENSITIVITY | |
| 2-1 | 2-3 | — | 2.7 | 0 | 0.20 | 100 | 0.29 | 89 | FOR COMPARISON |
| 2-2 | 2-1 | 2-11 | 1.35 | 1.35 | 0.20 | 82 | 0.26 | 71 | FOR COMPARISON |
| 2-3 | 2-1 | 2-12 | 1.62 | 1.08 | 0.24 | 82 | 0.38 | 71 | FOR COMPARISON |
| 2-4 | 2-1 | — | 2.7 | 0 | 0.18 | 96 | 0.23 | 89 | FOR COMPARISON |
| 2-5 | 2-3 | 2-1 | 1.35 | 1.35 | 0.20 | 97 | 0.28 | 87 | FOR COMPARISON |
| 2-6 | 2-5 | 2-24 | 1.35 | 1.35 | 0.21 | 96 | 0.30 | 88 | FOR COMPARISON |
| 2-7 | 1-1 | — | 2.7 | 0 | 0.17 | 108 | 0.21 | 103 | PRESENT INVENTION |
| 2-8 | 1-1 | 2-1 | 1.35 | 1.35 | 0.15 | 108 | 0.18 | 105 | PRESENT INVENTION |
| 2-9 | 1-4 | 2-1 | 1.35 | 1.35 | 0.14 | 111 | 0.16 | 109 | PRESENT INVENTION |
| 2-10 | 1-4 | 2-1 | 1.08 | 1.62 | 0.13 | 110 | 0.15 | 105 | PRESENT INVENTION |
| 2-11 | 1-7 | 2-11 | 0.81 | 1.89 | 0.12 | 111 | 0.14 | 108 | PRESENT INVENTION |
| 2-12 | 1-7 | 2-12 | 1.62 | 1.08 | 0.15 | 114 | 0.19 | 109 | PRESENT INVENTION |
| 2-13 | 1-16 | 2-1 | 1.35 | 1.35 | 0.13 | 110 | 0.15 | 107 | PRESENT INVENTION |
| 2-14 | 1-26 | 2-1 | 1.62 | 1.08 | 0.11 | 111 | 0.14 | 108 | PRESENT INVENTION |
| 2-15 | 1-26 | 2-5 | 1.35 | 1.35 | 0.10 | 110 | 0.12 | 109 | PRESENT INVENTION |
| 2-16 | 1-27 | 2-1 | 1.35 | 1.35 | 0.12 | 113 | 0.14 | 112 | PRESENT INVENTION |

As shown in Table 2, it is noted that the use of infrared sensitizing colorants according to the present invention in combination with other infrared sensitizing colorants allows, in spite of high photosensitivity, to furnish with properties of less fogging and improved conservativeness before development process comparing to those of the combinations of comparative examples. Further, the above combinations of two infrared sensitizing colorants can give equal or better photosensitivity, less fogging and improved conservativeness before development process comparing to that given by using only one infrared sensitizing colorant according to the present invention.

| (D1) | |
| --- | --- |
| Potassium bromide | 151.6 g |
| Potassium iodide | 7.67 g |
| Potassium hexachloroiridate (IV) | 0.93 ml |
| Potassium hexacyanoferrate (II) | 0.004 g |

Water was added to make the whole volume to 1982 ml.

| (E1) | |
|---|---|
| 0.4 mol/L Aqueous solution of Potassium bromide | Amount for control silver potential describe below. |
| (F1) | |
| Potassium hydroxide | 0.71 g |
| Water was added to make the whole volume to 20 ml. | |
| (G1) | |
| 56% Aqueous solution of Acetic acid | 18.0 ml |
| (H1) | |
| Anhydrous sodium carbonate | 1.72 g |

Water was added to make the whole volume to 151 ml.

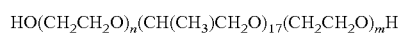

($m+n$=5 to 7)  Compound (A)

To the solution (A1) were added one fourth of the whole volume of the solution (B1) and the whole volume of the solution (C1) in accordance with the simultaneous mixing method with use of a mixing stirrer described in JP Publication Sho-58-58288 while spending 4 min. 45 sec. and maintaining the temperature at 20° C. and pAg at 8.09 to form seeds. One minute later, the whole volume of the solution (F1) was added. During this addition, the pAg was controlled fitly with use of the solution (E1). Six minutes later, three fourth of the whole volume of the solution (B1) and the whole volume of the solution (D1) were added in accordance with the simultaneous mixing method wile spending 14 min. 15 sec. and maintaining the temperature at 20° C. and the pAg at 8.09. Following to stirring of the mixture for 5 min., the temperature of the mixture was controlled to be at 40° C., the whole volume of the solution (G1) was added to cause silver halide emulsion to precipitate. Leaving the precipitated portion in a volume of 2000 ml, removing the supernatant, adding 10 L of water, stirring the mixture, thereby causing the silver halide emulsion to precipitate again. Leaving the precipitated portion in a volume of 1500 ml, removing the supernatant, further adding 10 L of water, stirring, thereby causing the silver halide emulsion to precipitate once more. Leaving the precipitated portion in a volume of 1500 ml, removing the supernatant, then adding the solution (H1), raising the temperature up to 60° C., and the mixture was further stirred for 120 min. The pH of the emulsion was adjusted to the final value of 5.8, water was added to the emulsion so that the emulsion has a weight of 1161 g per 1 mol of silver to give the photosensitive silver halide emulsion A.

This emulsion contains monodispersed cubic silver bromide particles with the average particle size of 35 nm, the variation coefficient of the particle size of 12%, and surface [100] ratio of 92% (Content of AgI was 35 mol %).

Following to the above, this photosensitive silver halide emulsion was maintained at 60° C., the pH of which was adjusted to 6.5, added with triphenylphosphine sulfide (0.25% MEK solution) in an amount of $1.12 \times 10^{-4}$ mol/Ag mol, followed by aging for 2 hours, and then further added with 4-hydroxy-6-methyl-1,3,3a,7-tetrazaindene in an amount of $1 \times 10^{-5}$ mol/Ag mol. Then, the emulsion was quickly cooled down to 30° C. to give the photosensitive silver halide emulsion Em-1.

Besides, the photosensitive silver halide emulsion having not been applied with chemical sensitization is provided as Em-2.

<<Preparations of Powdered Organic Silver Salts 1 to 3>>

In 5470 ml of pure water were dissolved 52.3 g of behenic acid, 27.1 g of arachidic acid, 17.45 g of stearic acid and 0.9 g of palmitic acid. Then, 270.1 ml of aqueous solution of sodium hydroxide with a concentration of 1.5 mol/L was added while stirring at a high speed, followed by an addition of 6.9 ml of concentrated sulfuric acid, and the solution was cooled down at 55° C. so that a solution of an organic acid sodium salt is obtained. Then, while maintaining the temperature of the solution of organic acid sodium salt at 55° C., 380.3 ml of silver nitrate solution with a concentration of 1 mol/L was added over 2 min. Then, while stirring the solution at a high speed, a mixture of the photosensitive silver halide emulsion Em-1 equivalent to 0.038 mol of silver and 450 ml of 3% gelatin solution were added over 5 min. After further stirring the solution at a high speed for 10 min., the solution was filtered to remove water-soluble salts. Then, washing and filtration with use of deionized water were repeated so that the electric conductivity of the filtrate comes to a level of 2 μm/cm, and dehydration by centrifugation was conducted, followed by continuous heating for drying until no change in the weight is recognized so that the powdered organic silver salt 1 is given. According to the similar procedures, with use of the photosensitive silver halide emulsion Em-2, the powdered organic silver salt 2 was given. Besides, the powdered organic silver salt 3 prepared without addition of the silver halide was also provided.

<<Preparation of Powdered Organic Silver Salt 4>>

In 4720 ml of pure water were dissolved 104.6 g of behenic acid, 54.2 g of arachidic acid, 34.9 g of stearic acid and 1.8 g of palmitic acid at 80° C. Then, while stirring the solution at a high speed, 540.2 ml of aqueous sodium hydroxide solution with a concentration of 1.5 mol/L, and then 6.9 ml of concentrated sulfuric acid were added, and the solution was cooled to give a solution of an organic acid sodium salt. While maintaining the temperature of the solution of an organic acid sodium salt at 55° C., the photosensitive silver halide emulsion Em-2 equivalent to 0.076 mol of silver and 450 ml of pure water were added, and then stirred for 5 min. at a high speed. Then, 760.6 ml of silver nitrate solution with a concentration of 1 mol/L was added over 2 min., then further stirred for 10 min. at a high speed, followed by filtration for removing water-soluble salts. Then, washing and filtration with use of deionized water were repeated so that the electric conductivity of the filtrate comes to a level of 2 μS/cm, performing dehydration by centrifuge, and drying under heated nitrogen flow was carried out until no change in the weight was recognized to thereby give the powdered organic silver salt 4.

<<Preparation of Photosensitive Emulsion Dispersion>>

Poly(vinyl butylal) (manufactured by Monsanto Inc., Butvar B-79) in an amount of 14.57 g was dissolved in 1457 g of methyl ethyl ketone, followed by gradual addition of 500 g of the powdered organic silver salt-1 while stirring with use of a dissolver-type homogenizer, and thoroughly stirred. Then, the mixture was subjected to the dispersing process by a media-type dispersing apparatus (manufactured by Gettzmann), 80% of which is filled with zirconium beads (manufactured by Toray) with a diameter of 1 mm, at a circumferential speed of 13 m and with a condition of continuance-in-mill time of 0.5 min. to prepare the photosensitive emulsion dispersion-1. According to the similar procedures, with use of the powdered organic silver salt-2, 3 and 4, the photosensitive emulsion dispersion-2, 3 and 4 were given, respectively.

<<Preparation of Stabilizer Solution>>

A colorant stabilizer-1 in an amount of 1.0 g and 0.31 g of potassium acetate were dissolved in 14.35 g of methanol to prepare the stabilizer solution.

<<Preparation of Infrared-Sensitizing Colorant Solution>>

As shown in Table 3, an infrared-sensitizing colorant, 2.49 g of 2-chlorobenzoic acid, 21.48 g of the colorant stabilizer-2 were dissolved in 135 g of MEK to prepare the infrared-sensitizing colorant solution.

<<Preparation of Reducing Agent Solution>>

The reducing agent A (1,1-bis(2-hydroxy-3,5-dimethylphenyl)-3,5,5-trimethylhexane) in an amount shown in Table 3, or a compound represented by a general formula (7) in an amount equivalent to the amount shown in Table 3 was added in 554 g of MEK, followed by additions of 7.39 g of 4-methylphthalic acid and 0.44 g of an infrared colorant, so that the reducing agent solution is given.

[Preparation of Coating Solution for Photosensitive Layer]

The photosensitive emulsion dispersions 1, 2, 3 and 4 were mixed at the ratios shown in Table 3, respectively, and 50 g of the mixed emulsion and 15.11 g of MEK were stirred while maintaining the temperature at 13° C., and then further added with 0.32 g of 10% methanol solution of bis(dimethylacetoamide)dibromobromate. The mixture was then stirred for an hour. Then, 0.42 g of 10% methanol solution of calcium bromide, then 0.47 g of the stabilizer solution were added, followed by addition of the infrared-sensitizing colorant solution, and the mixture was further stirred. Then, the temperature of the mixture was lowered at 13° C., then further stirred, and added with 0.4 g of 0.9% methanol solution of the colorant stabilizer solution-3. Five min. later, 15.38 g of polyvinylacetal resin (Compound P-1) was added as the binder resin, stirred for 30 min., followed by addition of 1.1 g of tetrachlorophthalic acid (13% MEK solution) and stirred for 15 min. While further continuing stirring, 2.23 g of 22% MEK solution of Doesmodule N3300 (manufactured by Mobay, aliphatic isocyanate), 1.8 g of potassium toluenethiosulfonate (1% MEK solution), 21.2 g of a reducing agent (containing the compound represented by the general formula(7) described in Table 3), 3.34 g of 12.74% MEK solution of phthalazine, and 4 g of an antifogging agent were added and further stirred to give the coating solution for the photosensitive layer.

Colorant Stabilizer -1

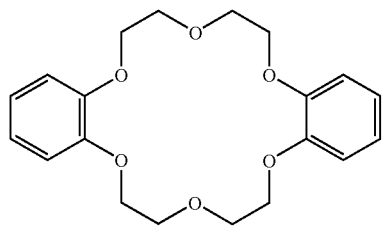

-continued

Colorant Stabilizer -2

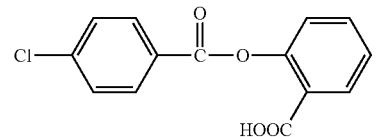

Colorant Stabilizer -3

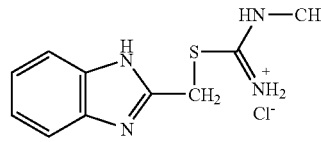

Antifoggant

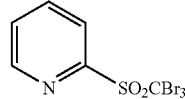

Infrared dye

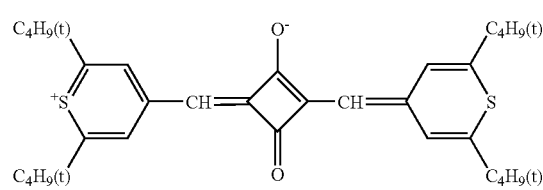

[Coating Solution for Surface Protective Layer]

To 865 g of MEK having been kept stirring were added and dissolved 96 g of cellulose acetate butylate (manufactured by Eastman Chemical, CAB171-15), 4.5 g of polymethylmetacrylic acid (manufactured by Rhom & Haas, Paraloid A-21), 1.5 g of benzotriazole, 25 mg of potassium thiocyanate and F-containing active agent (manufactured by Asahi Glass, Surfron KH40). Then, 30 g of the matting agent solution described below was added and stirred to prepare the coating solution for the surface protective layer.

[Preparation of Matting Agent Dispersion]

Cellulose acetate butylate (manufactured by Eastman Chemical, CAB 171-15) in an amount of 7.5 g was dissolved in 42.5 g of MEK, and 5 g of calcium carbonate (manufactured by Speciality Minerals, Super-Pflex 200) was added therein, and dispersed with use of a dissolver-type homogenizer at 8000 rpm for 30 min. to prepare the matting agent solution.

[Preparation of Coating Solution for Back Surface]

In 830 g of MEK having been kept stirring were added and dissolved 84.2 g of cellulose acetate butylate (manufactured by Eastman Chemical, CAB 381-20) and 4.5 g of polyester resin (manufactured by Bostic, Vitel PE2200B). To the solution was added an infrared colorant so that the absorbance (abs) of the absorption maximum of the infrared colorant in the coating sample for the back surface becomes 0.3, and then, 4.5 g of a fluorine-containing active agent (manufactured by Asahi Glass, Surfron KH40) dissolved in 43.2 g of methanol and 2.3 g of a fluorine-containing active agent (manufactured by Dainippon Ink, Megaface 120K) were added and thoroughly stirred until entirely dissolved. Last of all, 75 g of silica (manufactured by W. R. Grace, Siloid 64X6000) having been dispersed with use of a dissolver-type homogenizer was added to MEK at a concentration of 1% by mass, then stirred to prepare the coating solution for the back surface.

<<Preparation of Support>>

Corona discharge at an intensity of 0.2 kV·A·min/m² was applied to the both sides of a polyethylene terephthalate film base (thickness, 175 μm) colored in blue with a density of 0.170. On the one side, an undercoating layer a was coated with use of the coating solution A for the undercoating layer described below so that the undercoating layer a is formed with a dried thickness of 0.2 μm. Further, on the other side, an undercoating layer b was coated with use of the coating solution B for the undercoating layer described below so that the undercoating layer b is formed with a thickness of 0.1 μm. Then, the undercoating layers were treated with heat at 130° C. for 15 min. in a heat-applying type oven including a film feeding apparatus comprising a plurality of rollers.

(Coating solution A for Undercoating Layer)

Copolymer latex (solid content 30%) of butyl acrylate/t-butyl acrylate/styrene/2-hydroxyethyl acrylate (ratio, 30/20/25/25%) in an amount of 270 g, 0.6 g of a surface-active agent (UL-1) and 0.5 g of methyl cellulose were mixed. Further, 1.3 g of silica particles (manufactured by Fuji Silicia, Siloid 350) was added into 100 g of water, and the mixture was subjected to dispersing process with use of a supersonic dispersing apparatus (manufactured by ALEX Corporation: Ultrasonic Generator, Frequency, 25 kHz, 600W) for 30 min. Last of all, the dispersion was then added with water to make the whole volume to 1000 ml so that the coating solution A for the undercoating layer is prepared.

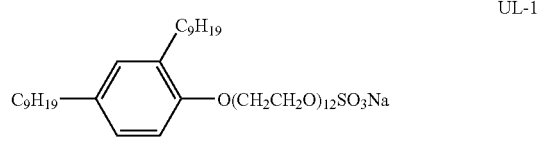

UL-1

(Coating Solution B for Undercoating Layer)

The colloidal tin oxide dispersion in an amount of 37.5 g, 3.7 g of copolymer latex liquid (solid content 30%) of butyl acrylate/t-butyl acrylate/styrene/2-hydroxyethyl acrylate (ratio, 20/30/25/25%), 14.8 g of copolymer latex liquid (solid content 30%) of butyl acrylate/styrene/glycidyl metacrylate (ratio, 40/20/40%), and 0.1 g of surface-active agent (UL-1) were mixed, and water was added to the mixture to make the whole volume to 1000 ml so that the coating solution B for the undercoating layer is prepared.

(Colloidal Tin Oxide Dispersion)

Stannic chloride hydrate in an amount of 65 g was dissolved in 2000 ml of water/ethanol-mixed solution to prepare a uniformly-mixed solution. Then, the solution was boiled to give a coprecipitated product. Silver nitrate was fed by dropping into distillated water having been used for washing the precipitate to check no presence of the reaction of chlorine ions, then, adding distillated water to the washed precipitate to make the whole volume to 2000 ml. Furthermore, 40 ml of 30% aqueous ammonia solution was added, and heating was applied to the aqueous solution to condense the solution until the volume is reduced to a volume of 470 ml so that the colloidal tin oxide dispersion is prepared.

<<Preparation of Photothermographic Imaging Material>>

The combinations of the emulsion dispersions as shown in Table 3 were respectively applied to the both sides of the support having been provided with undercoating to form the photosensitive layer and the back layer, and the support was then dried to prepare the photothermographic imaging material.

(Coating to Photosensitive Layer Side)

The coating solution for the photosensitive layer and the coating solution for the protective layer both prepared as described above were respectively applied in the manner of simultaneous superimposition onto the support in this order from the support side by an extruding coater to form the photosensitive layer and the surface protective layer so that the photothermographic imaging material (Sample No. 1 through 20) was prepared. Note that the coated amount of silver was 1.5 g/m², the drying was performed at 75° C. for 5 min. using dry wind of which dew point temperature is 10° C. The surface protective layer was formed with a dried thickness of 1.5 μm.

(Coating to Back Surface Side)

The coating solution for the back surface prepared as described above was applied by an extruding coater so that the layer is formed with a dried thickness of 3 μm, and then dried. The temperature applied for the drying was 100° C., and drying was performed for 5 min. using dried wind of which dew point temperature is 10° C.

The detailed compositions of the photothermographic imaging materials (Sample Nos. 1 through 20) prepared as described above are presented in Table 3.

TABLE 3

| SAMPLE No. | EMULSION DISPERSION | INFRARED SENSITIZING COLORANT | LOADINGS mol/Agmol | INFRARED SENSITIZING COLORANT | LOADINGS mol/Agmol | REDUCING AGENT | LOADINGS mol/Agmol | REMARKS |
|---|---|---|---|---|---|---|---|---|
| 1 | DISPERSION 2:DISPERSION 3 = 1:1 | DYE-A | $6.64 \times 10^{-5}$ | — | — | REDUCING AGENT A | 0.365 | FOR COMPARISON |
| 2 | DISPERSION 2:DISPERSION 3 = 1:1 | DYE-A | $3.32 \times 10^{-5}$ | DYE-C | $3.32 \times 10^{-5}$ | REDUCING AGENT A | 0.365 | FOR COMPARISON |
| 3 | DISPERSION 2:DISPERSION 3 = 1:1 | DYE-B | $3.32 \times 10^{-5}$ | DYE-A | $3.32 \times 10^{-5}$ | REDUCING AGENT A | 0.365 | FOR COMPARISON |
| 4 | DISPERSION 2:DISPERSION 3 = 1:1 | 11-5 | $6.64 \times 10^{-5}$ | — | — | REDUCING AGENT A | 0.365 | FOR REFERENCE |
| 5 | DISPERSION 2:DISPERSION 3 = 1:1 | — | — | 12-13 | $6.64 \times 10^{-5}$ | REDUCING AGENT A | 0.365 | PRESENT INVENTION |
| 6 | DISPERSION 2:DISPERSION 3 = 1:1 | 11-6 | $1.80 \times 10^{-5}$ | 12-11 | $4.20 \times 10^{-5}$ | REDUCING AGENT A | 0.365 | FOR REFERENCE |

TABLE 3-continued

| SAMPLE No. | EMULSION DISPERSION | INFRARED SENSITIZING COLORANT | LOADINGS mol/Agmol | INFRARED SENSITIZING COLORANT | LOADINGS mol/Agmol | REDUCING AGENT | LOADINGS mol/Agmol | REMARKS |
|---|---|---|---|---|---|---|---|---|
| 7 | DISPERSION 2:DISPERSION 3 = 1:1 | 11-11 | $1.20 \times 10^{-5}$ | 12-10 | $4.80 \times 10^{-5}$ | REDUCING AGENT A | 0.365 | PRESENT INVENTION |
| 8 | DISPERSION 2:DISPERSION 3 = 1:1 | 11-4 11-12 | $2.00 \times 10^{-5}$ $2.00 \times 10^{-5}$ | 12-10 | $2.00 \times 10^{-5}$ | REDUCING AGENT A | 0.365 | PRESENT INVENTION |
| 9 | DISPERSION 3:DISPERSION 1 = 1:1 | 11-4 | $3.00 \times 10^{-5}$ | 12-10 12-20 | $1.70 \times 10^{-5}$ $1.70 \times 10^{-5}$ | REDUCING AGENT A | 0.365 | PRESENT INVENTION |
| 10 | DISPERSION 2:DISPERSION 3 = 1:1 | 11-4 11-11 | $0.60 \times 10^{-5}$ $0.60 \times 10^{-5}$ | 12-10 12-13 | $3.36 \times 10^{-5}$ $1.44 \times 10^{-5}$ | REDUCING AGENT A | 0.365 | PRESENT INVENTION |
| 11 | DISPERSION 2:DISPERSION 3 = 1:1 | 11-4 | $3.32 \times 10^{-5}$ | 12-10 | $3.32 \times 10^{-5}$ | 3-70 REDUCING AGENT A | 0.091 0.274 | PRESENT INVENTION |
| 12 | DISPERSION 3:DISPERSION 1 = 1:1 | 11-4 | $3.32 \times 10^{-5}$ | 12-10 | $3.32 \times 10^{-5}$ | 3-12 REDUCING AGENT A | 0.243 0.122 | PRESENT INVENTION |
| 13 | DISPERSION 3:DISPERSION 1 = 1:1 | 11-4 | $3.32 \times 10^{-5}$ | 12-10 | $3.32 \times 10^{-5}$ | 3-72 3-7 | 0.182 0.182 | PRESENT INVENTION |
| 14 | DISPERSION 2:DISPERSION 3 = 1:1 | 11-4 | $3.32 \times 10^{-5}$ | 12-10 | $3.32 \times 10^{-5}$ | 3-7 | 0.365 | PRESENT INVENTION |
| 15 | DISPERSION 3:DISPERSION 1 = 1:1 | 11-4 | $3.32 \times 10^{-5}$ | 12-10 | $3.32 \times 10^{-5}$ | 3-23 | 0.365 | PRESENT INVENTION |
| 16 | DISPERSION 3:DISPERSION 1 = 1:1 | 11-4 | $3.32 \times 10^{-5}$ | 12-10 | $3.32 \times 10^{-5}$ | 3-38 | 0.347 | PRESENT INVENTION |
| 17 | DISPERSION 3:DISPERSION 1 = 1:1 | 11-4 | $3.32 \times 10^{-5}$ | 12-10 | $3.32 \times 10^{-5}$ | 3-34 | 0.347 | PRESENT INVENTION |
| 18 | DISPERSION 3:DISPERSION 1 = 1:1 | 11-4 | $3.32 \times 10^{-5}$ | 12-10 | $3.32 \times 10^{-5}$ | 3-72 | 0.347 | PRESENT INVENTION |
| 19 | DISPERSION 4 | 11-4 | $3.32 \times 10^{-5}$ | 12-10 | $3.32 \times 10^{-5}$ | 3-71 | 0.347 | PRESENT INVENTION |
| 20 | DISPERSION 4 | 11-4 | $3.32 \times 10^{-5}$ | 12-10 | $3.32 \times 10^{-5}$ | 3-15 | 0.347 | PRESENT INVENTION |

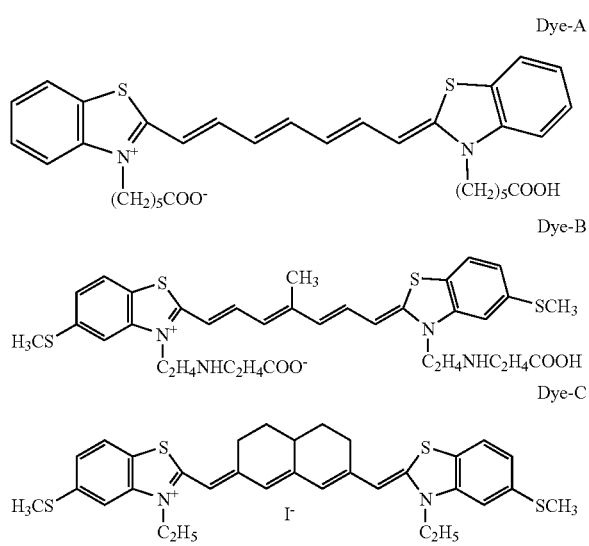

<<Evaluation of Photothermographic Imaging Materials 1>>

The characteristics of the photothermographic imaging materials (Sample Nos. 1 to 20) prepared as described above were evaluated in accordance with the following procedures.

(Measurements of Dmin, Dmax and Sensitivity)

Each sample was converted to a half size sheet and then subjected to the image-like exposure with use of semiconductor laser of 810 nm. Note that the exposure operation was carried out by setting the angle between the exposure surface of the sample and the exposing laser beams at 80 degree, and the power output of the laser at 57.45 mm/sec, 30 mW, and the high-frequency superimposition was outputted in the vertical multi-mode. The thermal development processing was carried out at 125° C. for 13.5 sec. with use of a heating drum to apply heat evenly. Densities of the thermally-developed images of the respective samples obtained as described above were measured by an optical densitometer (manufactured by Konica, PD-82), and a characteristic curve based on the density D and the quantity of exposure Log(1/E) was prepared, with which the minimum density (Dmin=Fog density), the sensitivity, the color tone $_y$ and the maximum density (Dmax) were measured. Note that the sensitivity was defined as the inverse logarithm of the quantity of exposure that gives a density of 1.0 higher than the minimum density. The gamma in the photographic characteristic values represents the slope (color tone Y) of the characteristic curve. Namely, the gamma denotes the slope between the point of (minimum density+0.25) to the point of (minimum density+2.5). Note that results of the Dmin, D max and the sensitivity are represented with the relative values to the converted value of the sample 1 of 100.

(Evaluation on Shelf Stability (Shelf Stability in Fresh State))

The prepared samples were placed in a sealed container, the inside of which having been maintained at 25° C., 55% RH and in oxygen atmosphere (101 kPa), and stored for a period of 7 days at 55° C., respectively. These samples were provided for the forcibly-deteriorated samples, respectively. For the comparison, the same samples were stored in a shaded container, the inside of which having been maintained at 25° C. and 55% RH, for a period of 7 days, and those samples were provided for the sample for check. The exposure and heat development processings were applied to each of the samples obtained as described above in according to the same procedures as described above. The minimum density (fog density) was measured for each sample according to the same methods as described above, and the increase of the fog ($\Delta Dmin1$) was worked out based on the following equation, which was used as a scale for the shelf stability (shelf stability in fresh state) and represented with the relative value to the converted value of the sample 1 of 100.

$\Delta Dmin1$=(Fog Density of Forcibly-deteriorated Sample)−(Fog Density of Check Sample)

(Evaluation on Resistance of Image Against Light)

The samples thermally developed as described were respectively placed in a room maintained at 25° C. and 55% RH for a period of 7 days under a fluorescent light. Then, the optical density in the minimum density portion (the portion of Dmin) before and after the foresaid placement was measured for the respective samples. From the measured density, the variation ($\Delta Dmin2$) of the minimum density (Dmin) was determined in accordance with the following equation. The given values were used as the scale of the shelf stability, which was expressed with the relative values to the converted value of the sample 1 of 100.

$\Delta Dmin2$=(Dmin after exposure to fluorescent light)− (Dmin before exposure to fluorescent light)

Note that the temperature on the used light source table was 45° C., and the brightness was 8000 Lux. The results are represented with the relative values to the converted value of the sample 1 of 100.

(Evaluation on Resistance against Development Processing Environment: Process Environment $\Delta$Sensitivity)

In the thermal development processing, a dry laser imager was set in a temperature/humidity-controlled room, and exposures and thermal development were applied to the photographic materials under four different conditions, that is, at 32° C. and 70% RH, at 32° C. and 10% RH, at 13° C. and 70% RH, and at 13° C. and 25% RH. The evaluations for the given images were conducted in accordance with the photographic performance evaluations as described above. The differences between the maximum value and the minimum value in the sensitivity under the respective four conditions were compared. The lesser values are preferred.

The results obtained from the above evaluations were shown in Table 4.

TABLE 4

| SAMPLE No. | D min | SENSITIVITY | D max | PROCESS ENVIRONMENT $\Delta$SENSITIVITY | LIGHT DURABILITY $\Delta D min2$ | SHELF LIFE IN FRESH STATE $\Delta D min2$ | REMARKS |
|---|---|---|---|---|---|---|---|
| 1 | 100 | 100 | 100 | 100 | 100 | 100 | FOR COMPARISON |
| 2 | 99 | 100 | 98 | 102 | 103 | 104 | FOR COMPARISON |
| 3 | 101 | 99 | 98 | 101 | 101 | 102 | FOR COMPARISON |
| 4 | 92 | 101 | 101 | 95 | 93 | 89 | PRESENT INVENTION |
| 5 | 93 | 105 | 103 | 91 | 89 | 90 | PRESENT INVENTION |
| 6 | 89 | 114 | 109 | 80 | 81 | 85 | PRESENT INVENTION |
| 7 | 85 | 119 | 110 | 78 | 82 | 84 | PRESENT INVENTION |
| 8 | 84 | 118 | 109 | 81 | 80 | 85 | PRESENT INVENTION |
| 9 | 82 | 116 | 108 | 79 | 83 | 80 | PRESENT INVENTION |
| 10 | 86 | 120 | 110 | 82 | 84 | 83 | PRESENT INVENTION |
| 11 | 85 | 118 | 114 | 83 | 79 | 80 | PRESENT INVENTION |
| 12 | 84 | 120 | 118 | 78 | 74 | 76 | PRESENT INVENTION |
| 13 | 78 | 124 | 123 | 71 | 68 | 65 | PRESENT INVENTION |
| 14 | 76 | 121 | 120 | 73 | 67 | 64 | PRESENT INVENTION |
| 15 | 75 | 120 | 120 | 74 | 67 | 65 | PRESENT INVENTION |
| 16 | 70 | 117 | 118 | 72 | 68 | 63 | PRESENT INVENTION |
| 17 | 73 | 118 | 119 | 73 | 70 | 66 | PRESENT INVENTION |
| 18 | 74 | 118 | 120 | 74 | 69 | 67 | PRESENT INVENTION |
| 19 | 84 | 111 | 110 | 80 | 84 | 81 | PRESENT INVENTION |
| 20 | 80 | 108 | 109 | 78 | 81 | 83 | PRESENT INVENTION |

It is noted from Table 4 shown above that the respective samples according to this invention produce less fogs, being highly-sensitive, giving sufficient highest density, and being excellent in their resistance against light and in the shelf stability. In addition to the above, it was found that the color tone Y of the respective samples according to this invention was in a range of 2.5 to 5.0, exhibiting their suitability to be used for the photosensitive materials for medical use.

<<Evaluation on Photothermographic Imaging Material 2>>

Evaluations on silver color tone were conducted for the photothermographic imaging materials (samples 1, 8, 12, 13 and 19) prepared as described above in accordance with the following procedures.

(Evaluation on Silver Color Tone)

Exposure processing was applied to the respective samples under the condition of giving the optical density as Dmin of 0.5, 1.0 and 1.5 in accordance with the same procedures as described above. Then, the sample was developed to prepare the wedge sample formed in four stairs including the unexposed portions. From the respective wedge density portions prepared as described above, u* and v* were calculated by CM-3600d (manufactured by Minolta co., Ltd.) in accordance with the measuring method for u*, V* and a*, b* in the space of CIE 1976 colors. On a graph, wherein the transverse axis represents u* or a* (green to red colors) and the vertical axis represents v* or b* (blue to yellow colors), u* and v* measured on the low density (optical density 0.2) to the high density (optical density 1.5) of Dmin were plotted, and the linear regression line was determined to work out the R square values, the intersect, the angle, and the slope.

It is noted from the characteristic values determined by the linear regression, the preferred color tone with which no fatigue in eyes during diagnosis is caused is moderate yellow. Concretely, the measured characteristic values as described above preferably accord to the following criterion.

Angle and Slope: The angle closer to 45 degree, or the slope (tan θ) closer to 1.0 represents better color balance in the range of the low density portion to the high density portion.

Intersect: The range of +3 to −3 is preferred, and the range of +2 to −2 is more preferred.

R square value: The value closer to 1.0 represents less variation and less dispersion in colors in the range of the low density portion to the high density portion, more reliability, and more accuracy.

Furthermore, visual evaluations were conducted for the prepared silver images, and the quality of silver color tone was determined in accordance with the following criterion.

A: Optimally suitable silver color tone at visual diagnosis.
B: Acceptable silver color tone at visual diagnosis.
D: Silver color tone with which eyes get tired and diagnosis is made hard.

The results obtained in the evaluations described above are shown in Table 5.

It is apparently noted from Table 5 that the respective samples composed according to this invention are superior in the characteristics in terms of the chromaticity diagram and in the silver color tone based on the visual observation.

The entire disclosure of JP Tokugan-2003-079517 filed on Mar. 24, 2003 including specification, claims, drawings and summary and JP Tokugan-2003-102726 filed on Apr. 7, 2003 including specification, claims, drawings and summary is incorporated herein by reference in its entirety.

What is claimed is:

1. A photothermographic imaging material comprising:
photosensitive silver halide on at least one side of a support,
at least one of compounds represented by the following general formula (1);

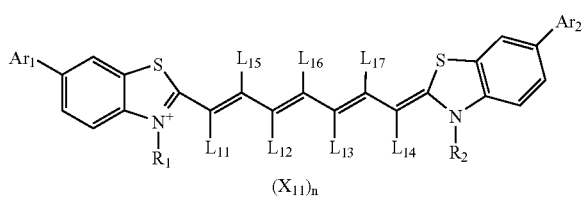

general formula (1)

wherein the $L_{11}$ to the $L_{17}$ represent each independently a hydrogen atom, a halogen atom, an amino group, an alkylthio group, an arylthio group, a lower alkyl group, a lower alkoxy group, an aryloxy group, an aryl group or a heterocyclic group, or a non-metal atom group required for bonding the $L_{11}$ and the $L_{12}$, the $L_{12}$ and the $L_{13}$, the $L_{13}$ and the $L_{14}$, the $L_{15}$ and the $L_{16}$, and the $L_{16}$ and the $L_{17}$, respectively, to form 5- to 7-membered rings; the $R_1$ and the $R_2$ represent each independently an aliphatic group; the $R_1$ and the $L_{11}$, and the $R_2$ and the $L_{14}$ can be bonded each other to form a 5- to 7-membered cyclic structure respectively; the $Ar_1$ and the $Ar_2$ represent each independently an aryl group or a heterocyclic group; the $X_{11}$ represents an ion required for offsetting electric charges in a molecules; and n represents the number of ions required for offsetting electric charges in the molecules, and a compound represented by the following general formula (7);

TABLE 5

| SAMPLE No. | INCLINATION | SILVER COLOR TONE | ANGLE | INTERCEPT | SQUARED VALUE | REMARKS |
| --- | --- | --- | --- | --- | --- | --- |
| 1 | D | 0.08 | 4.31° | −8.70 | 0.07 | FOR COMPARISON |
| 8 | B | 0.39 | 21.29° | −6.32 | 0.79 | PRESENT INVENTION |
| 12 | A | 0.89 | 41.55° | −2.14 | 0.93 | PRESENT INVENTION |
| 13 | A | 1.09 | 47.48° | 0.20 | 1.00 | PRESENT INVENTION |
| 19 | B | 0.43 | 23.17° | −6.86 | 0.83 | PRESENT INVENTION | general formula (7)

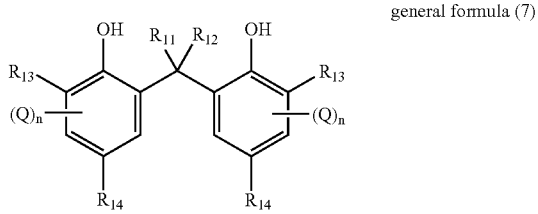

wherein the $R_{11}$ and the $R_{12}$ represent each independently hydrogen atom, 3- to 10-membered nonaromatic cyclic group or 5- or 6-membered aromatic cyclic group; the $R_{13}$ and the $R_{14}$ represent each independently hydrogen atom, alkyl group; aryl group or a heterocyclic group, the Q represents a substituent on the benzene ring; n is 0 or an integer of 1 or 2; and the Q are same or different from one another when the Q is plural.

2. The material of claim 1, comprising at least one of compounds represented by the following general formula (2);

general formula (2)

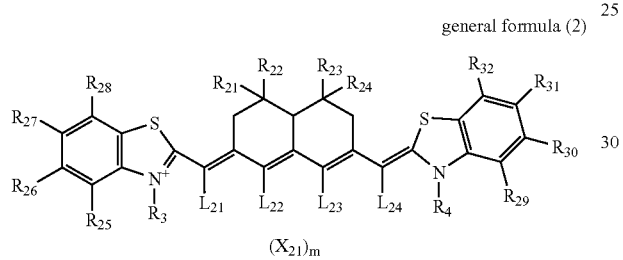

wherein the $L_{21}$ to the $L_{24}$ represent each independently a hydrogen atom, a halogen atom, an amino group, an alkylthio group, an arylthio group, a lower alkyl group, a lower alkoxyl group, an aryloxy group, an aryl, a heterocyclic group, or a nonmetal atom group required for bonding the $L_{21}$ and the $L_{22}$, the $L_{22}$ and the $L_{23}$, and the $L_{23}$ and the $L_{24}$ can be bonded each other respectively to form 5- to 7-membered rings; the $R_3$ and the $R_4$ represent each independently an aliphatic group; the $R_3$ and the $L_{21}$, and the $R_4$ and the $L_{24}$ can be bonded each other to form a 5- to 7-membered cyclic structure, respectively; the $X_{21}$ represents an ion required for offsetting electric charges in the molecules; the m represents the number of ions required for offsetting electric charges in the molecules; the $R_{21}$ to the $R_{24}$ represent each independently a hydrogen atom, an alkyl group or an aryl group; and the $R_{25}$ to the $R_{32}$ represent a group capable of being substituted on a benzene ring; the $R_{25}$ and the $R_{26}$, the $R_{26}$ and the $R_{27}$, the $R_{27}$ and the $R_{28}$, the $R_{29}$ and the $R_{30}$, the $R_{30}$ and the $R_{31}$ and the $R_{31}$ and the $R_{32}$ can be bonded each other respectively to form cyclic structures; the $R_{27}$ is neither an aryl group nor a heterocyclic group.

3. The material of claim 1, wherein the compound represented by the general formula (1) is a compound represented by the following general formula (3);

general formula (3)

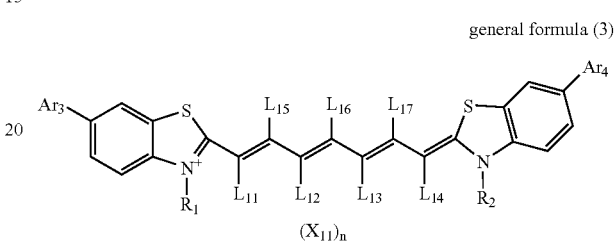

wherein the $L_{11}$ to the $L_{17}$ in the general formula (3) are synonymous with the $L_{11}$ to the $L_{17}$ in the general formula (1); the $R_1$ and the $R_2$ in the general formula (3) are synonymous with the $R_1$ and the $R_2$ in the general formula (1); the $X_{11}$ in the general formula (3) is synonymous with the $X_{11}$ in the general formula (1); the n in the general formula (3) is synonymous with the n in the general formula (1); and the $Ar_3$ and the $Ar_4$ represent each independently an aryl group.

4. The material of claim 1, wherein the compound represented by the general formula (1) is a compound represented by the following general formula (4);

general formula (4)

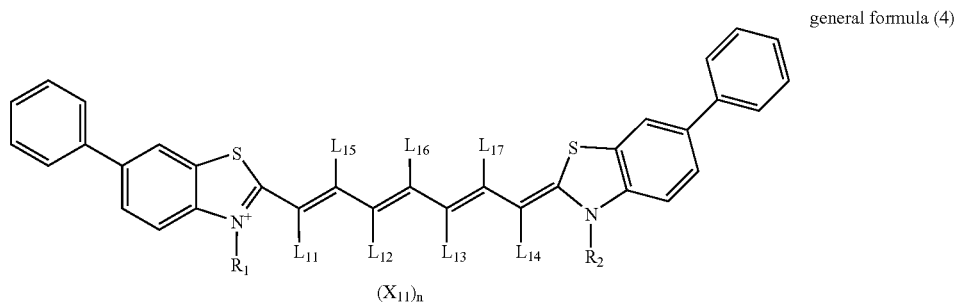

wherein the $L_{11}$ to the $L_{17}$ in the general formula (4) are synonymous with the $L_{11}$ to the $L_{17}$ in the general formula (1); the $R_1$ and the $R_2$ in the general formula (4) are synonymous with the $R_1$ and the $R_2$ in the general formula (1); the $X_{11}$ in the general formula (4) is synonymous with the $X_{11}$ in the general formula (1); the n in the general formula (4) is synonymous with the n in the general formula (1).

5. The material of claim 1, wherein the compound represented by the general formula (1) is a compound represented by the following general formula (5);

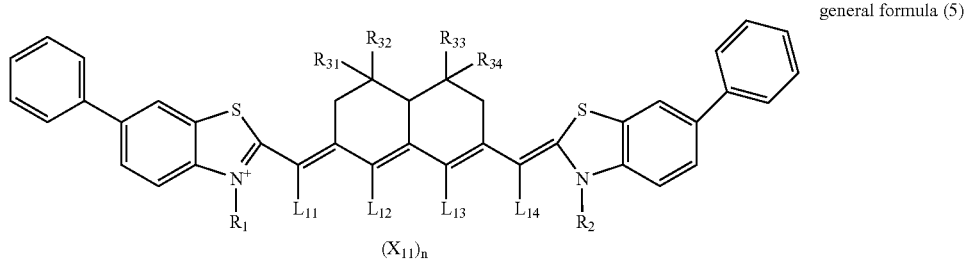

general formula (5)

wherein the $L_{11}$ to the $L_{14}$ in the general formula (5) are synonymous with the $L_{11}$ to the $L_{14}$ in the general formula (1); the $R_1$ and the $R_2$ in the general formula (5) are synonymous with the $R_1$ and the $R_2$ in the general formula (1); the $X_{11}$ in the general formula (5) is synonymous with the $X_{11}$ in the general formula (1); the n in the general formula (5) is synonymous with the n in the general formula (1); and the $R_{31}$ to the $R_{34}$ represent each independently a hydrogen atom, an alkyl group or an aryl group.

6. The material of claim 2, wherein the compound represented by the general formula (2) is a compound represented by the following general formula (6);

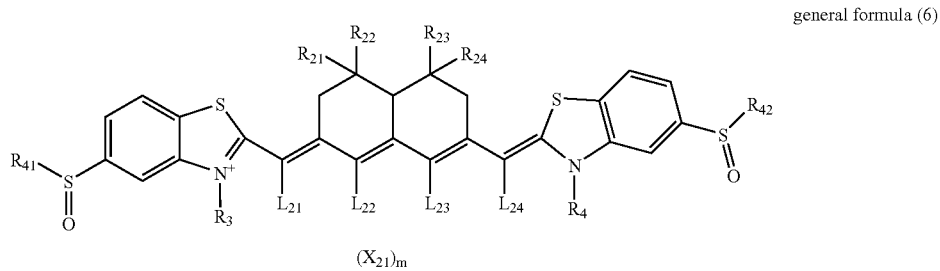

general formula (6)

wherein the $L_{21}$ to the $L_{24}$ in the general formula (6) are synonymous with the $L_{21}$ to the $L_{24}$ in the general formula (2); the $R_3$ and the $R_4$ in the general formula (6) are synonymous with the $R_3$ and the $R_4$ in the general formula (2); the $X_{21}$ in the general formula (6) is synonymous with the $X_{21}$ in the general formula (2); and the m in the general formula (6) is synonymous with the m in the general formula (2); the $R_{21}$ to the $R_{24}$ in the general formula (6) are synonymous with the $R_{21}$ to the $R_{24}$ in the general formula (2); and the $R_{41}$ and the $R_{42}$ represent each independently an unsubstituted lower alkyl group, a cycloalkyl group, an aralkyl group, an aryl group or a heterocyclic group.

7. The material of claim 1, wherein the photosensitive silver halide is chemically sensitized.

8. The material of claim 1, comprising a photosensitive emulsion comprising the photosensitive silver halide and a non-photosensitive aliphatic silver carboxylate;

wherein the photosensitive silver halide is not contained in a synthesis of the nonphotosensitive aliphatic silver halide, and is mixed with the non-photosensitive aliphatic silver carboxylate after a completion of the synthesis to prepare the photosensitive emulsion.

9. The material of claim 1, wherein $R_{11}$ is a 3- to 6-membered nonaromatic cyclic group and $R_{12}$ is a hydrogen atom in the compound represented by the formula (7).

10. The material of claim 1, wherein $R_{11}$ and $R_{12}$ are a hydrogen atom respectively; $R_{13}$ is a tertiary alkyl containing 1 to 10 carbon atoms, and $R_{14}$ is a primary alkyl containing 1 to 10 carbon atoms.

* * * * *